(12) United States Patent
Hickman et al.

(10) Patent No.: US 7,080,127 B1
(45) Date of Patent: Jul. 18, 2006

(54) METHOD AND APPARATUS FOR COMPUTING WITHIN A WIDE AREA NETWORK

(76) Inventors: Paul L. Hickman, 27140 Moody Rd., Los Altos Hills, CA (US) 94022; Michael L. Gough, 8131 Harvard Ct., Ben Lomond, CA (US) 95005

( * ) Notice: Subject to any disclaimer, the term of this patent is extended or adjusted under 35 U.S.C. 154(b) by 700 days.

(21) Appl. No.: 08/810,679

(22) Filed: Feb. 28, 1997

Related U.S. Application Data

(63) Continuation-in-part of application No. 08/798,703, filed on Feb. 12, 1997, and a continuation-in-part of application No. 08/798,704, filed on Feb. 12, 1997.

(60) Provisional application No. 60/012,905, filed on Mar. 6, 1996.

(51) Int. Cl.
*G06F 15/16* (2006.01)

(52) U.S. Cl. .................................... 709/208

(58) Field of Classification Search ........... 395/200.33, 395/200.48, 200.57, 200.59, 200.02, 500; 707/10; 708/208; 709/208, 209, 210, 211, 709/207, 228, 229; 345/201, 202
See application file for complete search history.

(56) References Cited

U.S. PATENT DOCUMENTS

| | | | |
|---|---|---|---|
| 4,939,509 A * | 7/1990 | Bartholomew et al. | 345/2 |
| 5,228,137 A * | 7/1993 | Kleinerman et al. | 395/500 |
| 5,241,625 A | 8/1993 | Epard et al. | 395/163 |
| 5,315,711 A * | 5/1994 | Barone et al. | 708/208 |
| 5,581,390 A * | 12/1996 | Fielden et al. | 359/158 |
| 5,692,126 A * | 11/1997 | Templeton et al. | 395/200.79 |
| 5,838,906 A * | 11/1998 | Doyle et al. | 709/202 |
| 5,909,545 A * | 6/1999 | Frese, II et al. | 709/208 |
| 5,913,920 A * | 6/1999 | Adams et al. | 709/204 |
| 5,968,129 A * | 10/1999 | Dillon et al. | 709/223 |

OTHER PUBLICATIONS

Van Hoof, et al. Hooked on Java, p. 8, Jan. 1996.*

(Continued)

*Primary Examiner*—Dung C. Dinh
(74) *Attorney, Agent, or Firm*—Tips Group

(57) ABSTRACT

A cluster computer system including multiple network accessible computers that are each coupled to a network. The network accessible computers implement host computer programs which permits the network accessible computers to operate as host computers for client computers also connected to the network, such that input devices of the client computers can be used to generate inputs to the host computers, and such that image information generated by the host computers can be viewed by the client computers. The system also includes a cluster administration computer coupled to the multiple network accessible computers to monitor the operation of the network accessible computers. A method for providing access to host computers by client computers over a computer network includes receiving a request for a host computer coupled to a computer network from a client computer coupled to the computer network, wherein the relationship of the host computer to the client computer is to be such that after the client computer becomes associated with a host computer, an input device of the client computer can be used to generate inputs to the host computer, and such that image information generated by the host computer can be viewed by the client computer. Next, a suitable host computer for the client computer is determined, and the client computer is informed of the network address of the suitable host computer. Nodes of the network can be non-terrestrial.

9 Claims, 43 Drawing Sheets

OTHER PUBLICATIONS

Stanczak, Mark "Symantec re-engergizes remote-control computing" PC WEEK, Jul. 8, 1996 v13 n27 pN1(2).*

Rash, Wayne Jr. "Reach out and touch your PC", Information Week, Sep. 23, 1996 n598 p. 79.*

"More Data at Twice the Speed," San Jose Mercury News, Friday, Mar. 1, 1996, pp. 2c.

"Farallon Netopia Virtual Office," NetGuide, Jun. 1997, pp. 24.

"Farallon to Add Scripting Hooks to Timbuktu 4," MacWeek, Jun. 9, 1997, pp. 7.

Gianturco, Michael, "Souped-Up Windows," Forbes, Jul. 29, 1996, pp. 88.

Staten, James, "Windows Apps via the Internet," MacWeek, Jul. 22, 1996, pp. 14.

Petreley, Nicholas, "Broadway Debut Could Upstage Web-Based Trio Java, Active X, OpenDoc," RCVD Jul. 21, 1997.

"Software Will Run Windows Through Web Browsers," San Jose Mercury News, Jan. 27, 1997, pp. 4e.

"Microsoft Pursues Multiuser NT," IW Mar. 3, 1997, pp. 28.

Robinson, Phillip, "Unwired Net," San Jose Mercury News, Jun. 8, 1997, pp. 4e.

Hutheesing, Nikhil, "Airship Internet," Forbes, Mar. 5, 1997, pp. 170-171.

Cook, William J., "1997 A New Space Odyssey," U.S. News & World Report, Mar. 3, 1997, pp. 44-48, & 52.

Markoff, John, "Mercedes Puts Internet in Car," San Jose Mercury News, Apr. 29, 1997, pp. 1a & 4a.

"Commercial Satellites Launch 'unwired planet'," San Jose Mercury News, May 18, 1997, pp. 1e.

"The Satellite Biz Blasts Off," Business Week, Jan. 27, 1997, pp. 62-63, 65-66, 68 & 70.

Hardy, Quentin, "Iridium Phone Project Maps an Upscale Orbit," The Wall Street Journal, Jan. 10, 1997, pp. B16.

* cited by examiner

METHOD AND APPARATUS FOR COMPUTING WITHIN A WIDE AREA NETWORK

CROSS REFERENCE TO RELATED APPLICATIONS

This application claims benefit of copending U.S. Provisional Patent Application No. 60/012,905, entitled Method and Apparatus for Computing Within a Wide Area Network, filed Mar. 6, 1996 on behalf of Paul L. Hickman and Michael L. Gough, the disclosure of which is incorporated herein by reference.

This application is further a Continuation-in-Part (CIP) of both copending U.S. patent application Ser. No. 08/798,703, filed Feb. 12, 1997 on behalf of Paul L. Hickman and Michael L. Gough, entitled Method and Apparatus for Controlling a Computer Over a Wide Area Network, and U.S. patent application Ser. No. 08/798,704, filed Feb. 12, 1997 on behalf of Paul L. Hickman and Michael L. Gough, entitled Method and Apparatus for Computing Within a Wide Area Network, the disclosures of both of which are incorporated herein by reference.

This application is related to copending U.S. patent application Ser. No. 08/808,882, entitled Method and Apparatus for Computing Over a Wide Area Network of Paul L. Hickman, filed on an even day herewith and owned in common with the present application, and incorporated herein by reference.

This application is related to copending U.S. patent application Ser. No. 08/810,620, entitled Method and Apparatus for Computing Over a Wide Area Network of Paul L. Hickman, filed on an even day herewith and owned in common with the present application, and incorporated herein by reference.

TECHNICAL FIELD

This invention relates generally to networks of computer systems, and more particularly to wide area networks such as the Internet and the Internet protocol known as the World Wide Web (WWW).

BACKGROUND ART

The Internet has, of late, become extremely popular. The origins of the Internet date back several decades to a U.S. government sponsored military/educational/business wide area network (WAN) that was designed to remain operational even in the event of the catastrophe, e.g. a major earthquake or a nuclear war. To accomplish this goal, robust protocols and systems were developed which allowed a non-hierarchical, geographically distributed collection of computer systems to be connected as a WAN such as the loss of a particular computer, or group of computers, would not preclude the continued communication among the remaining computers. This protocols include the well known TCP/IP protocols wherein data is "packetized" into TCP/IP protocol data packets and sent over the Internet. The TCP/IP protocol data packets include source and destination addresses, which allows routers, switches and other Internet devices to route the data packets to a desired destination address, such as a user's computer (sometimes referred to as a "node" on the network).

Each computer or "node" on the Internet can support one or more "entities" or "domains." These entities are addressed on the Internet with a domain name which uniquely identifies the domain. Individual users within a domain are provided with names unique to that domain. For example, to communicate with John Smith at a domain "hacksoft.com", electronic mail or "e-mail" could be sent, for example, to john smith@hacksoft.com. The suffix "com" means that the domain belongs to a commercial entity (e.g. a business), the suffix "gov" means that the domain belongs to a government entity, and the suffix "edu" means that the domain belongs to an educational entity (such as a University). Other suffixes are available, e.g. for specific foreign countries, for networks ("net"), etc. These suffixes are referred to as "first level" domain names, while the penultimate names (such as "hacksoft") are referred to as "second level" domain names. Additional first or "top" level domain names are currently being considered to expand the number of top level domain names.

While the use of the Internet has been prevalent for many years now, its use has been limited by the arcane and difficult commands required to access the various computers on the network. To address this problem, a protocol known as the "World Wide Web" or "WWW" was developed to provide an easier and more user-friendly interface for the Internet.

With the World Wide Web an entity having a domain name creates one or more "web pages" which provides information and, to a degree, some interaction with the entity's "web site." By convention, Web pages are written in "hyper-text mark-up language", commonly referred to as "HTML." An address for a "base" Web page for a hypothetical company "Hacksoft" could be http//:www.hacksoft-.com. The "http" is a prefix identifying the protocol, namely "hyper-text transfer protocol," the "www" refers to the World Wide Web, "hacksoft" is the "second level" domain name, and "com" is the "first level" domain name that specifies a commercial enterprise. The full address for the Web page, namely "http//:www.hacksoft.com", is often known as the address or "URL" of the home page of the Web site.

A computer user can "browse", i.e. navigate around, the WWW by utilizing a suitable web browser and an Internet Service Provider ("ISP"). For example, UUNET, America Online, Global Village, and hundreds of other companies all provide Internet access. Currently, the most popular web browser is made by Netscape of Mountain View, Calif. The web browser allows a user to specify or search for a web page on the WWW, and then retrieves and displays the home page of the desired web page on the user's computer screen.

When a computer user "calls up" a web page, a variety of information may be displayed on the screen as determined by the entity maintaining the web site. HTML supports text and graphics, and permits "hyperlinks" that allow visitors to the web site to "jump" to (i.e. access and display) other web pages on the WWW. Therefore a person cruising the web may start on a web page of, for example, a company in Palo Alto, Calif., "click" on a hyperlink, and be connected to a web page of, for example, a University in the Netherlands. Clicking on a hyperlink on the on the Dutch University's web page may cause the user to be connected to a web page of, for example, a Government agency in Japan. In this fashion, the World Wide Web can be navigated and browsed for information in an intuitive, linked, and easy to use fashion, and information on computers from around the world may be accessed easily and intuitively.

Until recently, the World Wide Web was, essentially, primarily passive provider of information. There was some limited interactivity in that a computer user could leave certain information at a web site such as their name, address, phone number, etc. which could then be responded to by the entity maintaining the web site. Very recently, there as been an expansion of computational interaction over the World Wide Web. A system known as "Java™" developed by Sun Microsystems, Inc. of Mountain View, Calif. permits programs known as "Applets" to be transferred over the Internet, and run on a user's computer, regardless of the local machine's operating system or hardware. Java Applets are thus operating system and hardware independent. With Java software, a web page can be used to download an Applet to run on a computer user's machine. Typically, these Applets are small programs designed for a specific task, e.g. to create a graph, animate a display, or provide a spreadsheet. After the Applet software serves its function it is typically discarded, i.e. it is usually not permanently saved.

Before Java software, the World Wide Web resembled a large collection of storage devices for data retrievable by Internet users. With the advent of Java software, the World Wide Web is, in some fashion, gaining computational power.

While Java software is a major advance in the functionality of the Internet, it still falls short of providing true computational power on the World Wide Web. Applets are small, typically transient programs designed for specific tasks. However, it is contemplated that it would be desirable to have a fully functioning computer system, such as a personal computer (PC), a workstation, a mini computer, a mainframe, or even a supercomputer that could provide vastly greater power and functionality to users of the World Wide Web. In addition, the presence of the computational power of larger systems on the Web would also provide for enhanced communication and functionality on the WWW, and would provide access to software applications that could not be implemented, in a practical manner, with an Applet.

There currently exists a species of software which permits a first computer ("master computer") to monitor and/or control the functionality of a second computer (slave computer). For example, the programs "Timbuktu" and "Carbon Copy" permit a master computer to control a slave computer, or to simply monitor the activity of the slave computer. The owner of the "Timbuktu" software, Farallon Computing, Inc. of Alameda, Calif. has obtained a U.S. Pat. No. 5,241,625 entitled "Screen Image Sharing Among Heterogeneous Computers", the disclosure of which is incorporated by reference. More specifically, these prior art software products, provide a methodology which allows the screen of a master computer to display an image of the screen of a slave computer. Optionally, the keyboard and mouse of the master computer can provide inputs to (and thereby control) the slave computer as well.

As communication over wide area networks, such as the Internet, becomes faster, it becomes practical to distribute certain functionality across the network.

For example, in an article entitled "More Data at Twice the Speed", San Jose Mercury News, page C1, Mar. 1, 1996, it was reported that three separate research teams designed a system for transmitting one trillion bits of information per second (a "terabit"). The three teams were Fujitsu Laboratories, AT&T/Bell Labs, and the Japanese communications conglomerate, NTT. This data rate, corresponding to the transmission of one thousand copies of a 30-volume encyclopedia in a single second, permits the practical storage of data at sites remote from a user. For example, Charles Brackett, Executive Director of Optical Networking Research at Bell Communication Research in New Jersey, indicated, in the aforementioned article, that: "This will create huge changes in corporate America . . . . Once we get that kind of capacity in the field, you might just as well have your database in California if you are a bank in New York, as have it next door. Data will move that fast between the two."

While the prior art has contemplated the remote storage and retrieval of data, it has not addressed the concept of distributing computational power on a wide area network such as the Internet, in such a fashion that maximizes efficiencies and reduces costs. The standard model for interacting with the Internet is still a costly stand-alone personal computer. While there has been some discussion of a low cost "Internet box", such devices have heretofore been considered low-power "appliances" capable of only simple tasks, and primarily dedicated to "browsing" the WWW. Such "Internet boxes" have not heretofore been thought of as replacements for costly, stand-alone personal computers.

DISCLOSURE OF THE INVENTION

The present invention permits virtually the entire functionality of a computer system to be made accessible to a wide area network such as the Internet. More particularly, the present invention permits a computer system to be run as a "virtual machine" through a web page provided at a web site on the World Wide Web (WWW). This permits the computing functionality to be distributed across a wide area network, such as the Internet. In addition, computers can be grouped into clusters on a network. Each of these computers is a "Network Accessible Computer" or NAC™ that is controlled by a Cluster Administration Computer or CAC™ for selective access by another computer coupled to the network via that computer's web browser. Furthermore, by spatially distributing the TCP/IP compatible node, a robust, yet flexible, network is created. In a preferred embodiment of the present invention, earth orbiting satellites are used to repeat and originate TCP/IP compatible data packets for transmission to other earth orbiting bodies and to nodes that are below earth orbits or at earth levels.

The apparatus of the present invention includes a number of computers arranged in a wide area network (WAN) such as the Internet. At least one of the computers has at least one unique address designating a web site. A host computer system (which may or may not be one of the computers on the Internet) can be "posted" onto an "advertising" web page at the web site to permit other computers coupled to the Internet to interact directly with the host computer system. The computer "posted" on the web page is referred to as the "host" or "advertiser" computer, and computers accessing the host computer are referred to as "client" or "user" computers. Having the host computer posted on a web page creates a "virtual computer" that can be view and/or controlled by the client computers. Once the connection has been made between the host computer and one or more client computers, the web page is bypassed, i.e. the two or more computer systems communicate through the Internet without necessarily going through the web site supporting the "advertising" web page.

A client computer (which may or may not be one of the computers on the Internet) can interact with a host computer via the Internet in varieties of ways. For example, the client computer can be used to simply monitor the screen of the host computer. Alternatively, the client computer can be used to both monitor the screen of the host computer and to provide inputs to the host computer via a keyboard, mouse, or other input device. This, in certain circumstances, allows the client computer to control the functionality of the host computer. For example, the client computer can run a program on the host computer which provides the client computer with the aforementioned "virtual machine" on the Internet with computational powers that can be far greater than that provided, for example, by Java Applets. Also, the client computer can merely provide inputs to the host computer, without visual feedback, such as in a "blind bid" arrangement.

The present invention also allows a multiplicity of client computers to access the "virtual machine" via the Internet. This, in effect, allows multiple computer users to control a single host computer at a remote site. This can be very useful for collaborative activities performed over the Internet. Alternatively, a multi-tasking operating system on a host computer (such as Windows NT™ from Microsoft Corporation) would allow each window to be a "virtual machine" for one or more client computers.

The present invention also provides a method and system for providing distributed computing power within a wide area network. More particularly, computing power can be provided by "clusters" of computers coupled to the Internet. These clusters each include a cluster administration computer (CAC), and one or more network-accessible computers (NACs). Both the cluster administration computer and the network-accessible computers are preferably coupled to a TCP/IP protocol network such as the Internet or an Intranet. The network-accessible computers can share mass storage (such as a large disk drive or an array of large disk drives), and are monitored by the CAC to ensure that they are operating properly. If the CAC detects a malfunctioning in one of the NACs, that NAC can be re-booted and re-initialized to bring it back "online." Alternatively, the cluster can be reduced to a single network-accessible computer (without a CAC), which is coupled to the Internet to be used as a virtual machine by others.

With a network-accessible computer and/or a "cluster" of network-accessible computers, great computational and storage efficiencies are obtained.

For example, since a typical stand-alone personal computer is only used a few hours of the day, by having network-accessible computers on the WWW it is possible to reduce the total number of computers required to service the many individual users. For example, computers that would normally be idle in one time zone can be used by users in another time zone. Furthermore, the cost per computer that is part of a cluster will be less than that of comparable stand-alone personal computers since certain common resources, such as mass storage, power supplies, modems, etc., can be shared among the computers of the cluster.

Since it is desirable for users to have the same type of experience with a network-accessible computer as with their own personal computer, there is the provision for the storage of "personal states" on the Internet. The personal states store, as a minimum, a user's data and/or other files so that they can access them from anywhere on the Internet. In addition, the personal state preferably also includes the "states" of the computers that they last used so that when they access a network-accessible computer of the same type in the future, it would appear just as they left it. For example, when a user accesses a Macintosh NAC on the Internet, the personal state for the last use of a Macintosh is retrieved so that the file structure, folders, and even the states of the registers in the CPU would be the same as the last time they used a Macintosh NAC.

It should be noted that a "user" within the context of the present invention need not be a human being. For example, a user of the present invention can be a software program which "lives on" or is inserted onto the Internet. This "virtual person" can inhabit NACs and use other service of the Internet up to its ability to pay for those services. For example, there can be a "handyman" virtual person that lives on a NAC and which advertises its services on the WWW of, for example, maintaining hard disk drives, monitoring the Internet for information pertinent to a human or another virtual user, etc. Human users or other "virtual users" can pay (via a credit transfer) the virtual person for providing these services, such that the virtual person begins to accumulate wealth. This wealth can be used to pay for the NAC home for the virtual user, can be used as capital for increasing the virtual user's business, can be used to upgrade the "home" of the NAC as it moves to ever more powerful NACs on the network, can provide start-up capital for the virtual user to create "offspring" on the Internet, and, very likely, can transfer this wealth to the creators of the virtual user or their designees.

It should be noted that the methods and apparatus of the present invention are primarily discussed with reference to the Internet or the WWW. It should be appreciated that these same methods and apparatus can be extended to smaller or "local area networks" (LANS) as well. For example, many companies have created "Intranets", i.e. private networks subscribing to the Internet's TCP/IP protocol and capable of supporting web page structures. The present invention is equally applicable to such smaller networks as well.

By providing a plurality of mobile "nodes", a flexible, yet robust, network is created. These nodes can be on land, on bodies of water, in the air, orbiting the planet, etc. The advantage of having multiple, mobile nodes is that spatially broad network coverage can be provided in a robust and efficient manner. Data (e.g. TCP/IP compatible data packets) are received by a node, and then are retransmitted if: 1) they have not timed out; 2) they have not already been properly received by the node; and 3) if they are not for that node. In this way, the data transmission path can be dynamically re-routed as nodes move or as transmission conditions change.

An advantage of the present invention is that much greater computational power is accessible by users of the Internet and the WWW. The present invention will, for example, allow a client computer user to diagnose and fix problems on a host computer, run application programs that are available on the host computer, perform maintenance on the host computer, etc. Furthermore, users from multiple client computers can access a single host machine to permit collaborative or multiple individual efforts on that computer system.

A further advantage of this invention is that computing power can be distributed widely over the Internet to increase computational efficiency and functionality, and to reduce overall costs. Since a simple Internet access computer can be used to control a computer of any desired power or functionality, the need for the stand-alone personal computer is much diminished. Also, since the computing power can be shared among a number of users, the cost per user is greatly reduced. For example, if a user uses his personal computer only about 20% of the time, he can experience great cost savings by sharing computers on the Internet with other users.

Yet another advantage of the present invention is that "virtual users" (sometimes referred to as "intelligent agents" or "robots") can be supported by the Internet to permit robotic type work to be performed for the ultimate benefit of human users. These virtual users can operate autonomously, can generate wealth, can reproduce, and can work in concert with or for other virtual users.

A still further advantage is that mobile node networks can be conveniently implemented to provide a robust, spatially broad, and efficient network for the transmission of digital information such as TCP/IP compatible data packets.

These and other advantages of the present invention will become apparent upon reading the following detailed descriptions and studying the various figures of the drawings.

BEST MODES FOR CARRYING OUT THE INVENTION

Figure 1:
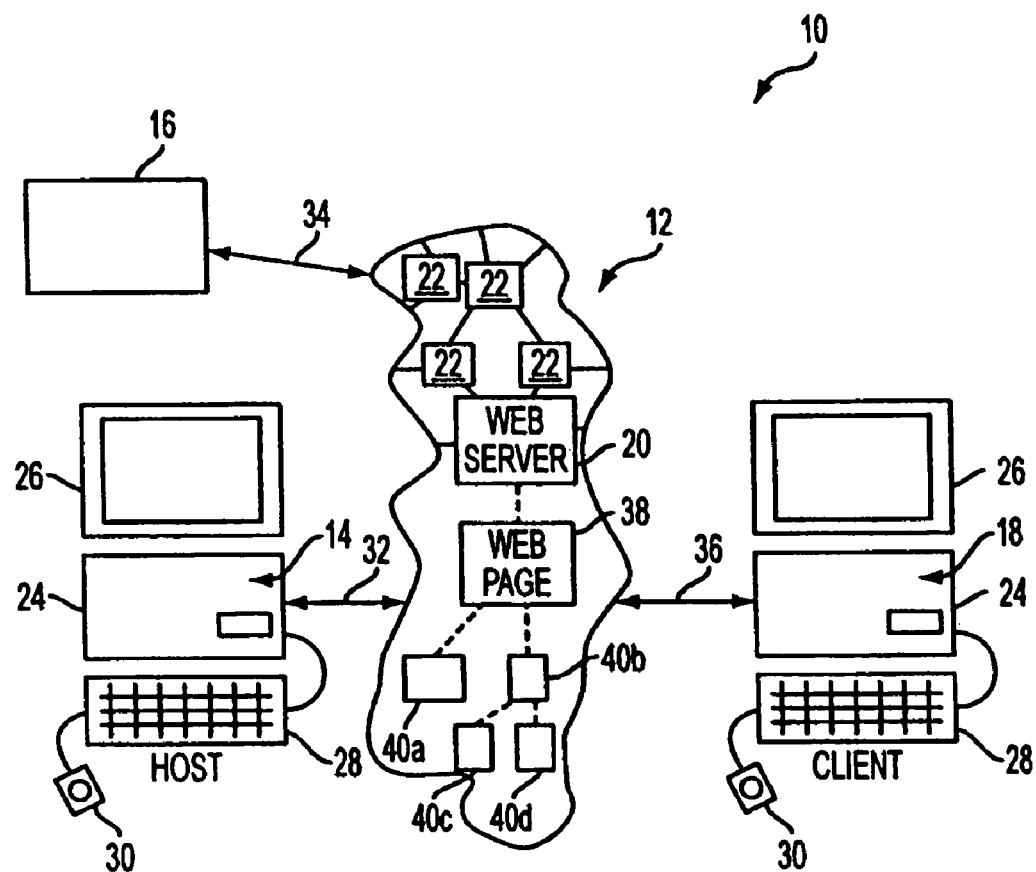
FIG. 1 is an illustration of an apparatus of the present invention.

In FIG. 1, a system 10 for controlling a computer over a wide area network such as the Internet 12 includes a number of computer systems, such as computer systems ("machines") 14, 16, and 18, that are coupled to the Internet 12. By implementing the processes, apparatus, and systems of the present invention, one or more of the computer systems 14–18 can monitor and/or access virtually the entire functionality of any other computers 14–18 connected to the Internet 12. It should be noted that, for the most part, any reference to the Internet also would apply to a private Intranet that uses the Internet's TCP/IP protocols, or any other network that uses TCP/IP compatible protocols.

It should be noted that the semantics used herein can have multiple meanings. Looked at in one way, the machines 14, 16, and 18 are outside of the Internet 12 and communicate with the Internet by communication links. Looked at in another way, when the machines 14, 16, and 18 become a part of the Internet 12, i.e. the bubble surrounding the Internet 12 expands to include these machines. However, for the purpose of the present descriptions, a machine (i.e. a computer system) will be considered to be part of the Internet 12 if it examines and passes packets intended for other machines (e.g. a router, switch, or computer such as an Internet Access Provider), and it will be considered to be merely connected to the Internet if another machine on the Internet (e.g. an Internet Access Provider) only passes the connected machine packets intended for that connected machine. Also, the term "machine" will refer generically to a number of types of digital devices, but will usually refer to a general purpose computer.

While the preferred wide area network of the present invention is the well-known Internet, it should be noted that other network systems capable of supporting the processes and apparatus of the present invention can also be utilized as an intermediary area between one or more computer systems 14–18. For example, other WANS such as cabled WANS (both private and public), wireless WANS, fiber-optic WANS etc. can also practice the present invention with suitable modifications to the base processes that would be apparent to those skilled in the art. However, a preferred network protocol is the well-established TCP/IP protocol of the Internet and many corporate Intranets.

As noted previously, the origins of the Internet dates back several decades to a U.S. government sponsored military/education/business wide area network designed to survive the worst of catastrophes. The Internet includes a large number of linked computer systems, which will be referred herein as "web servers" such as a specified web server 20 and many other interconnected web servers 22.

In FIG. 1, web server 20 is shown to be "within" the Internet 12, i.e. it is connected as a node within the Internet as defined above. The architecture and operation of the Internet are well-known to those skilled in the art. For a description of the Internet and of the World Wide Web ("WWW") supported by the Internet, see *HTML Publishing on the Internet*, Kenny Chu and Francis Chin, McGraw Hill, 1996, the disclosure of which is incorporated herein by reference.

Each of the computer systems 14–18 typically include a processor unit 24, a video display ("monitor" or "screen") 26, a keyboard 28, and a "pointing" device such as a mouse 30. Computer systems such as computer systems 14–18 are well-known and are commercially available from a variety of manufacturers. In the following descriptions, the computer systems are described primarily in terms of Macintosh computer systems, although it will be appreciated by those skilled in the art that Microsoft Windows/Intel Microprocessor ("WINTEL") compatible computer systems, SUN and HP workstations, etc. can provide the same type of functionality.

The computer systems 14, 16, and 18 can be coupled to the Internet 12 (and could be considered to become a part thereof) in a variety of fashions. These Internet connections are shown generically at 32, 34, and 36, respectively. For example, the computer system 14 may be connected to a web server 20 or 22 on the Internet 12 with a modem and telephone line, a digital connection such as an ISDN telephone line, through the intermediary of a local area network (LAN), etc. Methods and apparatus for coupling computer systems such as computer systems 14–18 to the Internet are well-known to those skilled in the art.

The various "web servers" on the Internet are simply computer systems of any type which conform to the well-known Internet communication protocols. These web servers have a tremendous variations in computing power, ranging from personal computers to mainframe computers. These web servers often include monitors, keyboards, mice, etc. However, the web servers 20 and 22 can simply be a "box" on the Internet 12 with limited or no local input or output capabilities.

As it is well-known to those skilled in the art, the Internet 12 can be accessed by computers 14–18 using a number of protocols. One of the easiest and most popular user interfaces is known as the World Wide Web (WWW) which is described, inter alia, in *HTML Publishing on the Internet*, supra. With the WWW, a web server 20 can support one or more "web pages," such as web pages 38, 40*a*, 40*b*, 40*c*, and 40*d*. A web page is a software construct of "object" includes an interface written in HTML which permits text and images to be presented to a computer system that is coupled to or part of the Internet 12. A web page can include "hyperlinks" to other web pages, both on its local web server 20 and throughout the Internet 12. A "web site" on a web server 20 contains one or more web pages where a "base" or "home" page is the first or entry page into a desired web site. For example, the home page illustrated in FIG. 1 is the web page 38 which is linked via hyperlinks to additional web pages 40*a*–40*d*.

The method and apparatus of the present invention permits computer systems ("clients" or "users") to monitor or control the functionality of other computer systems ("hosts" or "advertisers") connected to the Internet 12 (such as computers 14–18), or which are a part of the Internet 12 (such as the web servers 20 and 22). As described herein, the "host" or "advertiser" machine becomes a "virtual machine" on the Internet 12 which can be accessed by the "client" or "user" machine. It should be noted that on the client or user side that any computer or machine ("platform") will be able to subscribe to a virtual machine, provided by any host platform. Thus, seemingly incompatible hardware could be used in concert; e.g. a WINTEL machine can be used as a client for a Macintosh host machine. In addition to providing great computational power through the Internet 12, the posting of a "virtual machine" on the Internet permits the client machine to be relatively low powered, i.e. an inexpensive computer system having a less powerful microprocessor, less memory, fewer peripherals etc. than the "virtual machine" provided by the host computer system.

As will be discussed in greater detail subsequently, and by way of example, the method and apparatus of the present invention permits a client computer system 18 to take over the functionality of a host computer system 14 such that the keyboard 28 and mouse 30 of computer system 18 provides inputs to the computer system 14, such that images on the monitor of computer system 14 are replicated on the monitor 26 of the computer system 18. In this way, a "virtual machine" appears to be running on the monitor 26 of the client machine. In reality, the processing power and resources of the host system 14 are providing the "virtual machine" for the client computer system 18.

It should be noted that other inputs and outputs of the host machine 14 can also be sent and received by the client computer 18. For example, sounds generated by the computer system 14 can be "played" through the Internet 12 on computer system 18, while other inputs to computer system 18 (such as inputs from a tablet, not shown) can be transmitted for processing by the computer system 14. The capturing of outputs such as sounds and their transmission over the Internet is well known to those skilled in the art. Likewise, the transmission of other data representing inputs over the Internet would be well within the scope of those skilled in the art.

Figure 2:
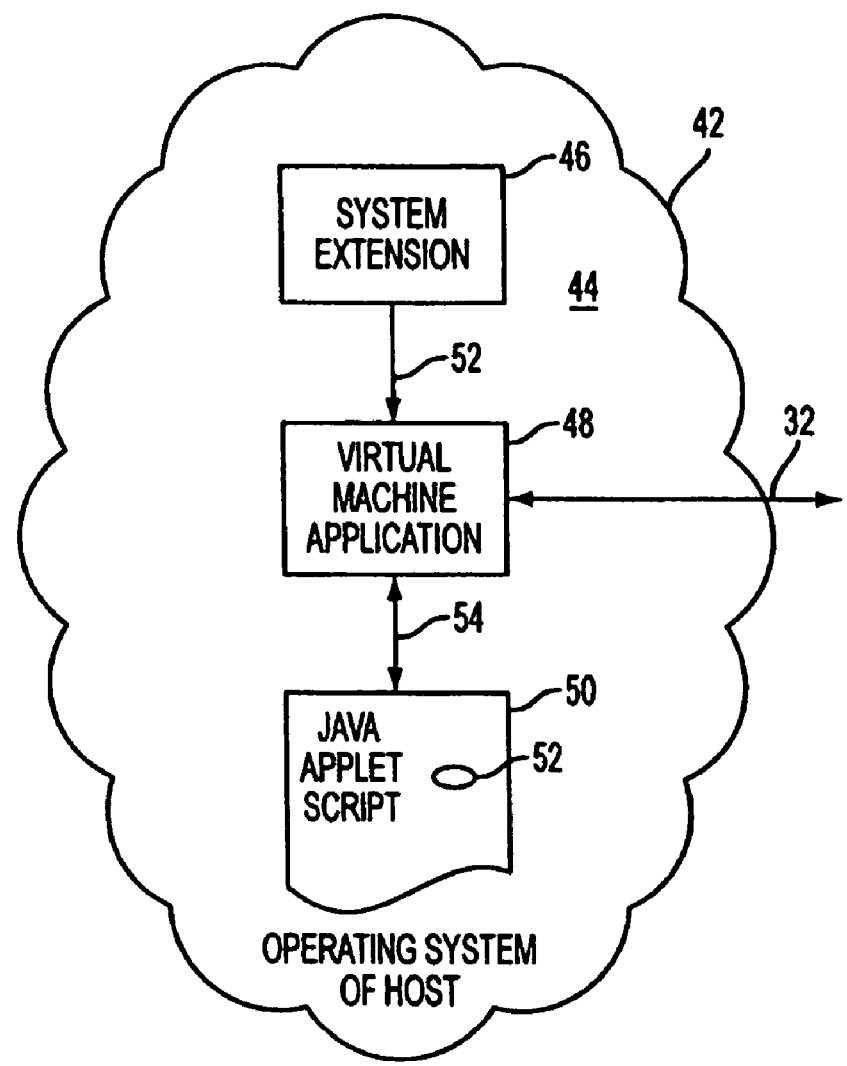
FIG. 2 is an illustration of the processes running on a host computer system of FIG. 1.

FIG. 2 illustrates a process 42 that can run on a host computer system, such as computer system 14. In a preferred embodiment of the present invention, the process 42 can originate entirely from a "host machine" i.e. from a host computer such as computer system 14. In other embodiments of the present invention, processes of the present invention may be distributed over the Internet to, for example, the web server 20 or to a client machine, such as on computer system 18.

In the process 42 of FIG. 2, an operating system 44 of the host supports a "system extension" 46, a virtual machine application 48, and a Java Applet script 50. The virtual machine application communicates with or becomes part of the Internet 12 over the link 32 as described previously.

The system extension 46 is also known, in the Macintosh world, as an "init." The system extension 46 is patched into the operating system 44 of the host computer system at system boot-time ("during power-up"). As such, the system extension 46 becomes part of the operating system of the host and "patches", "modifies", and "enhances" the functionality of the operating system. The purpose of the system extension 46 and the process 42 of the present invention will be discussed in greater detail subsequently.

The virtual machine application 48 is a computer program or "process" running from a host computer system, such as computer system 14. A virtual machine application is therefore started in a standard fashion to other application programs running on personal computer systems. For example, a computer system using a graphical user interface ("GUI"), an application program may be started (sometimes referred to as "executed", "evoked", "launched" etc.) by selecting and activating an icon representing the application program with a pointer controlled by an input device such as a mouse. Alternatively, the virtual machine application can be started by a number of other conventional techniques, such as with a selection from a pull-down menu, the entry of the name of the program on a command line, by a use of an alias, etc. The virtual machine application receives information from a system extension 46 as indicated by the arrow 52 and communicates with the Internet 12 via the communication link 32.

The Java Applet script 50 is a piece of "dead code" on the host computer system, i.e. it is not executed on the host computer system. Embedded in the Java Applet script is the Internet address 52 of the host machine. The virtual machine application 48 is preferably capable of changing the Java Applet script in that it can modify the script based on a number of criteria, and can also send the Applet onto the Internet 12 via the link 32. The virtual machine application 48 and the Java Applet script 50 interact as indicated at 54.

In other words, the virtual machine application 48 preferably generates a Java Applet script 50 by embedding the Internet address of the host machine as a constant in an existing Java Applet script 50 which has an undefined value for the Internet address. The completed Java Applet script 50 executes on the client machine and is described with reference to FIG. 20. The virtual machine application 48 can send the Java Applet script 50 onto the Internet 12 via the link 32.

Figure 3:
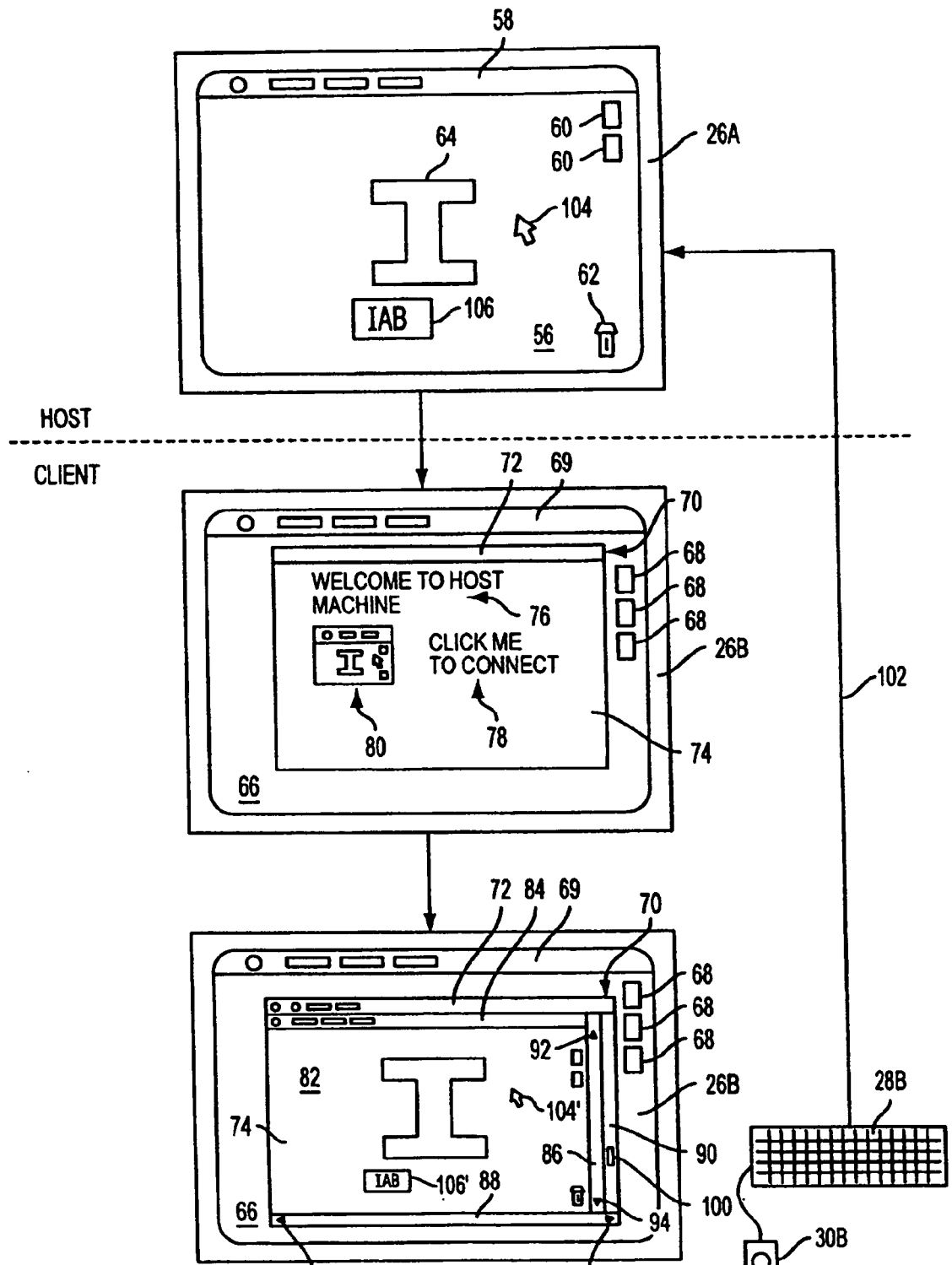
FIG. 3 is an illustration of the screen of a host computer and corresponding screens of a client computer of the system of FIG. 1.
Figure 3A:
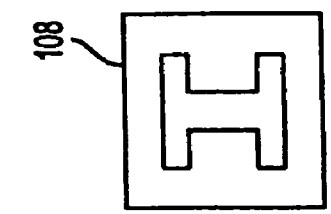
FIGS. 3a–3d illustrate four modes of interaction with the host machine of the system of FIG. 1
Figure 3B:
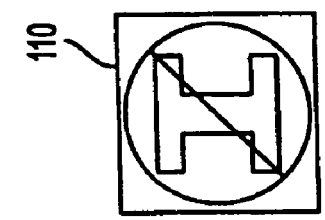

In FIG. 3, a monitor 26a of a host computer (such as a host computer system 16) and the monitor 26b of a client computer (such as client computer 18) are illustrated. The host computer monitor 26a includes a screen 56 displaying a number of images. More particularly, the screen 56 displays a menu bar 58, a number of icons 60 and 62, and one or more images 64. A monitor 26b of the client includes a screen 66 that can include a number of icons 68, a pull-down menu bar 69, and a "browser" window 70. An acceptable browser of the present invention is the popular Netscape™ browser made by Netscape, Inc. of Mountain View, Calif. having built-in Java capabilities.

The window 70 created by the browser includes a menu bar 72 and a page display area 74. In this instance, the display area 74 shows the "home page" created by a host machine, such as computer system 14. The home page 74 includes a greeting 76, instructions 78, and an icon 80. This icon 80 can be any suitable icon, such as a picture of a computer, or it can display the actual image displayed on the screen 56 of the host computer monitor 26a. In the latter instance, the icon 80 can be static or dynamic, i.e. the image displayed by the icon 80 can be a "snap shot" of the display on screen 56 at a particular point in time, or it can be dynamically updated to show changes in real time being made to the display of the monitor 26a.

At the bottom of FIG. 3, the monitor 26b shows the screen 66, icon 68, and pull-down menu bar 69 of the client computer system. Shown displayed on the screen 68 is the web browser window 70 having the menu bar 72. However, within the web browser 70 window area 74 is the image of the screen 56 of the host computer forming a "virtual computer" window 82. The virtual computer window 82 includes a pull-down menu bar 84, a vertical pan bar 86, a horizontal pan bar 88, and a zoom bar 90. The image within the virtual window 82 is at least a portion of the image displayed on the host computer monitor 26a. However, due to space and resolution limitations, the virtual computer window 82 may not be large enough or have a high enough resolution to show the entire image on the screen 56 of the host computer monitor 26a. For this reason, the vertical pan 86 includes scroll buttons 92 and 94 to allow an up and down vertical scrolling ("vertical panning") of the image displayed in the virtual computer window 82, the horizontal scroll bar 88 includes left and right scrolling buttons 96 and 98, respectively, to permit a left and right lateral scrolling ("lateral panning"), and a sliding zoom control 100 permits a zooming in and zooming out of the image displayed within the virtual machine window 82 to accommodate more and less of the image displayed on the screen 56 of the host machine 26a.

It will be apparent from the diagram of FIG. 3 that the image on the screen of the host computer 26a can be viewed within the virtual machine window 82 of the client machine monitor 26b. In addition, computer inputs from the client keyboard 28b and the client mouse 30b are coupled as indicated by the arrow 102 to the host computer to control the functionality of the host computer. Therefore, by way of example, movement of the client computer mouse 30b can control the position of a pointer 104 on the screen 56 of the host computer 26a. Also typing on the keyboard 28b of the client computer can, for example, input alpha-numeric characters into a window 106 of the host computer. Of course, such inputs will results within the virtual machine window of the client computer, i.e. the display pointer 104' will move and characters will appear within a window 106' within the virtual machine window 82 of the client computer.

It will noted that the present invention makes use of the Java programming language provided by Sun Microsystems, Inc. of Mountain View, Calif. As it will be apparent from the following descriptions, this provides a convenient method for implementing the processes and systems of the present invention from a host computer. Alternatively, other processes of the present invention will distribute the computational tasks among various web servers 20 and 22 on the Internet 12 and/or distribute computational tasks to a client computer, such as computer system 18. Such distributed systems and processes are considered to be equivalents within the scope of the present invention.

As it is well known to those skilled in the art, the terms "click", "select," and the like refer to the act of using a pointer, such as a mouse 30B, to position a pointer icon, such as a pointer icon 104, on a computer screen, such as computer screen 56, and then activating ("clicking") a button to cause an action at the location pointed to by the pointer icon 104. For example, clicking can press a button, open a file, activate a program, draw a line, etc. By "post" or "posting", it is meant that a computer implemented process is executed which causes a host machine coupled to the Internet to become available as a "virtual machine" on the Internet. The "virtual machine" refers to the fact that a fully functional computer appears to be available in the virtual machine window 82 of the client machine when, in fact, the actual computer can be anywhere on the Internet or can be any computer coupled to the Internet. For example, the virtual machine functionality may be provided by the computer system 14, the computer system 16, the web server 20, or any of the web servers 22 as long as they subscribe and implement the "virtual machine" protocols and processes of the present invention.

Figure 3C:
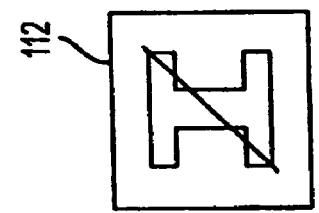
Figure 3D:
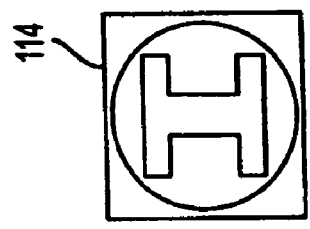

In FIGS. 3*a*–3*d*, various icons that can be displayed on the web page 74 for the "virtual machine" implemented by computer system 14 are illustrated. These icons can be used in place of icon 80 of FIG. 3, or in addition to icon 80. Icon 108 of FIG. 3*a* indicates that the "virtual machine" representing computer system 14 will permit complete input and output access to the computer system 14. The icon 110 of FIG. 3*b* indicates that no input or output is permitted to the computer system 14. This icon might be present, for example, if computer has already been pre-empted by another user (client) and if collaboration is not permitted. In FIG. 3*c*, the icon 112 indicates that no output is allowed from computer 14, but that inputs via keyboard, mouse, etc. are permitted. This mode might be permitted in blind bid or posting situations. In FIG. 3*d*, icon 114 indicates that outputs from the computer system 14 are permitted, but that inputs are not permitted. In the mode illustrated in FIG. 3*d*, the user of computer system 18 is essentially monitoring ("eavesdropping on") the computer system 14, but is not permitted to modify or influence its operation.

Figure 4:
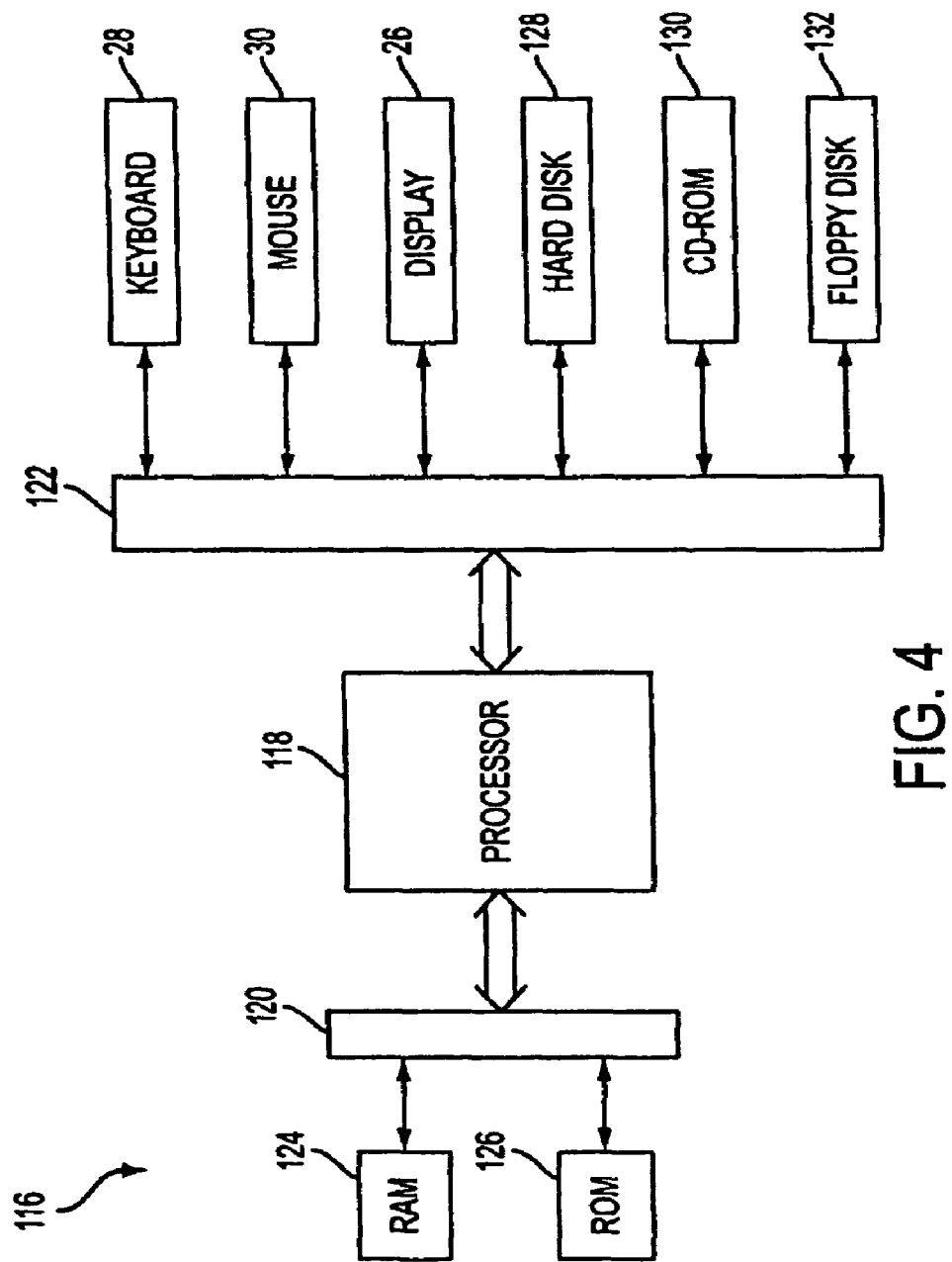
FIG. 4 is a block-diagram of an exemplary computer system in accordance with the present invention.

As noted from the above discussion, there are many "computer systems" involved in a wide area network such as the Internet. These computer systems include the computer systems 14–18 and some of the web servers 20 and 22. An exemplary block diagram of a single such computer system is shown in FIG. 4. More particularly, a computer system 116 in accordance with the present invention includes a processor 118, a high speed memory bus 120, and an input/output (I/O) bus 122. The processor 118 is coupled to both the memory bus 120 and the I/O bus 122. Coupled to the memory bus is typically random access memory (RAM) 124 and read only memory (ROM) 126. A number of "peripherals" can be coupled to the I/O bus including the keyboard 28, the mouse 30, the display 26, a hard disk 128, a CD ROM 130, and a floppy disk 132. Of course, various driver cards and driver protocols ("drivers") may be required for the various peripherals as well as special drives and media as it is well known to those skilled in the art.

Figure 5:
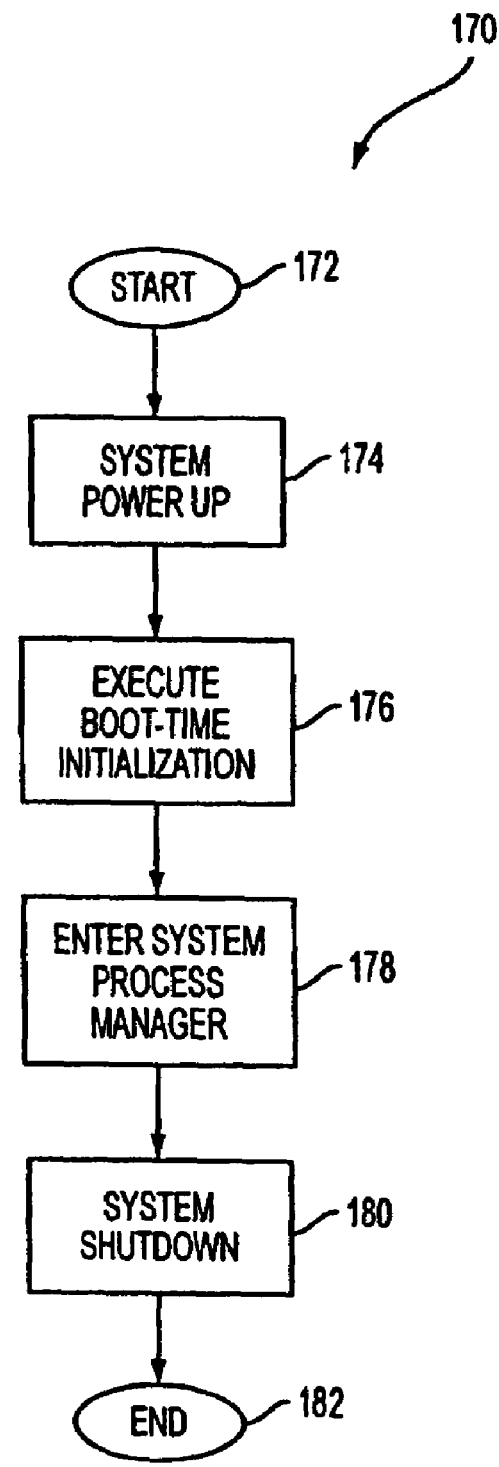
FIG. 5 is a flow-diagram illustrating a process of providing the virtual machine functionality on the World Wide Web.

FIG. 5 illustrates the operation of a host computer system with the extension 148 installed. More particularly, a process 170 in accordance with the present invention begins at 172 and, in a step 174, the computer system (such as system 14 in this example) is "powered up." Next, in a step 176, boot-time initialization occur wherein resources are allocated and various extensions, patches, libraries, etc. are loaded into the operating system. Next, in a step 178, the system process manager is entered. It is during the step 178 that the process of the present invention is implemented by a user of the computer system. Finally, in step 180, there is a system shut down wherein the resources are de-allocated and files are closed in a systematic matter. The process 170 is completed at 182.

Figure 6:
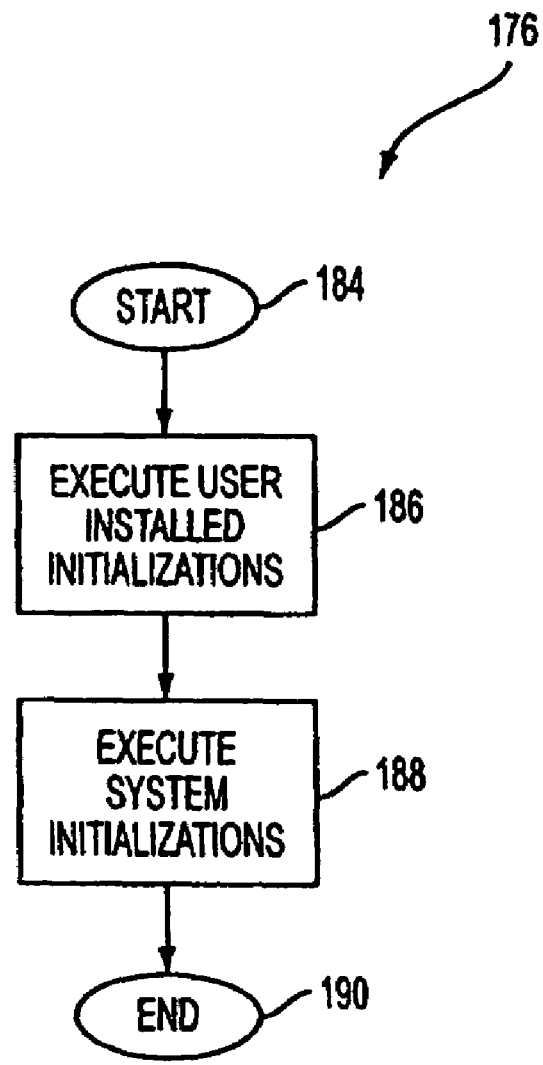
FIG. 6 is flow-diagram illustrating the "Execute Boot-Time Initialization" step of FIG. 5 in greater detail.

In FIG. 6, step 176 of FIG. 5 is illustrated in greater detail. More particularly, process 176 begins at 184 and, in a step 186, the user installed initializations (such as the extension 148) are installed to the operating system. Next, in a step 188, the system initialization are executed. The process 176 is then completed at 190.

Figure 7:
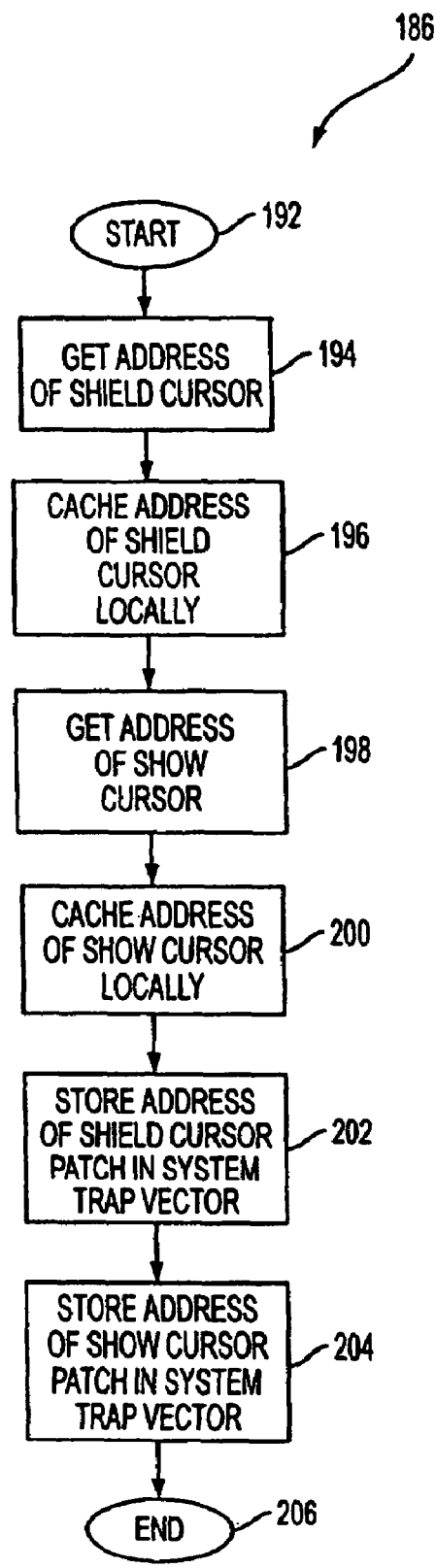
FIG. 7 is a flow-diagram illustrating the "Execute User Installed Initialization" step of FIG. 6.

In FIG. 7, the step "Execute User Install Initialization" of FIG. 6 is described in greater detail. More particularly, process 186 begins at 192 and, in a step 194, the address of the "shield cursor" function is obtained. Next, in a step 196, the address of the shield cursor function is stored locally, e.g. is stored on the hard disk of computer system 14. Next, in a step 198, the address of the "show cursor" function is obtained. The address of the show cursor function is then stored locally as indicated in step 200. Next, the address of the shield cursor patch is stored in the system trap vector in a step 204, and the address of the show cursor patch is stored in the system trap vector in a step 204. The process is completed at 206.

The process 186 is an illustration of the installation of one of the extensions, such as the extension 148. There are likely other extensions that are also being installed in a step 186. The installation of extensions into operating systems, such as the Macintosh operating system, is known to those skilled in the art and is fully disclosed in the multi-volume reference set, *Inside Macintosh*, by C. Rose et al., Addison-Wesley Publishing Company, Inc., July 1988 et. seq., the entire set of which is incorporated herein by reference.

One purpose of the extension 148 installed by process 186 is to "patch" the system such that calls for "shield cursor" and "show cursor" are intercepted and modified. This allows the patch of the present invention to determine when and how the visual output of the host computer is being modified. The operation of the trap vector, the shield cursor, and the show cursor are well known to those skilled in the art. These processes are extensively documented in the aforementioned multi-volume reference set, *Inside Macintosh*, supra.

Figure 8:
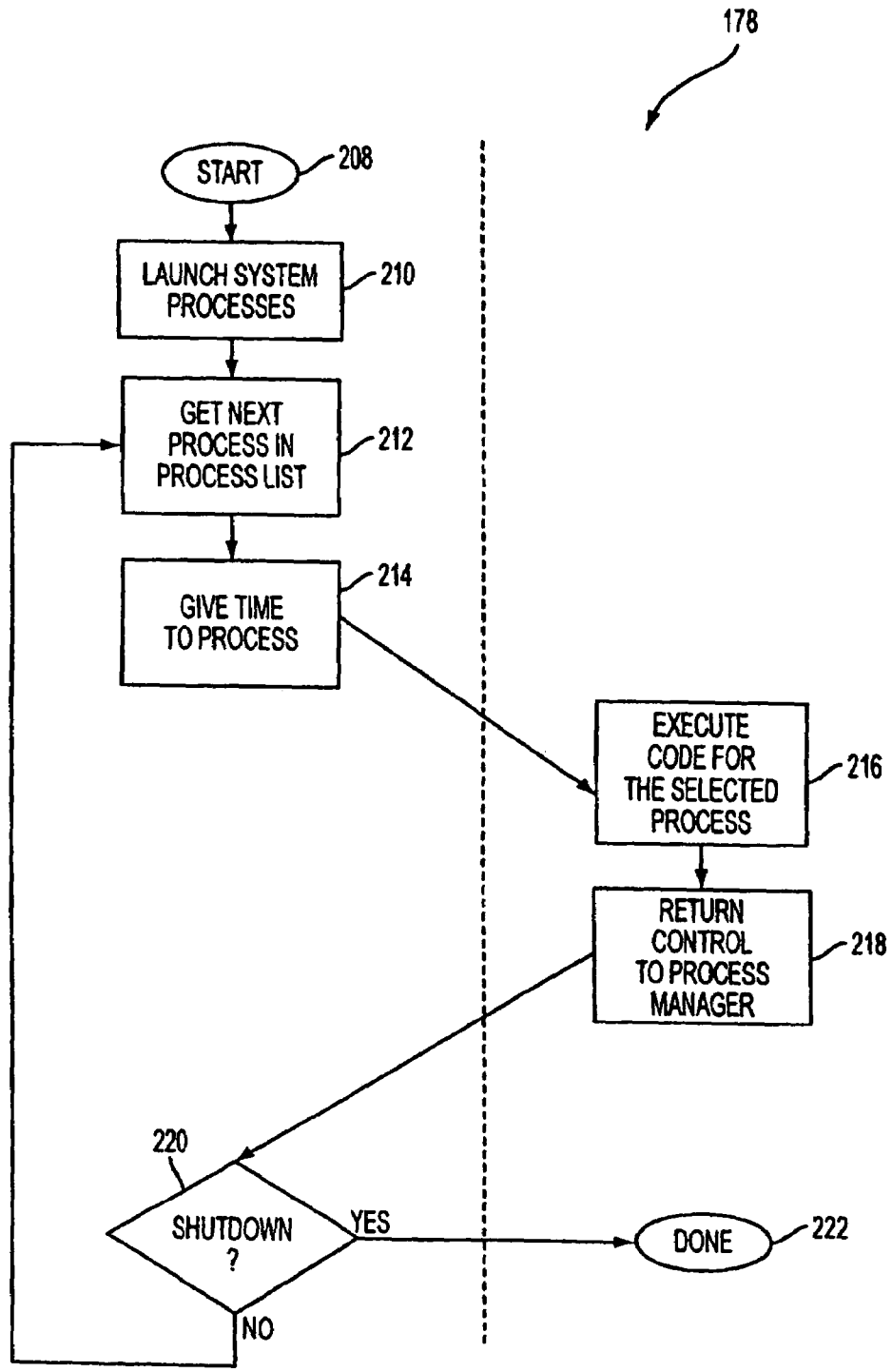
FIG. 8 is a flow-diagram of the "Enter System Process Manager" step of FIG. 5.

In FIG. 8, step 178 of FIG. 5 is described in greater detail. The process 178 is the main operating process of the computer system, such as computer system 14. The vertical broken line in FIG. 8 conceptually separates the process manager ("operating system") from the process being executed. The process manager is to the left of the broken line, and the process is to the right of the broken line. The process 178 begins at 208 and, in a step 210, the system processes are launched. For example, in the Macintosh computer system, the "finder" is one of the first system processes to be launched. The user, such as Mary, can then launch additional processes within the finder process itself.

The process 178 continues with the step 212 wherein the next process in the process list is obtained. A step 214 provides that next process time to execute, by jumping to a step 216. In the step 216, code for the selected process is executed on the computer system. In a step 218, control of the computer system is returned to the process manager and a step 220 determines if a shut down of the computer system has been requested. If not, process control is returned to step 212 to obtain the next process in the process list. If shut down is indicated, the process 178 is completed as indicated at 222.

Figure 9:
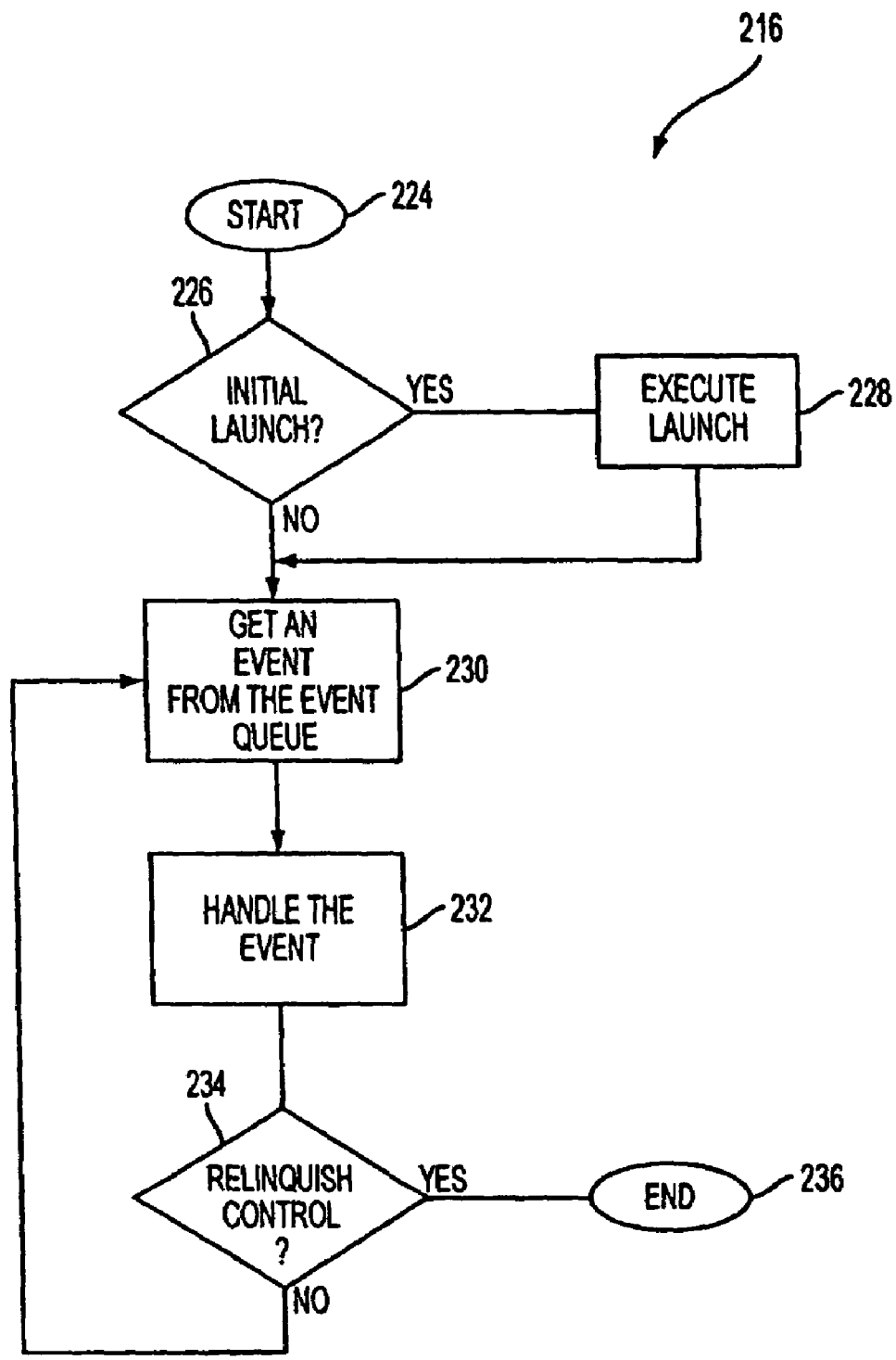
FIG. 9 is a flow-diagram of the "Execute Code For The Selected Process" step of FIG. 8.

In FIG. 9, step 216 "Execute Code for the Selected Process" of FIG. 8 is described in greater detail. Process 216 begins at 224 and, in a step 226, it is determined whether the process is just being launched. If yes, the launch is executed in a step 228. If this is not an initial launch of the process, or after the launch, as indicated by step 228, a step 230 retrieves an event from the event queue. Next, in a step 232, the event is handled, as described in *Inside Macintosh*, supra. A decision step 234 determines whether control should be relinquished. If not, another event is retrieved from the event queue in step 230. If control is to be relinquished as determined by step 234, the process is completed at 236.

It should be noted that the process 216 is generic to all of the multiple processes that may be running on the computer system at any one time. Therefore, this process can include general application program processes, as well as the virtual machine process of the present invention for providing a "virtual machine" on the Internet.

Figure 10:
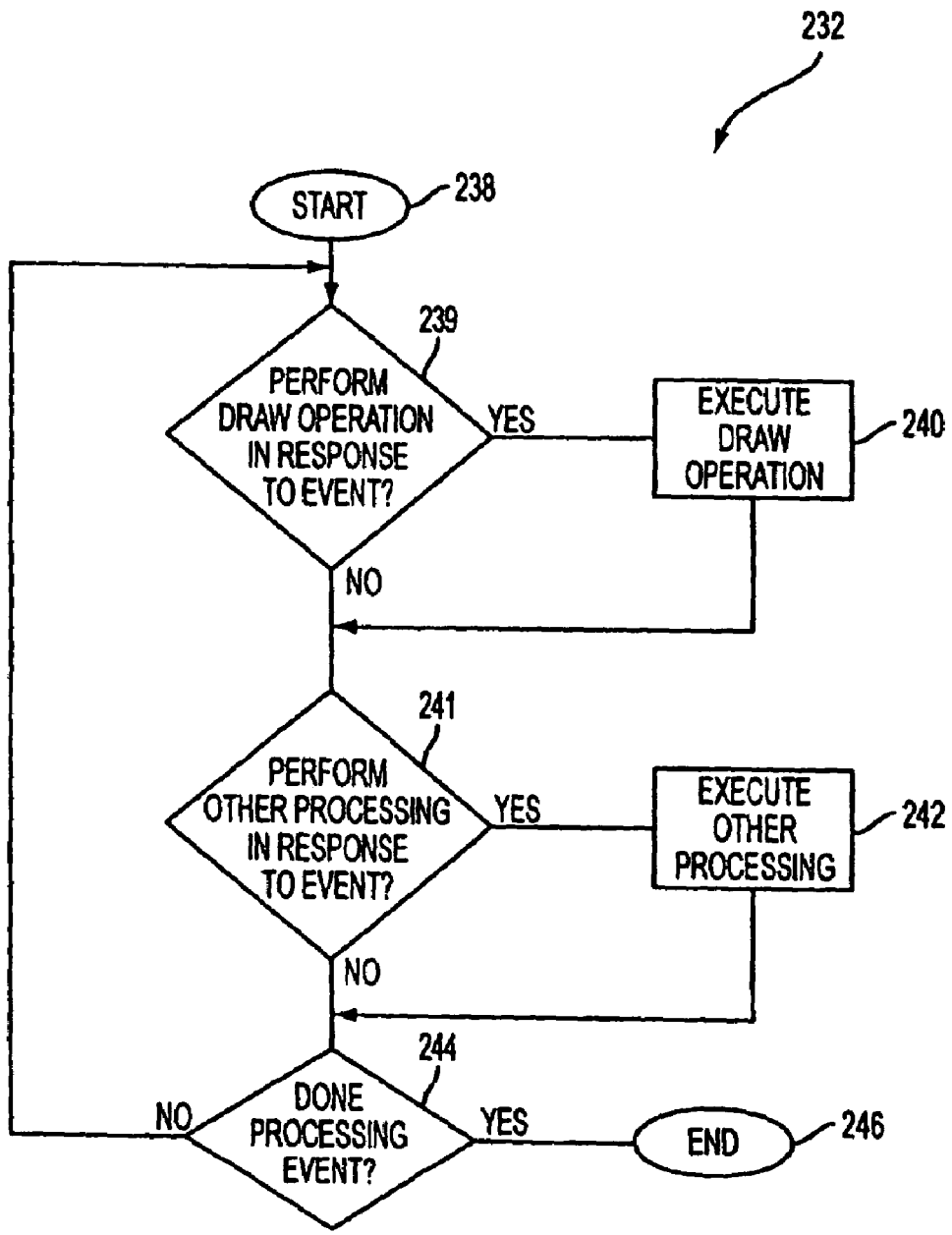
FIG. 10 illustrates the "Handle The Event" step of FIG. 9.

In FIG. 10, the step 232 "Handle the Event" of FIG. 9 is illustrated in greater detail. Process 232 begins at 238, and in a step 240, a "draw" operation is executed. Again, there is discussion of the "draw" operation in *Inside Macintosh*, supra. Next, in a decision step 242, it is determined whether there is any more drawing to be done. If yes, process control is returned to step 240. If not, other operations are performed in response to the event in a step 244. The process 232 is completed at 246.

The "Handle the Event" process 232 is designed to detect and intercept changes made to the video display (monitor) of the host computer system. As will be discussed in greater detail subsequently, this "Execute a Draw Operation" step 240 includes processes for detecting the draw operation and for passing on this draw operation to the client computer, over the Internet. This permits a client computer to display on its own monitor the results of the draw operation in its "virtual machine" window.

It should be noted at this point that while the preferred method for updating the screen of a local computer with changes made to the host computer display is as described, that there are other alternatives and equivalents to this process. For example, the video buffer of a host computer can be captured at regular intervals, e.g. every one-half second, and then sent over the Internet to the client computer. However, this would create delays in response at the client computer if the client computer was providing inputs to the host computer. For example, if the client was typing on the keyboard of the client computer, there would be an appreciable lag before the results of the typing into the "virtual computer" would be displayed. If, however, the local computer was simply being used to monitor (i.e. "eavesdrop on") the host machine, the up to one-half second delay would not be detrimental.

Figure 11:
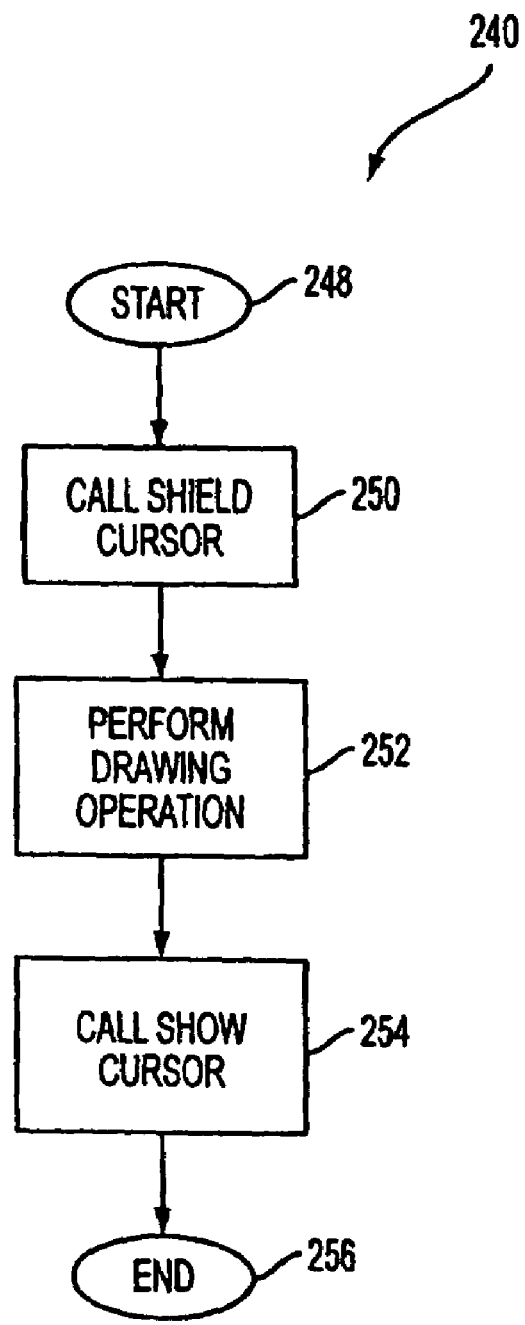
FIG. 11 is a flow-diagram illustrating one example of the "Execute A Draw Operation" step of FIG. 10.

One example of the step 240 "Execute a Draw Operation" of FIG. 10 is illustrated in FIG. 11. It should be noted that the "shield cursor" and "show cursor" system facilities have been patched by the extension 146 installed into the computer system by the process 186. Process 240 begins at 248 and, with a step 250, the shield cursor facility is called. Next, in a step 252, the drawing operation is performed. In a step 254, the show cursor routine is called, and the process is completed at 256.

Figure 12:
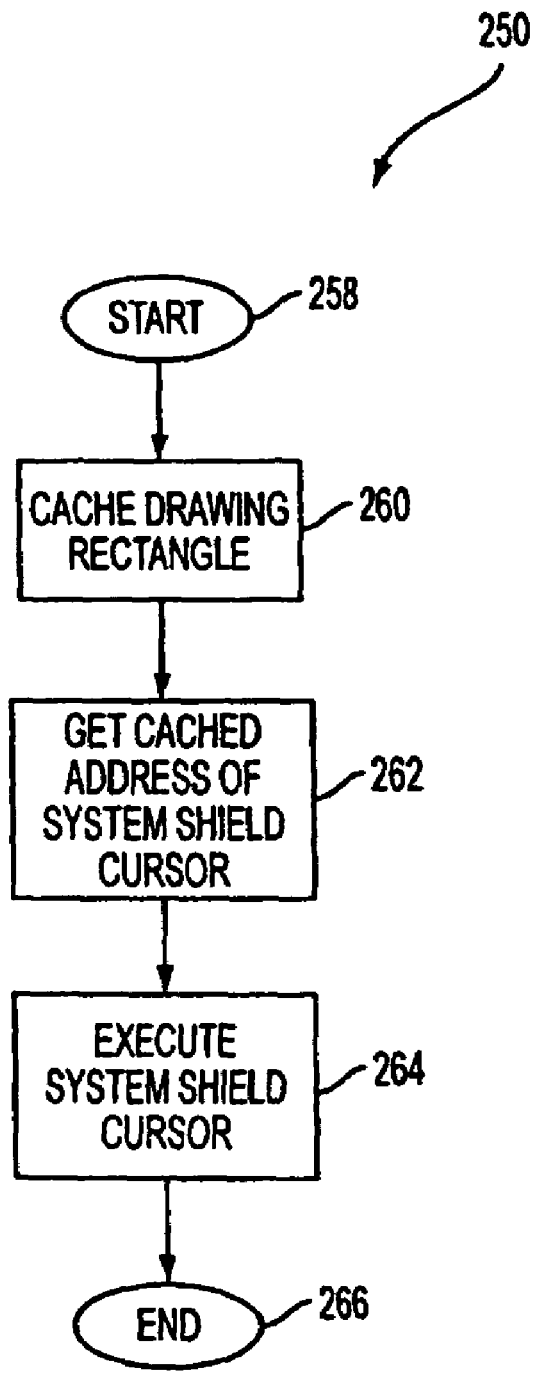
FIG. 12 is a flow-diagram illustrating the "Call Shield Cursor" step of FIG. 11.

In FIG. 12, the step 250 "Call Shield Cursor" of FIG. 11 is described in greater detail. The process 250 begins at 258 and, in a step 260, the drawing rectangle is "cached" (i.e. stored) on the computer system. Next, in a step 262, the cache address of the system shield cursor is obtained. A step 264 executes the system shield cursor facility, and the process is completed at 266.

It will be appreciated that the process 250 patches into the systems "shield cursor" facility to obtain certain information used to provide a "virtual machine" over the Internet. As noted previously, there are other ways of obtaining this information. The process 250 is a convenient and timely method for obtaining the information concerning the change of the display on the computer system video display for rapid transmission of the information over the Internet to a client machine.

Figure 13:
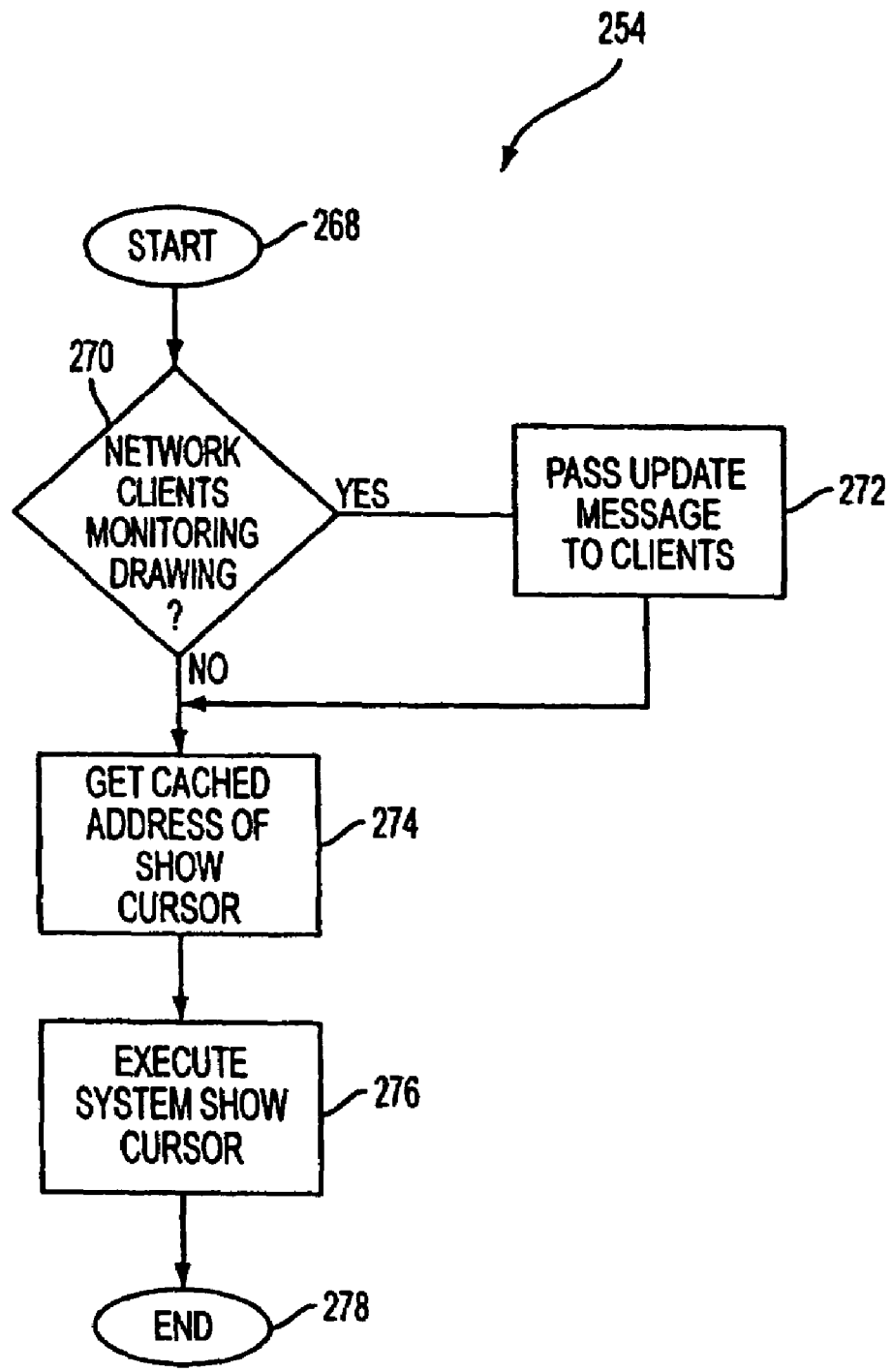
FIG. 13 is a flow-diagram illustrating the "Call Show Cursor" step of FIG. 11.

In FIG. 13, the step 254 is illustrated in greater detail. The process "call show cursor" begins at 268 and, in a decision step 270, it is determined whether any network (i.e. Internet) clients are monitoring the drawings. If yes, a step 272 passes update messages to the clients so that they can update the video display of the client computer. If no network clients are monitoring the drawing or after the execution of step 272, the cache address of the show cursor is obtained in step 274. Then the system show cursor function is executed in a step 276, and the process is completed at 278.

Once again, the system function "show cursor" has been patched such that if any changes to the drawings have occurred, these changes can be passed on to the client computers over the Internet. In addition, the process has a cache rectangle which indicates where in the screen the changes occur, meaning that only that portion of the screen where changes occurred needs to be sent over the Internet. This is an attractive feature of the present invention, in that the entire screen does not have to sent over the Internet (which could be a slow operation), but only changed portions of the screen need to be sent over the Internet. The actual image is taken from the video buffer of the host computer within the range specified by the rectangle. Preferably, the bit mapped (or pixel mapped) image taken from the video buffer is compressed, using a suitable and preferably standard compression technique such as MPEG, before transmission over the Internet.

Figure 14:
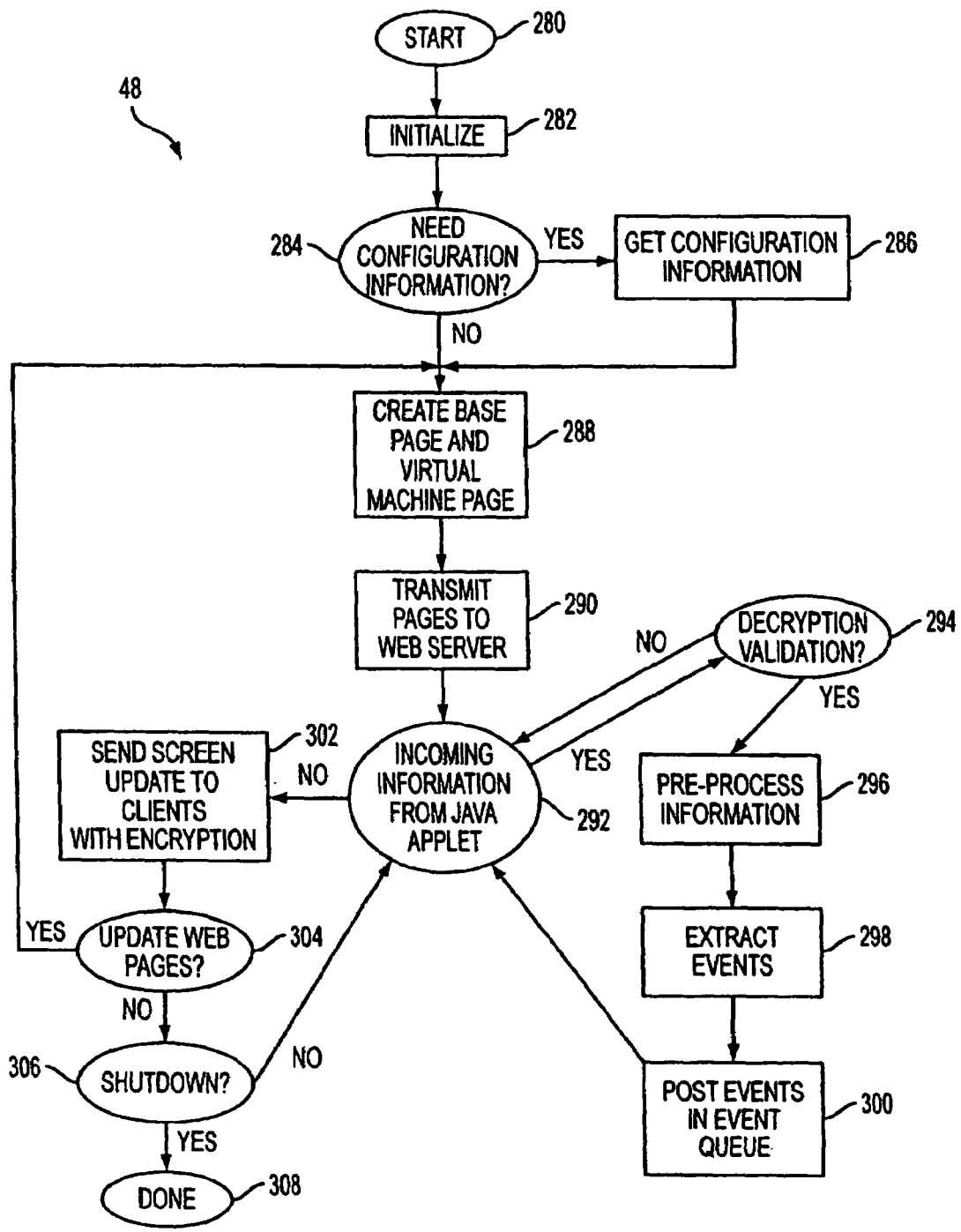
FIG. 14 illustrates the process implemented by the virtual machine application program of FIG. 2.

In FIG. 14, the virtual machine application 48 of FIG. 2 is illustrated in greater detail. The process 48 is an application program running on the computer system, e.g. on a Macintosh computer system, on a WINTEL computer system, on a workstation, etc. The process 48 begins at 280 and, in a step 282, the application program is initialized; the code of the application is loaded into memory, and internal data structures are initialized. Next, in a step 284, it is determined whether the process 48 needs configuration information. If so, the configuration information is obtained in a step 286. Once the process 48 has the necessary configuration information, a step 288 creates a base page and a virtual machine page. Next, in a step 290, the base page and the virtual machine page are transmitted to the web server 20 over the Internet 12.

The decision step 292 determines whether there is incoming information from a Java Applet. If there is, a decision step 294 determines whether there is a decryption validation. If not, step 294 returns process control to step 292. If there is decryption validation, a step 296 pre-processes the information. A step 298 then extracts the events from the information, and then events are posted into the event queue of the host computer system (such as computer system 14) in a step 300.

If there is no incoming information from a Java Applet as determined by step 292, a step 302 will send screen updates to the client with the proper encryption. A step 304 then determines whether the web pages should be updated, preferably by checking if a fixed period of time has elapsed since the last update. If the web pages are to updated, process control is returned to step 288 to create new base page and virtual machine pages. If the web pages are not to be updated, a decision step 308 determines whether shut-down of the host computer system is desired. If not, process control is returned to step 292, and if shut-down is desired, the process 48 is complete as indicated at 308.

Figure 15:
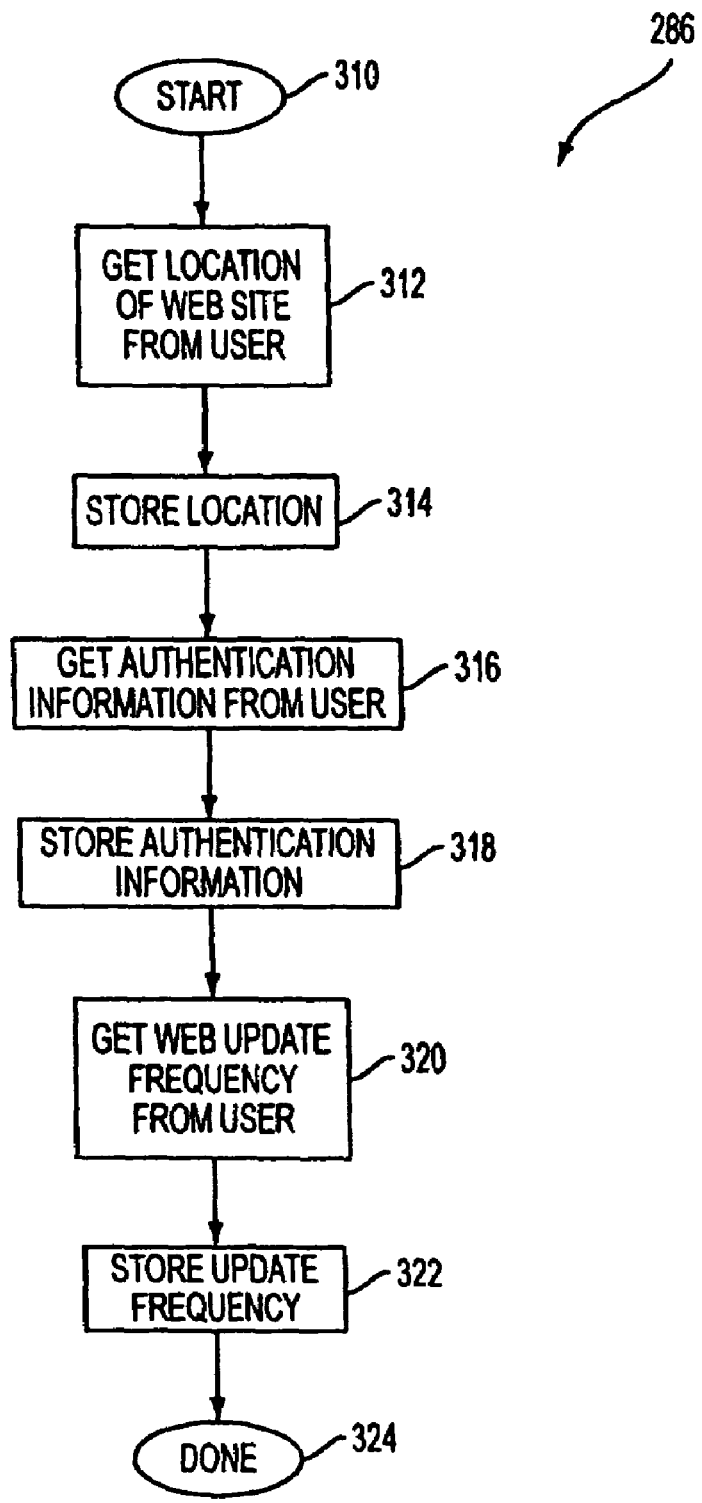
FIG. 15 illustrates the "Get Configuration Information" step of FIG. 14.

In FIG. 15, the process 286 "Get Configuration Information" of FIG. 14 is illustrated in greater detail. Process 286 begins at 310 and, in a step 312, the location of the web site is obtained from the user. This web site location is an address on the World Wide Web that is supported by the web server 20. Next, in a step 314, the location of the web site is stored. A step 316 retrieves authentication information from the user, which is stored in a step 318. Next, in a step 320, the web update frequency is received from the user, and the update frequency is stored in a step 322. The process is then completed at 324.

Figure 16:
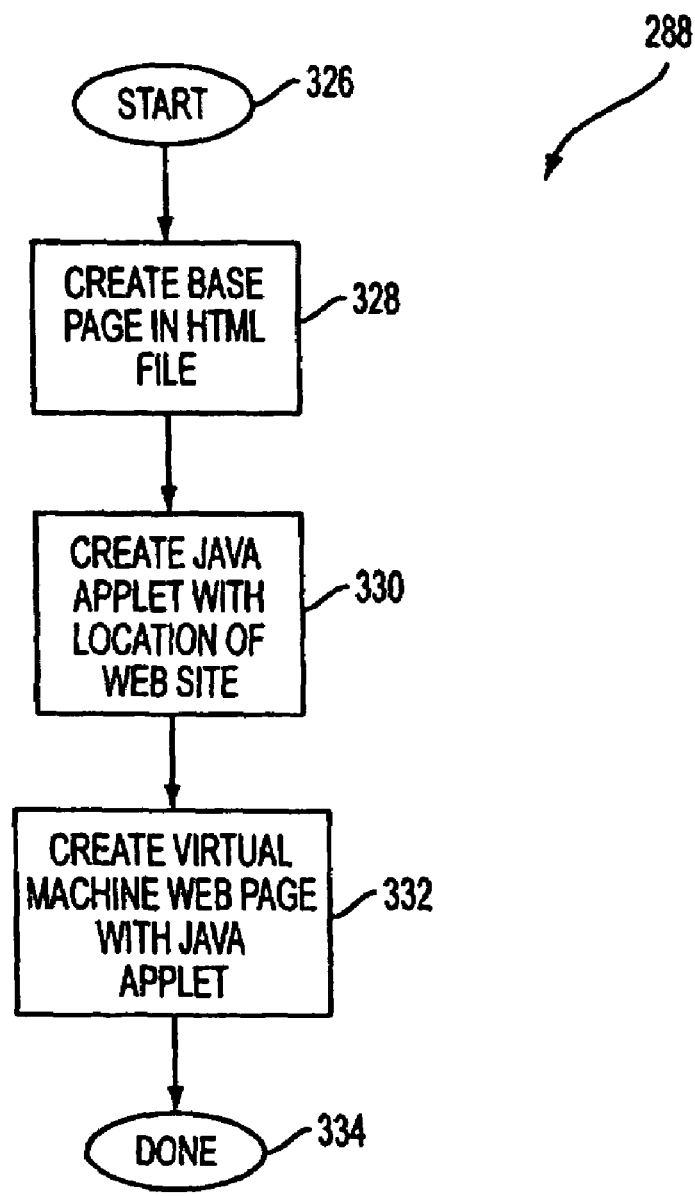
FIG. 16 illustrates the "Create Base Page and Virtual Machine Page" step of FIG. 14 in greater detail.

In FIG. 16, the step 288 "Create Base Page and Virtual Machine Page" is disclosed in greater detail. More particularly, process 288 begins at 326 and, in a step 328, a base page HTML file is created. The creation of web pages with HTML file is well known to those skilled in the art, and there a variety of utilities available on the commercial market for the creation of pages with HTML files. Next, in a step 330, a Java Applet with the location of the web site is made available. In other words, a Java Applet script of FIG. 2 is created, modified, or used in its stored form. Finally, in a step 332, a virtual machine web page with the Java Applet is created. The process is then completed at 324.

Figure 17:
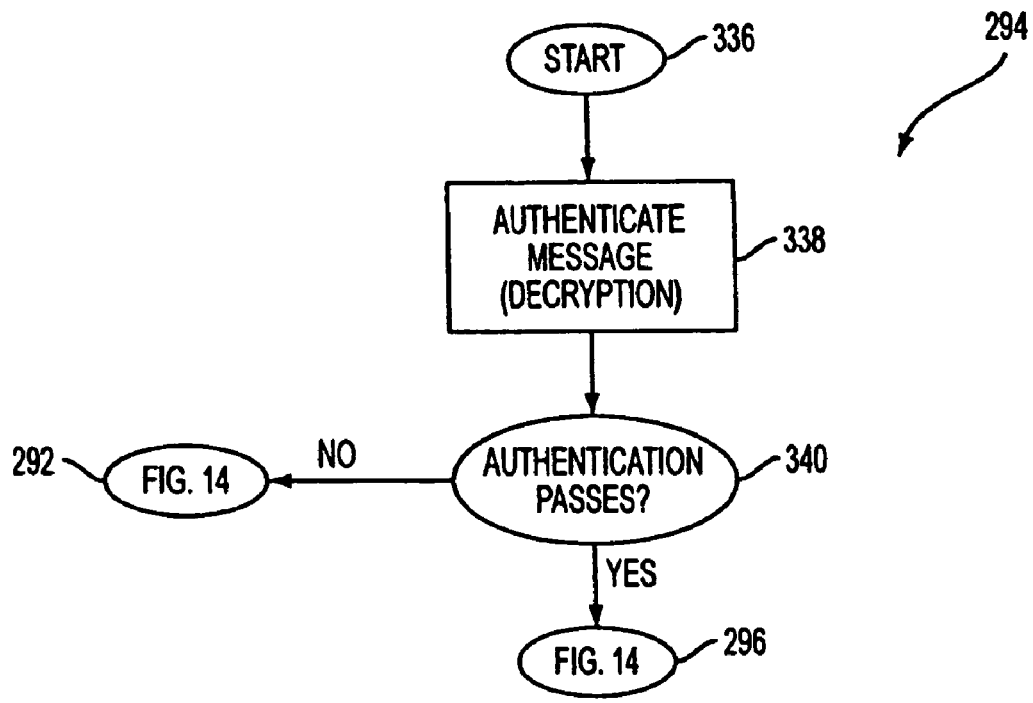
FIG. 17 illustrates the "Decryption Validation?" step of FIG. 14.

In FIG. 17, the step 294 "Decryption Validation" of FIG. 14 is illustrated in greater detail. A process 294 begins at 336 and, in a step 338, the message is "authenticated." This authentication involves the decryption of the message using a supplied password. A step 340 then determines whether the authentication passes and, if so, process control is turned over to step 296 of FIG. 14. If authentication does not pass, process control is turned over to step 292 of FIG. 14.

Figure 18:
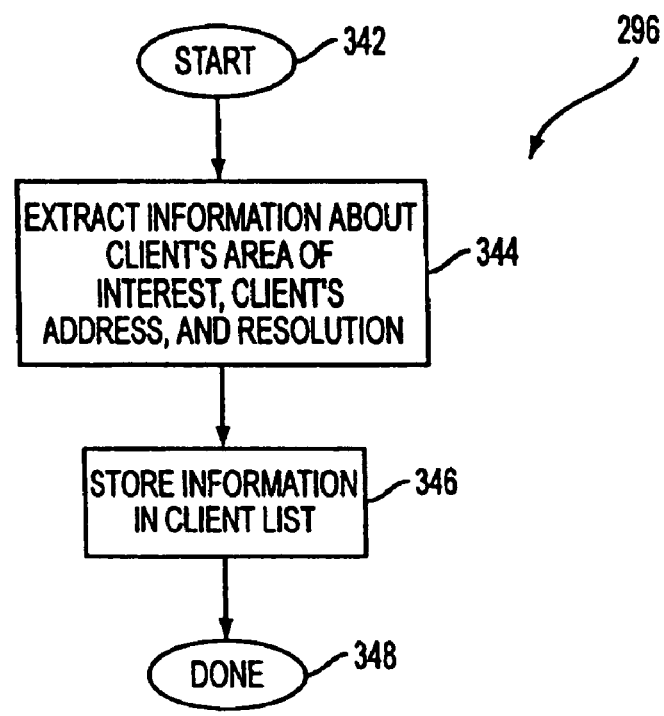
FIG. 18 illustrates the "Pre-Process Information" step of FIG. 14.

In FIG. 18, the step 296 "Pre-Process Information" of FIG. 14 is illustrated in greater detail. The process 296 begins at 342, and a step 344 extracts information about the client's area of interest, the client's address, and the resolution of the client computer screen. This information is stored in a client list step 346, and the process is completed at 348. The client list can include multiple clients, each of which will have information concerning their areas of interest, their Internet address, and their screen resolution.

Figure 19:
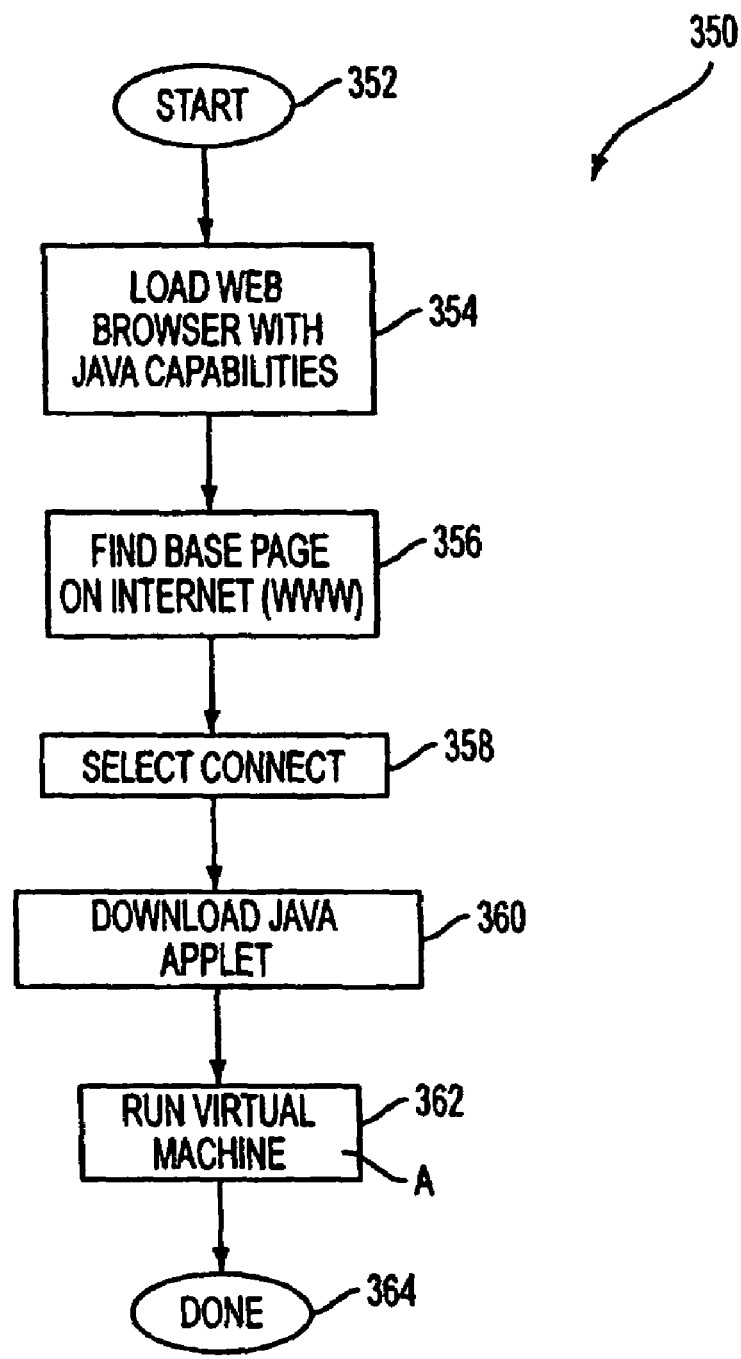
FIG. 19 illustrates a process of the present invention implemented on a client machine of the system of FIG. 1.

In FIG. 19, a process 350 for running on a client machine (such as computer system 18) is disclosed. This client process can be implemented completely in commercially available software, and is described herein for the sake of completeness. The process 350 begins at 352 and, in a step 354, a web browser with Java capabilities is loaded. As noted previously, the Netscape web browser with Java is suitable for use of the present invention. Next, in a step 356, a base page is found on the Internet World Wide Web (WWW). This is accomplished by using the navigation functions of the web browser. Next, in a step 358, the client selects the "connect" option of the base page of the present invention, and in a step 360, a Java Applet is downloaded to the client system. A step 362 then runs the "virtual machine," which essentially is running the host computer system while displaying the video and other outputs on the client computer system, with inputs to the client computer system being transmitted to the host computer system. The process is then completed at 364.

Figure 20:
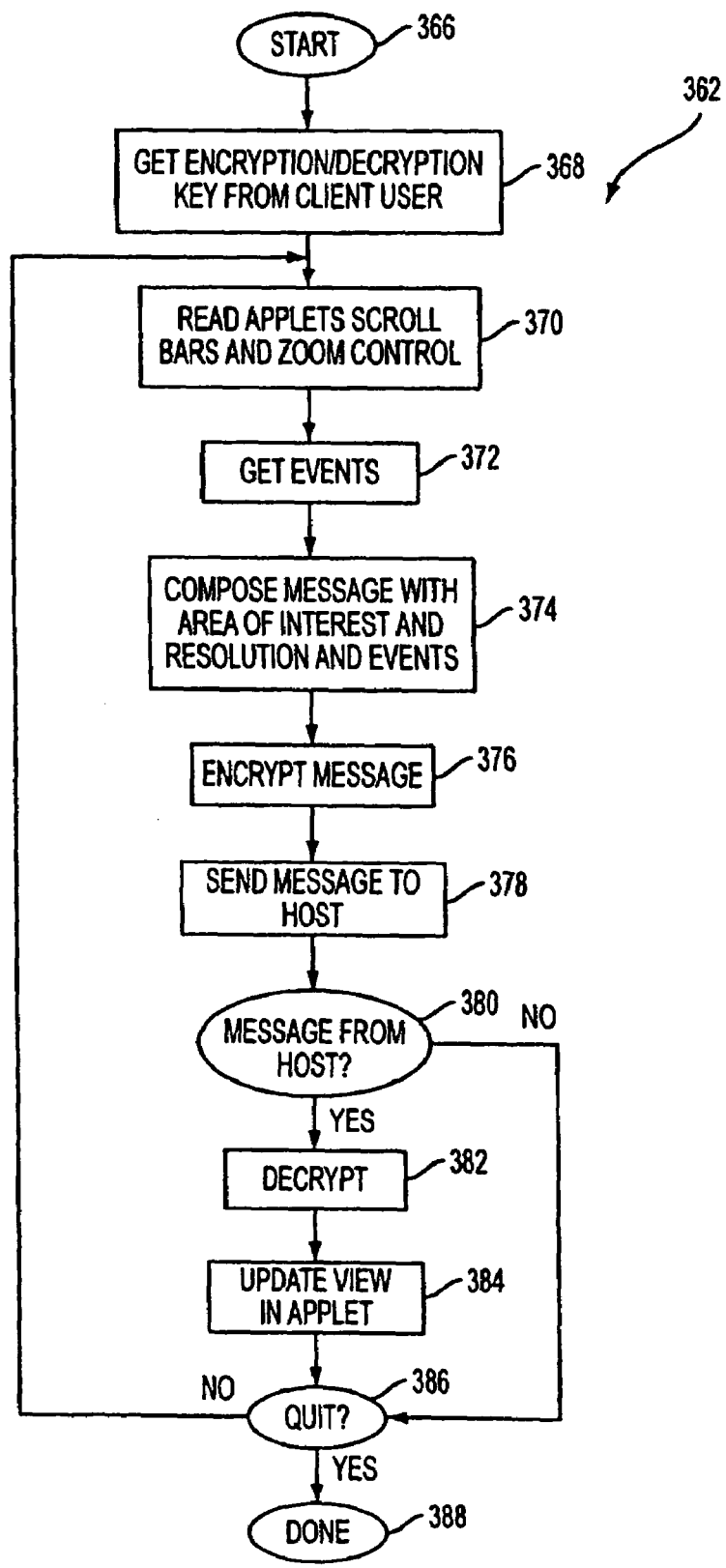
FIG. 20 illustrates the "Run Virtual Machine" step of FIG. 19.

The step 362 "Run Virtual Machine" of FIG. 19 is illustrated in greater detail in FIG. 20. Process 362 begins at 366 and, in a step 368, the encryption/decryption key ("password", "keyword", etc.) is obtained from the client user. Next, in a step 370, the Applet's virtual machine window's scroll bars and zoom control are read. A step 372 gathers events from the client user. Next, in a step 374, a message is composed with an area of interest in the client computer screen (i.e. in the client computer's video frame buffer), along with the appropriate resolution and events. The composed message is the encrypted in a step 376, and is sent to the host in a step 378.

A decision step 380 determines if there is a message from the host. If there is, the message is decrypted in a step 382, and then the Applet controlled virtual machine window is updated in a step 384. If there is no message from the host, or after updating the virtual machine window, it is determined in a step 386 if the process 362 is to be terminated. If not, process control is returned to step 370. If the process 362 is determined to be terminated in a step 386, the process is completed at 388.

Figure 21:
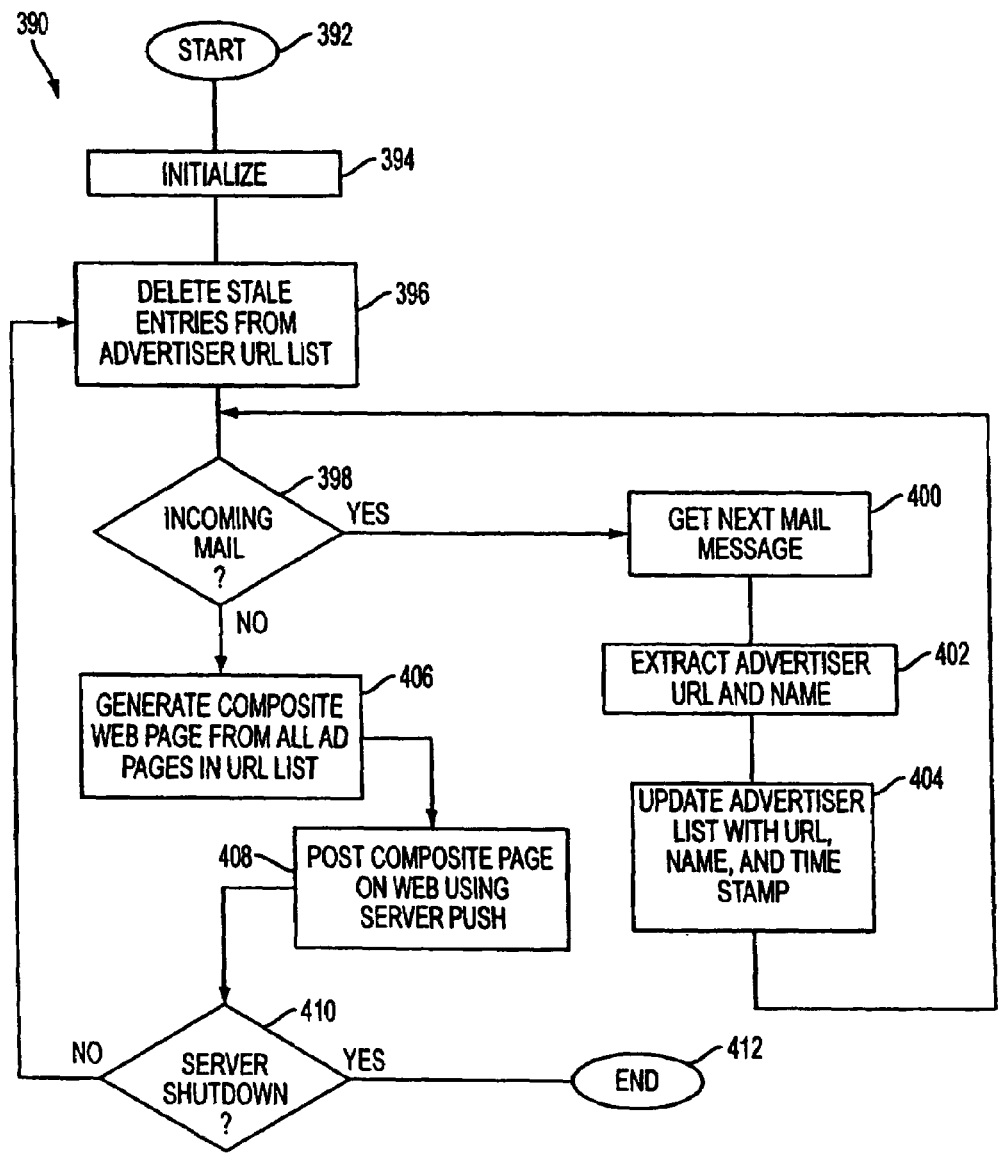
FIG. 21 illustrates a process of the present invention running on a web server of FIG. 1.

In FIG. 21, an optional process 390 that can run on the web server 20 is disclosed. In this process, the web server at the web site can consolidate and manage a number of virtual machines that are either part of the Internet 12, or which are connected to Internet 12. In this scenario, the host machine (such as computer 14) can be considered to be an "advertiser" of a potential "virtual machine" and the web server (such as web server 20) can be considered to be the "advertisement publisher" or "ad publisher." The client machine (such as machine 18) is simply a "web user" who browses through the advertisements of the ad publisher and selects a virtual machine.

Process 390 begins at 392 and, in a step 394, the system is initialized; code is loaded into memory and internal data structures are initialized. Next, in a step 396, "stale entries" from the advertiser URL list are removed. As it is well-known to those skilled in the art, the URL is simply the address of a web page on the Internet. By "stale entries," it is simply meant that the content of the advertiser URL list is periodically updated. A local copy of the latest version of each "advertisement" is kept and compared to the advertisement on the web. If they are identical for too long of a period, the advertisement is considered to be "stale" and is deleted from the advertisement list.

Next, in a decision step 398, it is determined if there is any incoming mail. If there is, a step 400 receives the next mail message and a step 402 extracts the advertiser URL and name. Next, in a step 404, the advertiser list is updated with the URL, name, and time stamp, and process control is returned to step 398. If there is no incoming mail, a step 406 generates a composite web page from all advertisement pages in the URL list. Next, in a step 408, the composite web page is posted on the web using a sever push. Next, in a decision step 410, it is determined whether the server is to be shut down. If not, process control is returned to step 396. If the server is to be shut down, the process 390 ends at 412.

Figure 22A:
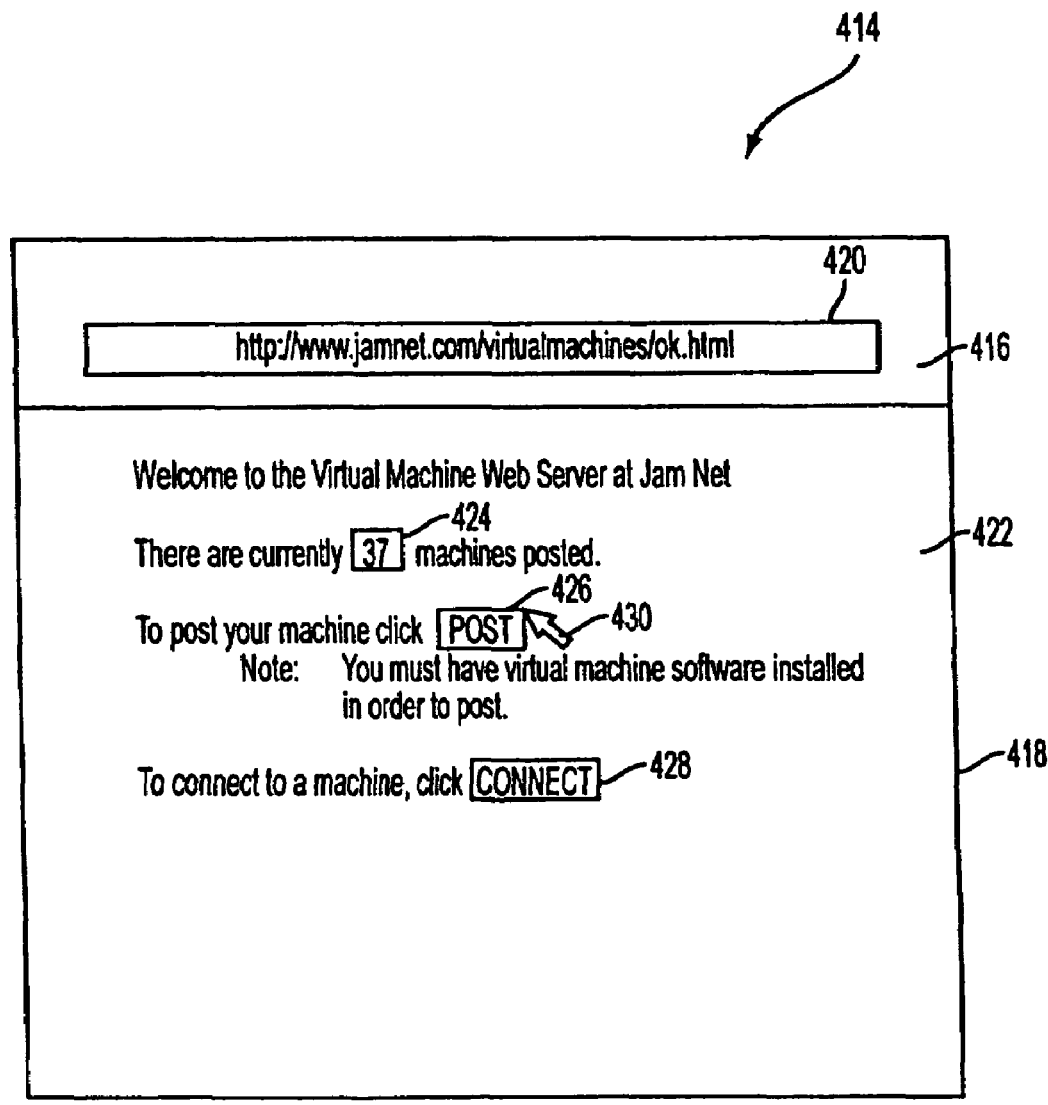
FIG. 22a illustrates an advertiser home page supported by the web server of FIG. 1.

In FIG. 22a, an "home" web page 414 created at an advertiser web site (e.g. by process 390 running on a web server) is disclosed. The web "base" or "home" web page includes a header 416 and a body portion 418. In this instance, the header includes the address or "URL" of the web page 418 which, in this example, is as follows:

http://www.jamnet.com/virtualmachines/ok.html

The use of web browsers (such as the aforementioned Netscape™ web browser) to access web pages such as web page 414 on the screen of a user's computer is well known to those skilled in the art.

In the body portion 418 of web page 414 there is a brief welcome 422 to the "virtual machine web server" at the web site "jamnet." A window 424 displays the current number of machines that are "posted" at this web site. The body 418 also includes two buttons 426 and 428. By "clicking" on button 426, a user can "post" a virtual machine on the web site. By "clicking" on the button 428, a user can select a virtual machine from the web site to monitor and/or interact with.

As it is well known to those skilled in the art, the terms "click," "select," and the like refer to the act of using a pointer mechanism, such as a mouse 30 (see FIG. 1), to position a pointer icon, such as a pointer icon 430, on a computer screen, and then activating ("clicking") a button of the mouse to cause an action at the location pointed to by the pointer icon 430. For example, "clicking" on the screen of a computer can press a button, open a file, activate a program, draw a line, etc. By "post" or "posting", it is meant that a computer implemented process is executed which causes a host machine coupled to the Internet to become available as a "virtual machine." The "virtual machine" refers to the fact that it appears that a fully functional computer is available on the Internet when, in fact, the actual computer may be a computer connected to the Internet through a WAN server. However, the virtual machine may also be a WAN server which is providing its computing functionality to the Internet via the "virtual machine" protocol.

Figure 22B:
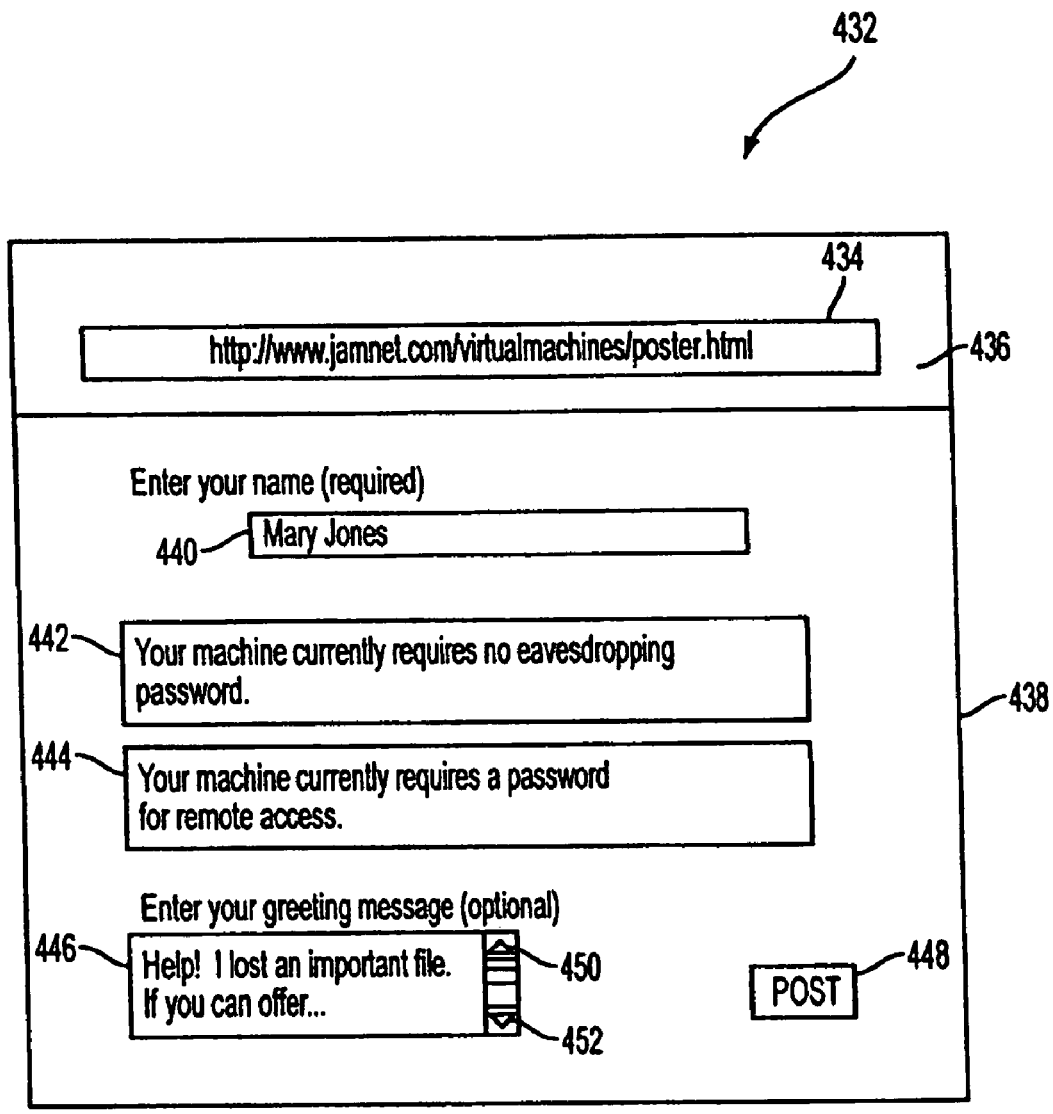
FIG. 22b illustrates an advertiser posting page that is connected via hyper-links to the web page of FIG. 22a and which is accessed when host wishes to post a "virtual machine" onto the World Wide Web.

With reference to FIG. 22b, assume that the pointer icon 430 of FIG. 22a was used to "click" (i.e. "push" or "select") the button 426 of FIG. 22a to cause the display of another web page 432. As it is well known to those skilled in the art, this is accomplished by making a "hyperlink" between the "post" button 426 and the web page 432. This hyperlink provides the URL 434 of the web page 432, which is often on the same web server 20, but which can be on any other web server 22 on the Internet 12, or on any computer connected to the Internet. The URL 434 of web page 432 is, in this instance:

http://www/jamnet/com/virtualmachines/poster.html

The web page 432 again includes a header 436 and a body portion 438. The header 436 includes the URL of the web page and the body portion 438 includes four windows 440, 442, 444, and 446, and a button 448. In window 440, the advertisers (i.e. host computers) can post their user's or sponsor's name. Assume, for the purpose of this example, that the user of computer system 14 is "Mary Jones." As the user, Mary Jones enters her name into window 440. This is typically accomplished by using the mouse 30 to position a cursor within the window 440, and then using the keyboard 28 to type in the name. Alternatively, the keyboard alone can be used using tab keys, cursor positioning keys, etc. to properly position a cursor in the window 440 prior to typing in her name. This form of keyboard/pointer input is well known to those skilled in the art.

The windows 442 and 444 are preferably Java™ windows controlled by Java software provided by Sun Microsystems, Inc. of Mountain View, Calif. These windows 442 and 444 are controlled by Applets™ produced in the Java programming language. The use of Java and Applets is well known to those skilled in the art and is described, for example, in *Hooked on Java, Creating Hot Web Sites with Java Applets*, Arthur van Hoff, Sami Shaio, and Orca Starbuck of Sun Microsystems, Inc., Addison-Wesley Publishing Company, 1996, the disclosure of which is incorporated herein by reference.

The window 442 displays the output of a Java Applet and provides the current access mode for "eavesdropping" or "monitoring" the advertiser computer system 14. As noted in window 442, Mary's machine currently does not require a password for another system connected to the Internet 12 to monitor her system's (i.e. computer 14's) outputs. In window 444, it is indicated that Mary's machine 14 currently requires a password for "remote access", i.e. a password is required before Mary's computer system 14 can be controlled over the Internet 12.

In window 446, a space is provided for entering a greeting message. As noted, the window 446 includes scroll buttons 450 and 452 to allow a longer message than would otherwise fit in window 446. In this instance, Mary Jones is indicating that she lost an important file and is posting her machine on the Internet and in hope that someone can help retrieve the file.

Figure 22C:
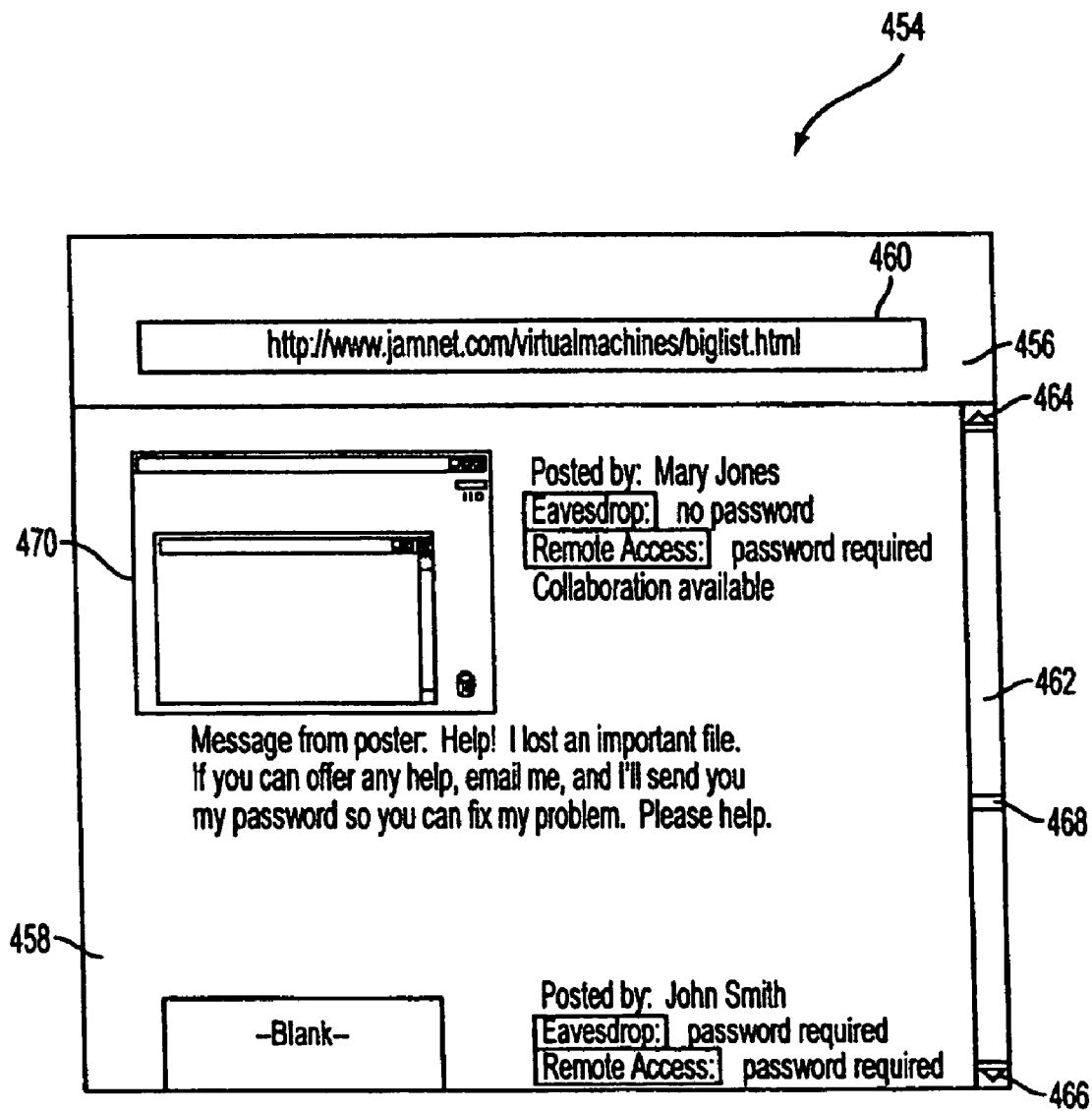
FIG. 22c is an advertiser listing page supported by the web server of FIG. 1 that is connected via hyper-links to the web page of FIG. 22a so that client computers can access virtual machines posted on the World Wide Web.

In FIG. 22c, a web page 454 is accessed when a user-client clicked on button 428 of the web page 414 of FIG. 22a. This web page 454 allows the connection of a user's machine to a "virtual machine" that has been posted on the Internet 12. The web page 454 includes a header 456 and a body portion 458. The header 456 includes the URL 460 of the web page 454, and the body portion 458 includes one or more "virtual machines", as defined previously. In this instance, the URL 460 is:

http://www.jamnet.com/virtualmachines/biglist.html

A scroll bar 462 includes scroll buttons 464 and 466 and a place marker 468 which allows a user-client to quickly navigate through the body portion 458 to find a desired virtual machine. By the centralized position of the place marker 468, it can be inferred that Mary Jones' virtual machine is somewhere in the middle of a "big list" which might include tens or even hundreds of virtual machines, each representing a computer system posted to the web page.

Again, by "virtual machine," it is meant that the functionality of a computer system, such as computer system 14, can be accessed by another computer system, such as computer system 18, in such a fashion that it appears that there is a "virtual" computer running in a window of computer system 18 from the Internet. Therefore, by "posting," i.e. "entering," a computer system 14 onto the Internet 18, a "host" computer is posting itself as a "virtual machine" for use by others, i.e. "clients." By accessing a "virtual machine" on the Internet, a user or "client" can operate and run the "virtual machine" from their own computer.

As seen in FIG. 22c, an image 470 of the display of Mary Jones' computer system 14 may be replicated (in a reduced form) in the body portion 458 of the web page 454. Also displayed is certain information about this virtual machine, such as the name of the person posting the machine, the requirements of passwords for eavesdropping or remote access, and whether collaboration is available or not. By "collaboration," it is meant that multiple clients can access a single host machine simultaneously. For example, if computer systems 16 and 18 both desire to access the virtual machine of computer system 14, this would be possible if collaboration were permitted. This functionality permits network-wide collaboration over the Internet 12. Alternatively, if the host machine is running a multi-processing system, multiple clients can simultaneously access processes on the host machine. For example, if the host machine is a personal computer running Windows NT™ from Microsoft Corporation of Redmond, Wash., each client ("web user") could occupy its own window, or some windows could be shared by multiple clients. Also displayed in the body portion 458 is the message from Mary Jones, which in this instance is "Help! I lost an important file. If you can offer any help, e-mail me and I'll send you my password so you can fix my problem. Please help."

If a computer system 12 which has become a client ("web user") of a host ("advertiser") machine 14, the display can be "clicked" or selected to indicate that they wish to become a client. The connection is then made through the Internet such that the client computer 18 can eavesdrop on ("monitor") or remotely access ("control") the host machine 14 through the Internet. In this instance, the "remote access" of the host machine 14 requires a password for Mary Jones. This is provided for security reasons and prevents the unauthorized uploading or downloading of program code and data without the password. For example, by eliminating remote access, Mary's computer system 14 is given a degree of protection against computer viruses, unauthorized uploading of computer files, etc.

Figure 23:
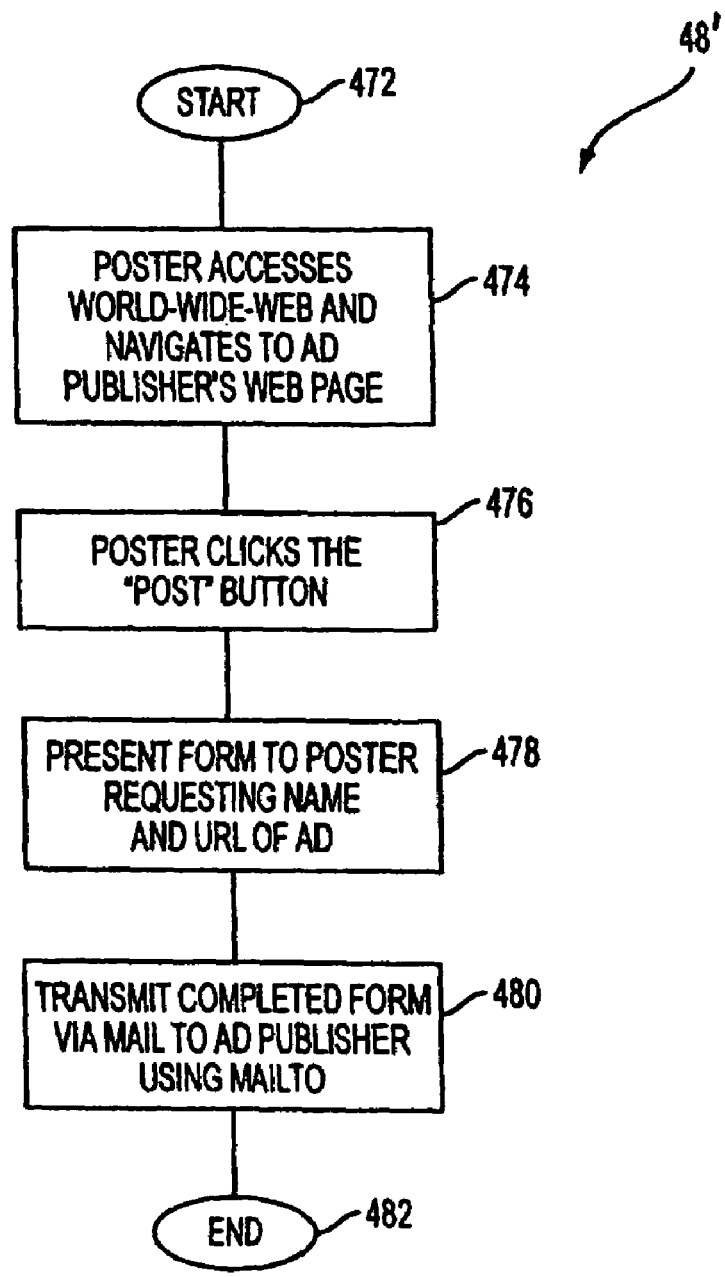
FIG. 23 is an additional process that can run on a browser installed on a host computer of FIG. 1 to communicate with an advertising publisher ("ad publisher")

In FIG. 23, an enhancement to the virtual machine application 48 is illustrated at 48'. This enhancement is used to interact with the web server software 390. More particularly, the process 48' begins at 472 and, in a step 474, the "poster" or "advertiser" or "host" accesses the World Wide Web (WWW) and navigates to an ad publisher ("web site manager") web site, i.e. step 474 navigates to the base or home page illustrated in FIG. 22a. Next, the poster clicks the host button 426 of FIG. 22a, and the page 432 of FIG. 22b is displayed. The name and URL of the advertiser is then determined. Next, in a step 480, the completed form is transmitted via e-mail over the Internet 12 to the ad publisher using the process "MAILTO." Both the request of the URL of the advertisement in step 78 and the transmission of mail to the ad publisher (using the MAILTO procedure) are standard features of HTML. The process is then completed at step 482.

Figure 24:
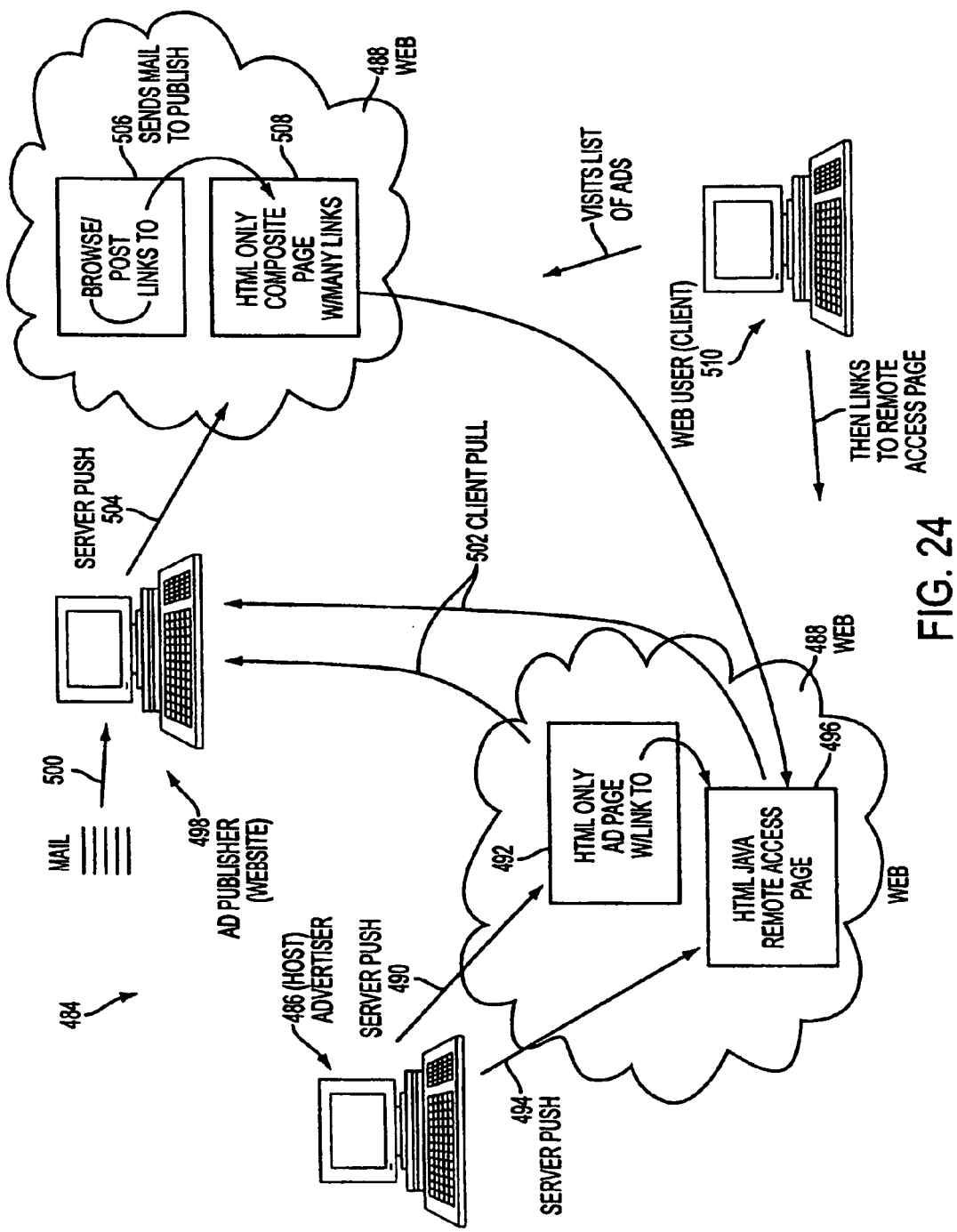
FIG. 24 illustrates the operation of a preferred embodiment of the present invention in a pictorial fashion.

The operation of the method and apparatus of a preferred embodiment of the present invention is illustrated in a pictorial fashion in FIG. 24. More particularly, the process 484 of the present invention begins with a host or advertiser 486 which makes two "server pushes" onto the Internet 488. A first server push 490 pushes the "HTML" advertisement page onto the Internet 488. A second server push 494 pushes the HTML with Java remote access page as a web page 496 onto the Internet 488. There is a hyperlink between the web page 492 and the web page 496, as explained previously. An advertisement publisher 498 (web server) receives mail 500 over the Internet and can also "pull" pages 492 and 496 into the web site, as indicated at 502. The ad publisher 498 can make a server push 504 into the World Wide Web 488 including a web page 506 which sends mail back to the ad publisher 498. The web page 506 is linked to an HTML only composite page 508 with many links to the HTML and Java remote access page 496 on the World Wide Web 488. A web user (client) visits the list of ads on the page 508 and then links to the appropriate access page, such as access page 496. The web user then becomes the client of the host/advertiser and runs a "virtual machine" over the World Wide Web 488.

Figure 25:
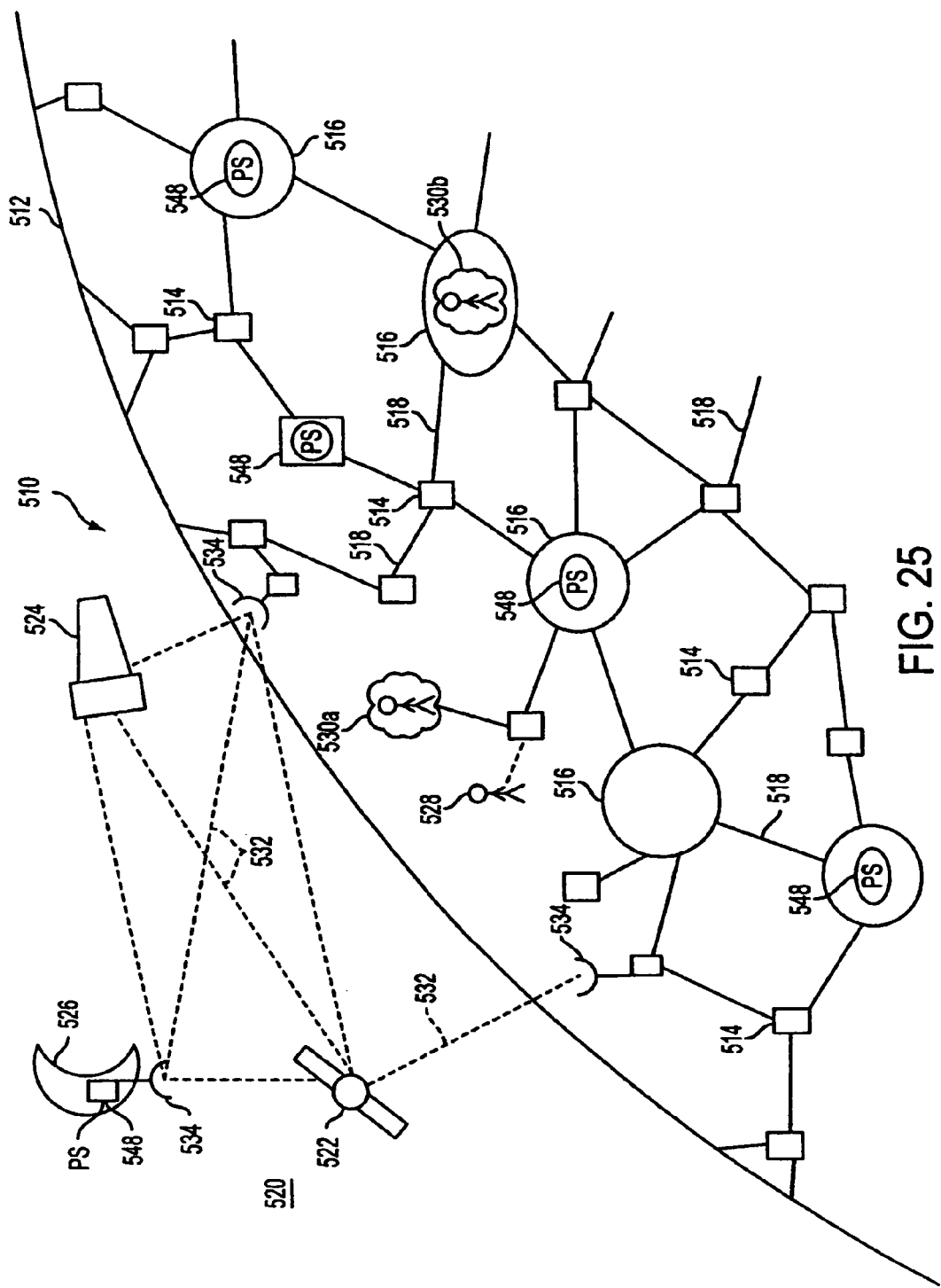
FIG. 25 is a pictorial representation of a wide area network capable of supporting the methods and apparatus of the present invention.

In FIG. 25, a wide area network (WAN) 510 capable of supporting the methods, processes, and apparatus of the present invention is illustrated. In this illustration, the World (i.e. the Earth) 512 includes a number of computers 514 and computer clusters 516 connected by transmission media 518 as a wide area network. In addition, the wide area network 510 includes "nodes", i.e. computers, in space 520 including, for example, nodes in satellites 522, spacecraft 524, and celestial bodies such as the moon 526 or other planets (not shown). Such nodes will sometimes be referred to herein as "non-terrestrial" nodes, which mean nodes that are beyond the earth's atmosphere (i.e. in outer space). Nodes in or below the earth's atmosphere will sometimes be referred to as terrestrial nodes. Terrestrial nodes may be on the ground, in the air, on bodies of water, etc.

The wide area network 510 permits communication among the various terrestrial nodes as well as the computers found in space (i.e. the non-terrestrial nodes). Again, the present invention preferably subscribes to the Internet's TCP/IP protocols, although wide area networks subscribing to other forms of protocols having similar characteristics or capabilities can be considered to be equivalents.

It should be noted that FIG. 25 illustrates a wide area network distribution system using satellites, spacecraft, the moon, which may be collectively referred to as "earth-orbiting bodies." Earth orbiting bodies are one form of "non-terrestrial nodes", although other non-terrestrial nodes may not be earth orbiting. By using a number of earth orbiting bodies to receive and repeat, receive and route, and/or originate and send, data packets, the WAN of the present invention can provide nearly universal access over the face of the earth wherever an earth-orbiting body is within line of sight of a ground station. By "ground station" or "earth station" it is meant any computer or network node below orbital altitudes (e.g. on the ground, on the ocean, in the air) that can communicate with the earth orbiting bodies over a transmissive media such as radio, microwave, laser beam, etc.

For example, by providing a plurality of low earth-orbiting satellites that can communicate via TCP/IP compatible protocols with earth stations and, preferably, with each other, a nearly universal Internet access can be provided. Since a low orbit is considered to be desirable, inter alia, from transmission power, reception sensitivity, and transmission delay points of view, it is desirable to provide dozens and preferably hundreds of such satellites to provide full coverage over broad geographical areas.

Since low orbits preclude geosynchronous orbits, each individual satellite in the system will be moving across the sky from the point of view of a geographically "fixed" ground station. Therefore, for a particular ground station, it will be necessary to "pass off" from one satellite to another when the network is in extended communication with a particular "fixed" ground station. Since the orbits of each satellite is known, a knowledge of the geographical location of a particular ground station allows the system to calculate when the "pass off" should be made. Alternatively, the system can use heuristics, such as which satellites are just beginning to "hear" the transmissions of a particular earth station and which satellites can no longer "hear" the transmissions to determine to which satellite there should be a "pass off." In general, the routing of data packets should minimize the number of "hops", including minimizing the number of satellite-to-satellite, ground station-to-satellite, and ground station-to-ground station hops to reduce latency. Alternatively, for example, all satellites or all satellites that can "hear" a particular ground station could also send TCP/IP compatible packets, with some packet duplication that could be handled at the ground station. Conversely, all satellites that "hear" a particular ground station could place those TCP/IP compatible packets on the network, where the packet duplication problem could be handled at a convenient server. By "TCP/IP compatible packets" it is meant that TCP/IP packet information is included, but additional transmission and re-transmission information can also be included to handle the complexities (e.g. packet duplication) of networks with radio transmission links and the like. An illustration of the "passing off" concept will be discussed with reference to FIG. 33.

It should be noted that a ground station can be an Internet access provider, or it can be an individual computer system. In the case of an Internet access provider, a number of client computers are coupled to the Internet access provider for network communications and control, including two-way communication with the orbiting satellites or other earth orbiting bodies. In the case of an individual computer system or client computer, the communication link with the satellite may be unidirectional, e.g. only down from the satellite to the ground station or "downstream", so that the client computer may only receive Internet data by this link. An "upstream" link (i.e. from the client computer to and Internet access node) can be provided by a more conventional mechanism, such as using the telephone to access a Internet access provider via a modem. However, as bidirectional earth-to-satellite communication technology improves, two way or bidirectional links between client computers and the earth orbiting bodies is desirable.

Within the context of the present invention, the WAN 510 supports "real users" such as user 528 and "virtual users" such as virtual users 530*a* and 530*b*. As far as the WAN 510 is concerned, there is little or no difference between a real user 528 or a virtual user such as virtual users 530*a* and 530*b*. In either instance, the "user" can access and manipulate features of the wide area network by adhering to the protocols and procedures of the present invention.

By "virtual user", it is meant herein that a software program, executing on hardware that is a part of or which is connected to the WAN 510 (in this example, the Internet) that appears, for all intents and purposes, to be a real user, such as real user 528. The virtual user can be provided with many of the attributes of a real user, such as having the ability to perform useful work, the requirement for sustenance, the ability to reproduce, and the ability to die. As noted previously, prior art software programs known as "agents", "robots", "web crawlers", etc., may have had certain ones, but certainly not all, of these aspects. This is because, before the present invention, there was not a suitable "home" or "world" for a virtual user on the network which could be "rented" or "bought" by the virtual user to support its "life." The virtual user of the present invention will be discussed subsequently after a discussion of the systems, apparatus, method, and processes of the present invention that make it possible for the virtual user to be an economically feasible entity.

As will be appreciated from the above discussion, the present invention extends beyond the current concept of a "World Wide Web." As seen in FIG. 25, the WAN 510 is not limited to land-based communication channels (such as some of the communication linkages 518), but can also communicate with extraterrestrial computers ("nodes") via communication links 532. These links involve wireless transmission, such as from radio transmitter/receivers (transceivers) 534. The effect of such massive interconnection has the effect of converting all computing "nodes", data storage facilities, and other resources of the WAN 510 to behave, in certain ways, as a single, unified computer, i.e. the network becomes the computer. A user 528 or a virtual user, such as virtual users 530*a* and 530*b*, therefore has access to a massive computational system having a vast array of resources (some of which may not be accessible to a particular user or a particular class of users).

Figure 26:
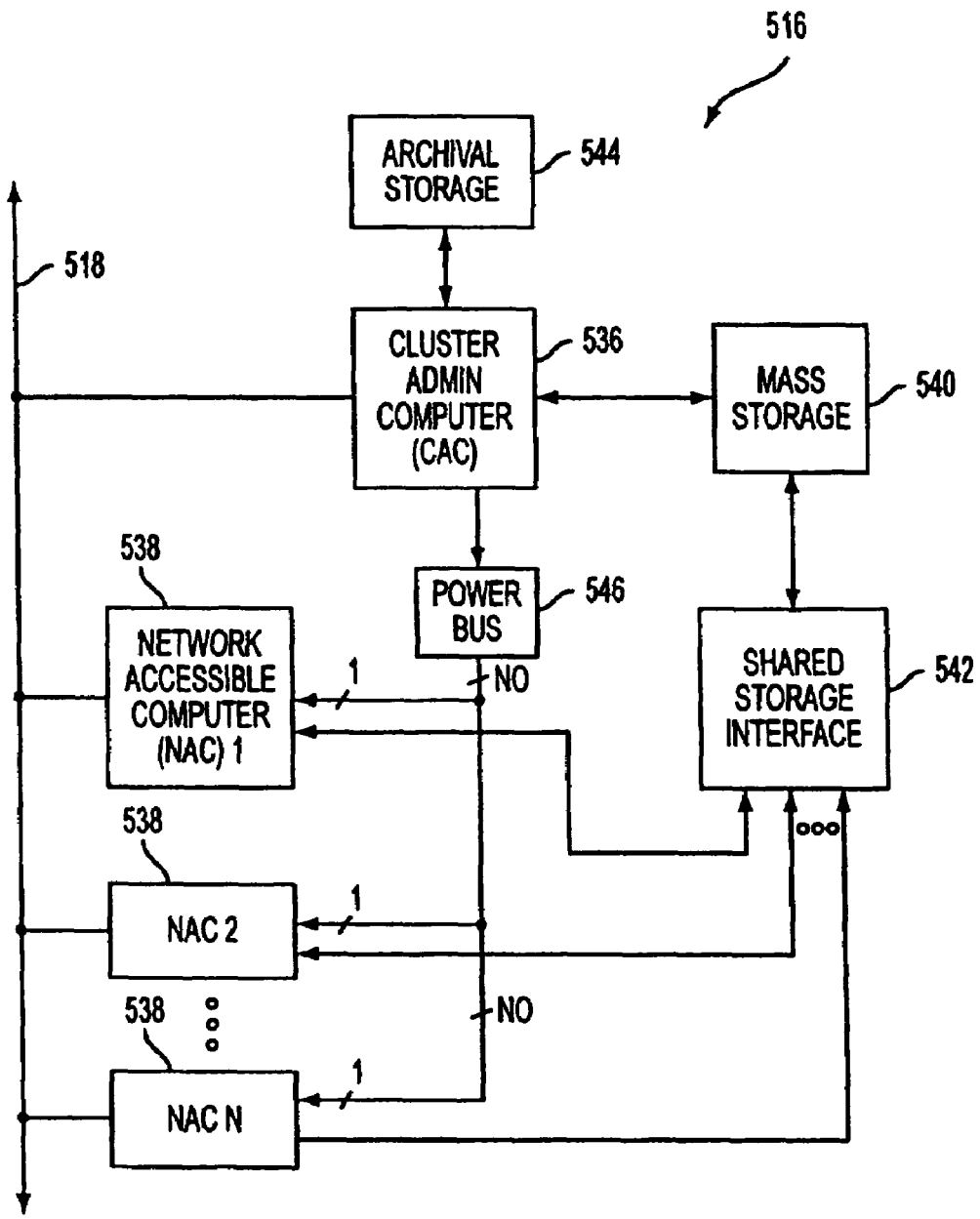
FIG. 26 is a block diagram of a cluster of network-accessible computers (NACs) illustrated in FIG. 25.

In FIG. 26, a block diagram of a cluster 516 is illustrated. A cluster 516 includes a cluster administration computer (CAC) 536, and one or more network-accessible computers (NACs) 538. In this instance, "N" NACs are provided in the cluster 516. These clusters 516 can include many hundreds or thousands of network-accessible computers 538 provided in the form of motherboards stacked into computer racks. This allows the addition of a NAC 538 to be a relatively inexpensive and straight-forward task. Each of the computers of the cluster 516 are fully functioning computer systems including central processing units (CPUs), non-volatile memory, volatile memory, data bus controllers, etc. An example of such a computer system is shown in FIG. 4. Each of the computers, including the CAC 536 and the NACs 538 are coupled to the Internet by a communication channel 518.

While the CAC 536 and the NACs 538 are fully functional computers, they also share certain resources. For example, the NACs share a mass storage 540, such as a large hard disk drive, or an array of hard disk drives. This mass storage 540 is accessed via a shared storage interface 542 which is coupled between each of the NACs 538 and the mass storage 540. In this way, an economy of scale is achieved which reduces the cost of storage for each of the individual NACs. In addition, the mass storage 540 preferably includes software programs that can be shared among the NACs 538. For example, three copies of a word processing program can be stored in mass storage 540, so that up to three NACs 538 can run the word processing software at any particular time.

To run software stored on shared mass storage 540, the software is downloaded into the NAC 528 through the shared storage interface 542, and then is "disabled" in the mass storage 540 as long as it is being run on the NAC 538. When the NAC 538 is done with the software, it is removed from the memory of the NAC 538 and is "re-enabled" on the mass storage 540. This enabling and disabling of software on the mass storage 540 can be accomplished by setting a bit indicating that the software is available or not available. The network-accessible computers 538 can include their own hard discs for local storage, or can include large random access memory ("RAM") discs that can temporarily hold such items as the aforementioned word processing software.

The cluster administration computer 536 is also coupled to the mass storage 540 and performs an "oversight" function for the cluster 516. For example, the CAC 536 can periodically back-up the mass storage 540 to an archival storage 544. This archival storage can be, for example, a tape back-up system or a magneto-optical CD-ROM system. In addition, as will be discussed in greater detail subsequently, the cluster administration computer 536 monitors the functioning of the NACs 538. If it is determined that a NAC needs to be restarted, either to activate a "personal state" of a user, or because the machine has "crashed", a power bus 546 is used to turn off the appropriate NAC, wait a short period of time (e.g. 5 seconds), and then turn the NAC back on. This, in virtually every instance, will reinitialize and reboot the appropriate NAC, and make it available for use by a user ("client").

Figure 27:
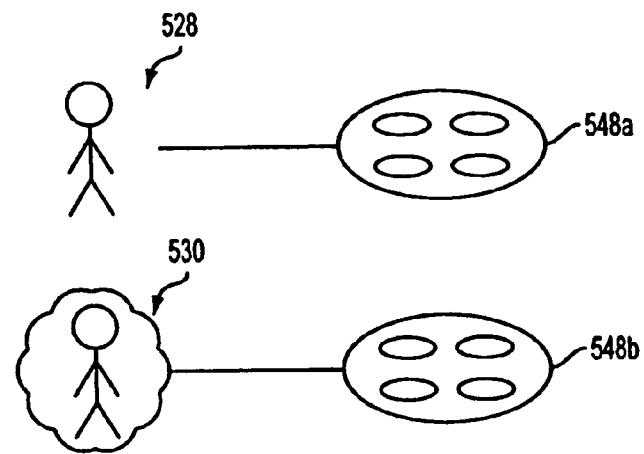
FIG. 27 illustrates a user and a virtual user and their associated "personal states"

In FIG. 27, a real user 528 and a virtual user 530 are illustrated, along with their "personal states" 548*a* and 548*b*, respectively. Personal states, referred to collectively as personal states 548, permit users (either real or virtual), to access a network-accessible computer 538 as if it were their own personal computer system. With brief reference to FIG. 25, these personal states 548 are preferably distributed throughout the Internet 510 in a redundant fashion to prevent the accidental loss of a user's "personal state." When a personal state changes, it is updated in each of the stored locations.

Figure 28:
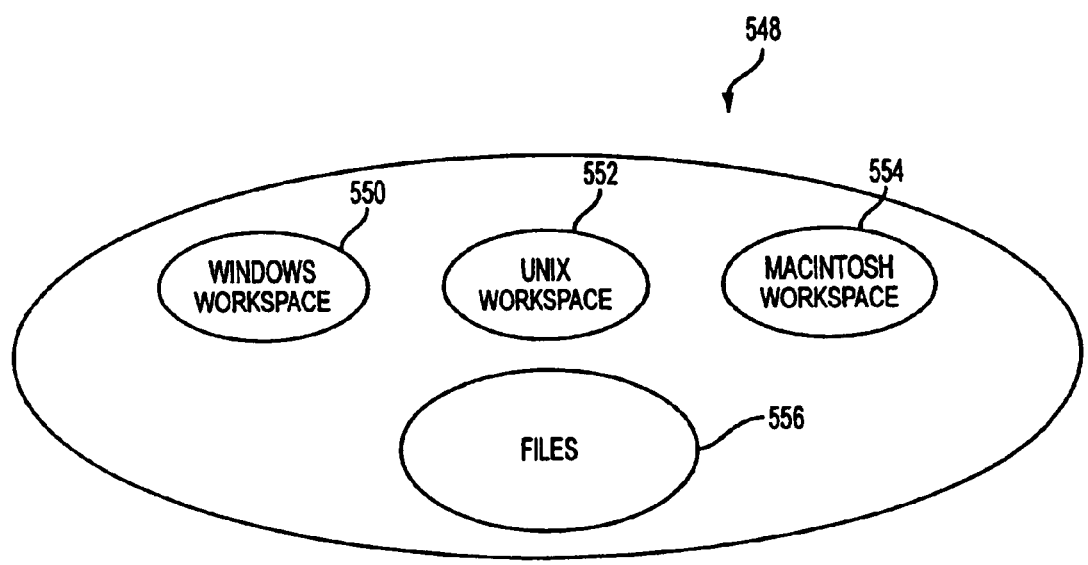
FIG. 28 illustrates, by way of example, a personal state of either a user or a virtual user.

In FIG. 28, a personal state is illustrated in somewhat greater detail. Assume, for example, that a user (either real or virtual), makes use of Microsoft Windows-based computer systems, Unix-based computer systems, and Macintosh-based computer systems. The personal state 548 then includes a Windows workspace 550, a Unix workspace 552, and a Macintosh workspace 554. The personal state 548 also includes data and other files 556. When a user accesses a NAC 538, the cluster administrator computer 536 determines the proper configuration for the NAC 538 from the personal state 548 and, preferably, reinitializes the computer such that the user's personal state is reflected in the computer's operating system. As an example, if a NAC 538 is a Macintosh computer, the cluster administrator computer 536 loads the Macintosh workspace 554 into the NAC. A personal state corresponding to the Macintosh workspace can include the file structure created by the user, whatever windows were open at the time the user last used a Macintosh, all of the system extensions or "inits" of the Macintosh, and even the values and the registers on the CPU and in the various peripheral units of the Macintosh. Of course, there can be multiple Macintosh workspaces, multiple Unix workspaces, etc., if the user wants to maintain, effectively, multiple computer system "flavors" for particular purposes. In addition, appropriate files and data from the files 556 of the personal state, are made available to the NAC 538.

The effect of the "personal state" being stored on the Internet is that the user has the same experience as if they had their own stand-alone personal computer on their desk. A low-powered, low-cost Internet box can be used to access a NAC 538 which then "boots-up" as the user's own personal computer. As long as the data communication rate between the Internet box and the NAC is sufficiently fast, the user can have a virtually identical experience with the Internet box as he or she would have with their own personal computer. However, and very advantageously, the computer would be a shared computer resource, resulting in lower costs per user. In addition, the cluster administration computer 536 takes care of several common tasks such as backing up the mass storage, maintaining updated versions of software on the mass storage 540, etc.

It should be noted that the personal state 548 need not be stored on the mass storage 540 associated with a particular NAC 538. In fact, in most instances, it will be stored elsewhere on the Internet. However, with sufficiently high data rates, the actual location of the data on the Internet becomes irrelevant as long as the appropriate NAC can access the data sufficiently quickly.

It should also be noted that although a user can access a NAC anywhere on the WAN, that it is usually better to connect to a NAC that is the fewest "hops" away. In this description a "hop" is used synonymously with "node" in that TCP/IP packets are routed from node-to-node (i.e. "hop" from node to node) between the host and client computers. Since each node will cause a brief delay (due to "latency") as they receive and re-transmit the TCP/IP packets, overall performance, i.e. the overall speed of transmission of the packets, will be directly related to the number of "hops" that have to be made between the host and client computers. The browsing capabilities of the WWW can be used to select a NAC that is the fewest "hops" from the user's machine. Of course, other factors that the number of "hops" are also related to packet transmission speed, such as the speed of communication links between specific nodes. Therefore, the present invention preferably optimizes overall performance based upon a variety of factors, including the number of hops, the transmission speed of specific communication links, etc.

It is therefore apparent that the "virtual machine" process of the present invention permits the expensive and difficult computational tasks to be distributed over the Internet rather than residing on the desktop of the user. Therefore, most users will find it sufficient to have inexpensive Internet boxes costing, perhaps, one-quarter to one-tenth as much as a full-blown, desktop personal computer system, which can be the "client" of a "host" NAC 538 on the Internet. Since the NACs 538 can be shared among the many millions of users of the Internet, the cost per user decreases while the experience of the individual user remains essentially the same or improves.

The clusters 516 can be maintained for either private or public use. When used privately, the cluster 516 can be provided by a company for use by their employees. Since, typically, employees are not all using their computers simultaneously, there can be fewer network-accessible computers (NACs) 538, than the number of employees having access to the NACs. Again, the access to the NACs can be either through the Internet, through a private Intranet, or through other network protocols. If, for example, it is determined that the average computer user of a corporation uses their personal computer thirty percent of the time, the company may provide one-half as many NACs 538 as they have employees. This will generate a substantial cost savings.

If the cluster 516 is public in nature, it is likely that the provider of the cluster 516 will charge or "rent" access to the NACs 538. This provides a scenario for a fully functional and viable virtual user 530 that can inhabit the Internet at large. In this instance, the virtual user is created (either by a real user or another virtual user), and is provided with a certain amount of "start-up capital" in the form of credit that is backed by a real currency. For example, this credit could be "cyber dollars" that are ultimately convertible to real money, or could be a credit line with, for example, and electronic bank. This start-up capital allows the virtual user 530a to rent time on a NAC 538. If the start-up capital is small, the virtual user 530a will most likely choose a "low rent district", i.e., a low-powered and therefore inexpensive NAC 538, such as a 80286-based personal computer. The virtual user can then advertise and perform useful services on the Internet 510. For example, the virtual user 530a can be a "handyman" who goes to various computer systems 514 and clusters 516 to de-fragment their hard disk, analyze their system for faults, or otherwise optimize their systems. Alternatively, the virtual user 530 can monitor the packets flowing along the Internet or become a "web crawler" to gather information that might be useful to other real and virtual users. The virtual users are "paid" for performing these useful tasks (using real or "cyber" credit), which permits the virtual user to accumulate wealth. Some of this wealth can be transferred to other real or virtual users, can be used to purchase services, or it can be used to "upgrade" the habitat of the virtual user, i.e., to allow the virtual user to occupy a NAC of greater power. In addition, once the virtual user has accumulated sufficient capital, it can create clones or "offspring" and provide them with sufficient capital to inhabit their own NAC. Also, two or more virtual users can merge and work together. For example, a virtual user that is good at detecting software viruses might join forces with a virtual user that is good at de-fragmenting hard disks for co-marketing purposes. Presumably, if a virtual user 530 runs out of capital, it would "die", in that it would not have access to a NAC 538, unless capital could be "borrowed" from another real or virtual user. The ability to merge, reproduce, and die adds a Darwinian selection aspects to virtual users which ensures that the most effective virtual user traits will be propagated.

Figure 29:
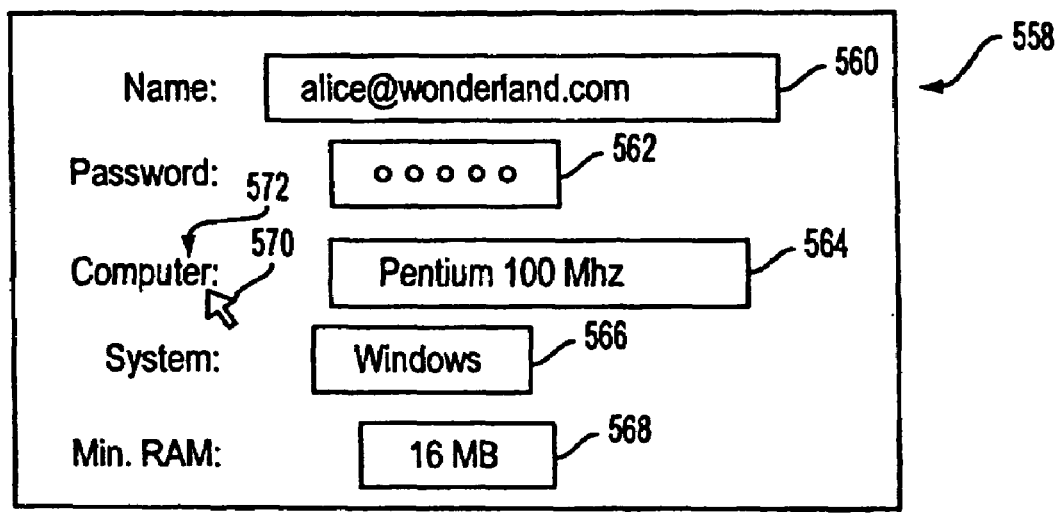
FIG. 29 illustrates an information entry window allowing a user or a virtual user to have access to a network-accessible computer (NAC)
Figure 29A:
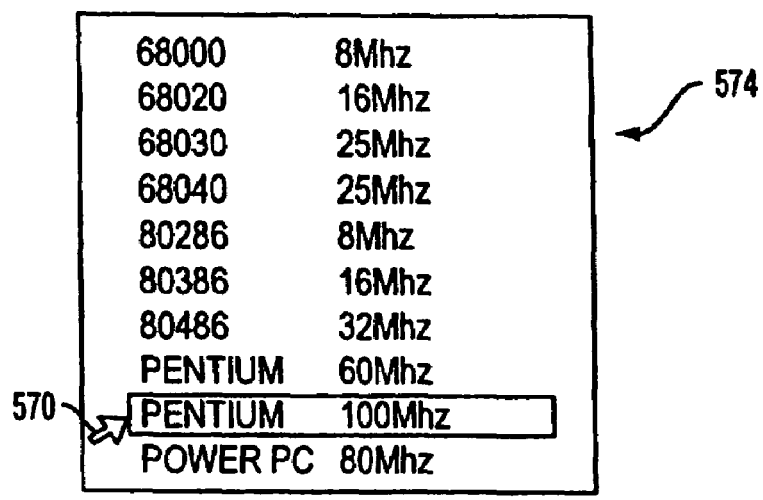
FIG. 29a is a view of a pop-up window used to select the computer CPU in the information window illustrated in FIG. 29.

In FIG. 29, an interface 558 to a cluster administration computer 536 is illustrated. Again, either a real user 528 or a virtual user 530 can obtain access to a CAC 536, such as through the interface 558. The interface 558 includes, by way of example, five entry windows including entry windows 560, 562, 564, 566, and 568. In the present embodiment, it is preferred that the entry windows 564, 566, and 568 include "pop-up" windows, as will be explained in greater detail with reference to FIG. 29A.

A pointer 570 can be used to select a particular entry window 560–568. The user (real or virtual) enters their name and address in window 560 (real users typically use keyboard, while virtual users would emulate keyboard entry), and a cluster entry password in a window 562. If the cluster 516 accepts this name and password, a computer CPU-type can be selected in a window 564. The pointer 570 can be used to "click" on the word 572 "computer" to create a pop-up window 574, listing all of the computers CPU types available on that particular cluster 516. In this instance, the pointer at 570a has selected a Pentium 100 MHz CPU computer for entry into window 564. The system type information is entered into entry window 566, and the minimum RAM requirement is entered into entry window 568 in a similar, fashion, i.e., it is either typed into the windows 566 or 568 via a keyboard, or is selected from a pull-down menu similar to the pull-down menu 574 illustrated in FIG. 29A with a pointer or equivalent. At this point, the cluster administration computer has the information required to allow access to a network-accessible computer 538 and to put the personal state of the user into the selected computer.

Figure 30:
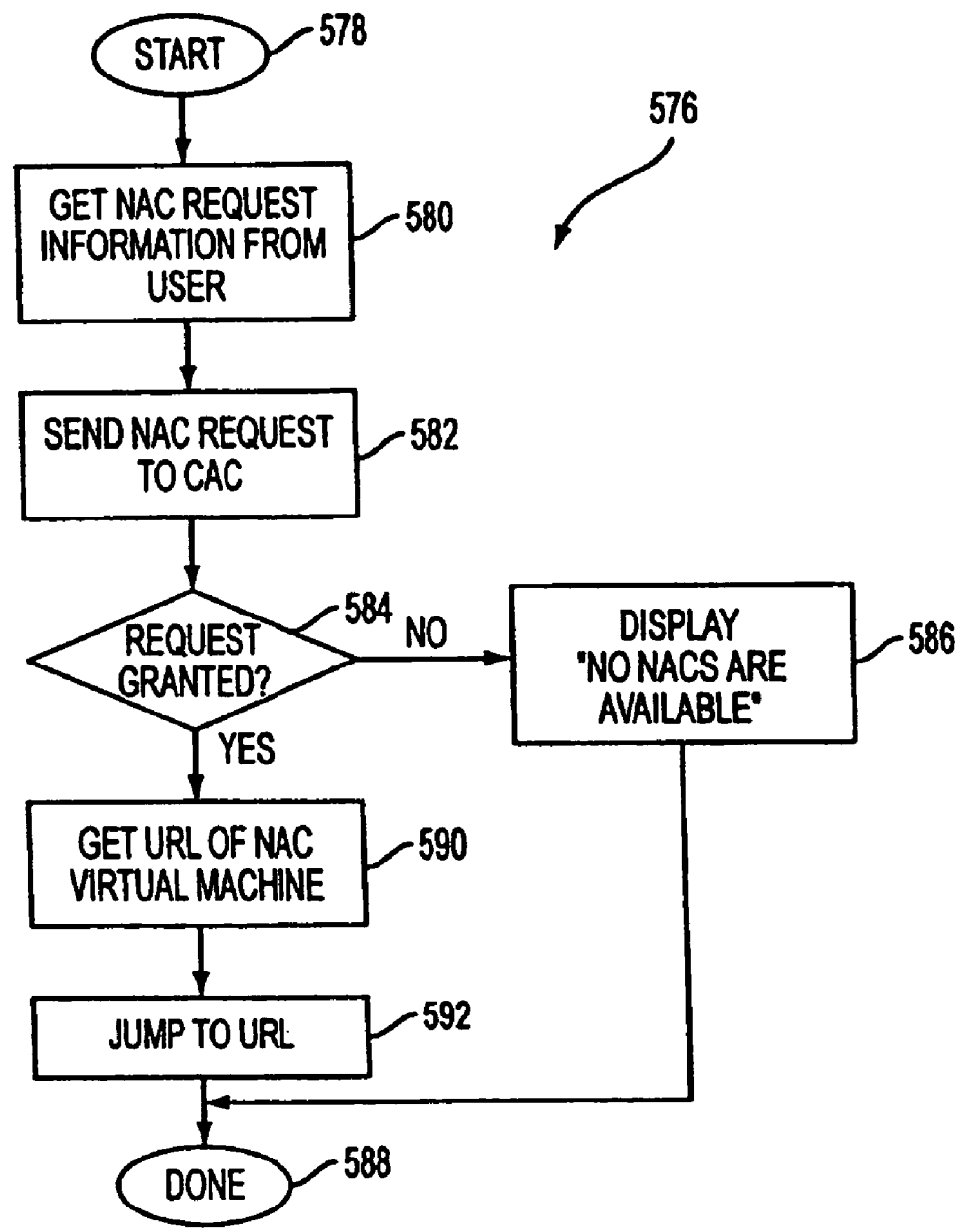
FIG. 30 is a flow diagram of a process running on a user computer.

In FIG. 30, a process 576 running on a client computer (such as client computer 18) which allows access to a cluster 516, is shown. The process 576 begins at 578 and, in a step 580, the NAC request information is received from the user through an appropriate medium, such as through the interface 558, illustrated in FIG. 29. Next, in a step 582, the NAC request is sent to a CAC 536 of a cluster 516. A step 584 determines whether the request is granted. The request may not be granted due to an improper user or password entry, or because there are no NACs available. In such instances, a step 586 displays that "No NACs Are Available", and the process is completed at 588. The user can then repeat the process 578, designating a different cluster 516. If step 584 grants the request, the URL of the NAC 538 which is to serve as the "host" of a "virtual machine" running on the client, is obtained in a step 590. The process then jumps to that NAC 538 URL, and the "virtual machine" process described previously is then conducted. As the user uses the "virtual machine", his or her personal state is updated on the Internet. After the user is finished with the virtual machine, the process 576 is completed as indicated at 588.

Figure 31:
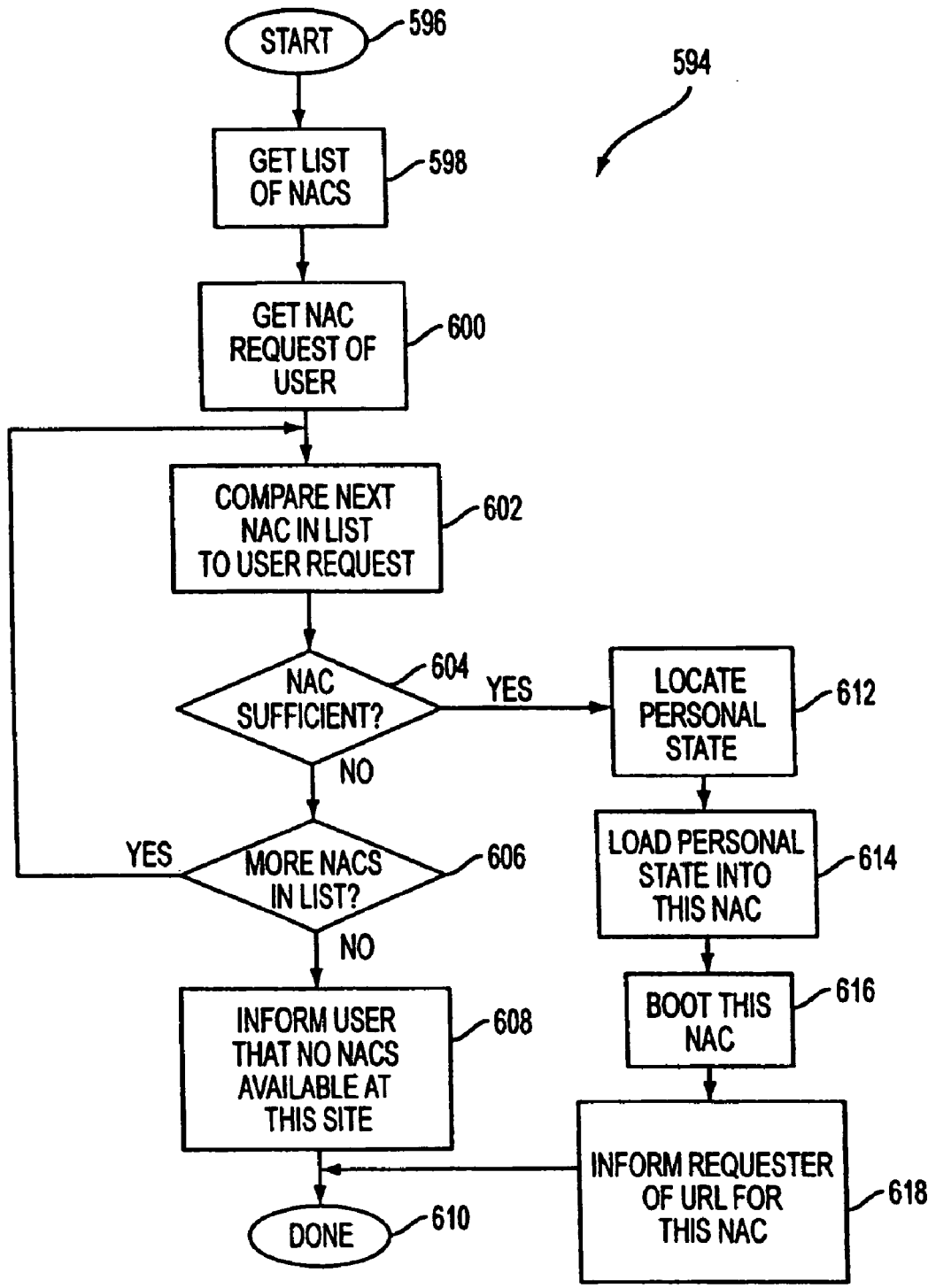
FIG. 31 is a flow diagram of a process running on the cluster administration computer (CAC) of FIG. 26.

In FIG. 31, process 594 running on the cluster administration computer 536 is illustrated. The process 594 begins at 596 and, in a step 598, a list of the NACs 538 of the cluster 516 is obtained. Next, the NAC request of the user is obtained in a step 600, such as via the interface 558 of FIGS. 29 and 29a. In this instance, it will be assumed that the name and password of the user are sufficient to allow entry into the cluster 516. If the entry criteria are not met (i.e. if the name and password do not meet muster), the step 586 of FIG. 30 will display that no NACs are available and the process will be completed at 588.

Next, in a step 602, the next NAC on the list is compared to the user's request. If the next NAC 538 in the list is not sufficient (i.e., it does not meet the minimum requirements of the user), a step 606 determines if there are more NACs on the list. If there are, process control is returned to step 602 to compare the requirements of the user to the next NAC in the list. If step 606 determines there are no more NACs in the list, the step 608 informs the user that there are no NACs available at the site that meet their requirements. In other words, step 608 is a form of request denial of step 584, allowing the display of the "No NACs Are Available" dialog of step 586. The process is then completed at 610.

If step 604 determines that the NAC is sufficient, the personal state of the user is located on the Internet in step 612. This is preferably accomplished by a File Transfer Protocol (FTP) transfer from the computer storing the personal state, typically designated by the user's name (e.g. "alice@wonderland.com"). Once located, a step 614 loads the personal state into the NAC 538. Step 616 then "boots" the NAC, i.e., a "hard" or "power-on" reset of the NAC 538 loads the personal state of the user into the desired NAC. Finally, in a step 618, the user ("requester" or "client"), is informed of the URL for the NAC that will serve as their "virtual computer."

Figure 32:
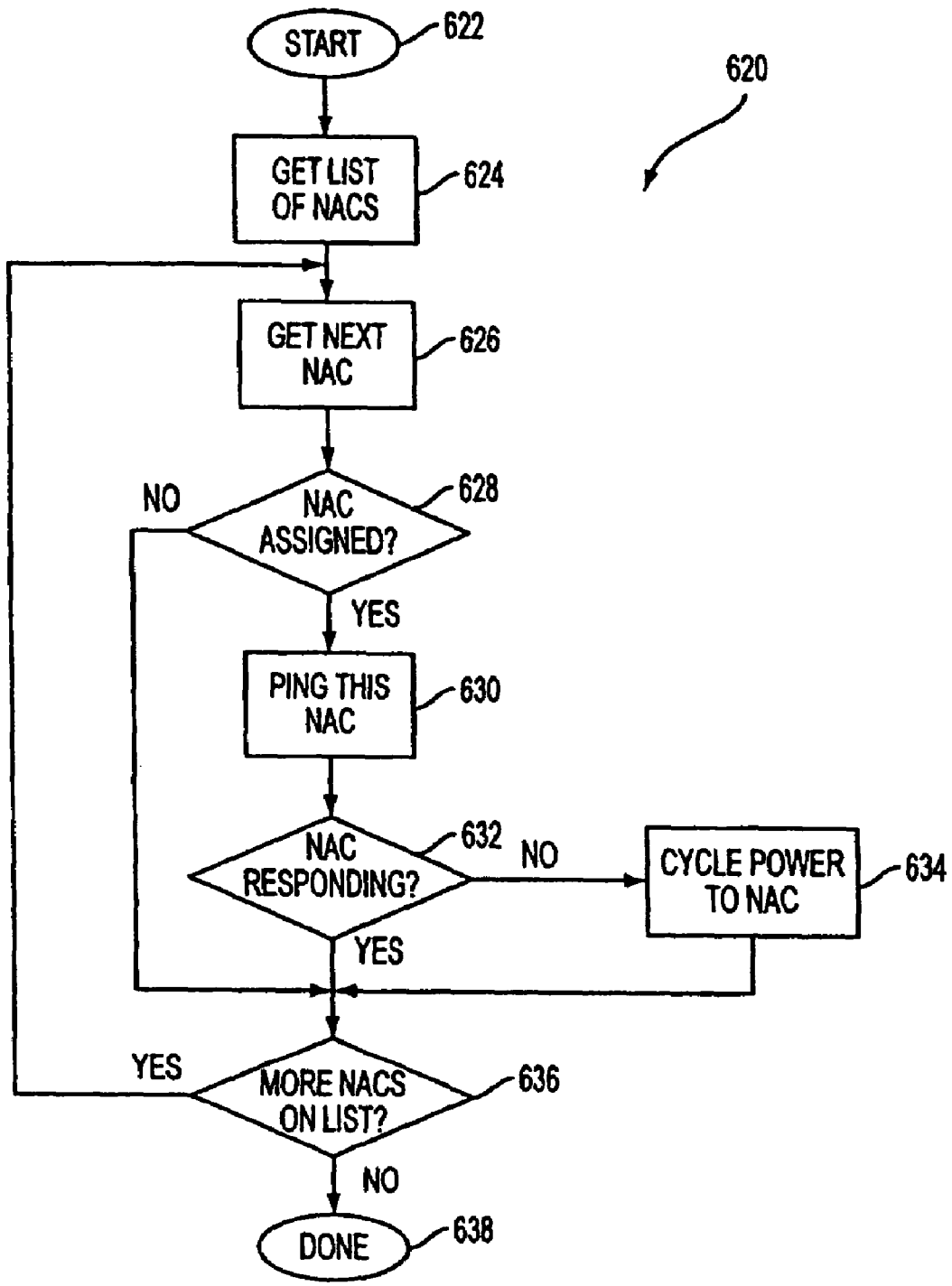
FIG. 32 is a flow diagram of another process running on the cluster administration computer (CAC) of FIG. 26.

In FIG. 32, the process 620 also running on the cluster administration computer (CAC) 536 is illustrated. This process 620 is used to determine when a NAC 538 has "crashed", i.e., is no longer operating properly. The process 620 begins at 622 and, in a step 624, the list of NACs 538 for the cluster 516 are obtained. In a step 626, the address of the next NAC is obtained. The step 628 determines if the NAC is assigned. If it is, the NAC is "pinged." By "ping", it is meant that the CAC 536 sends an inquiry to the NAC 538 asking if it is operating properly. If there is no response, or if the response is to the negative, the CAC determines that the NAC 538 is not operating properly. Alternatively, the CAC 538 can simply monitoring the functioning of the NACs 538, or wait for periodic messages from the NACs that they are operating properly. To implement these features, the NAC 538 would, in general, run a simple software utility to provide the necessary information to the CAC 536 by a chosen methodology.

If the CAC 536 determines that a NAC 538 is not responding, or that the NAC is responding but it is not operating properly, the power to the NAC 538 is "cycled." With brief reference to FIG. 26, this is accomplished through the power bus controller 546 which turns off the power to the improperly functioning NAC 538, waits for a predetermined period of time (e.g., five seconds), and then turns on the power to the NAC 538. This is essentially the same process as a "hard boot" or "power-on reset" of a personal computer. Then, after the completion of step 634, or after the determination that the NAC is not assigned in a step 628, a step 536 determines if there are more NACs on the list. If yes, process control is returned to step 626. Otherwise, the process is completed at 638. The process 620 will be performed regularly by the CAC 536, e.g., every minute or so.

Figure 33:
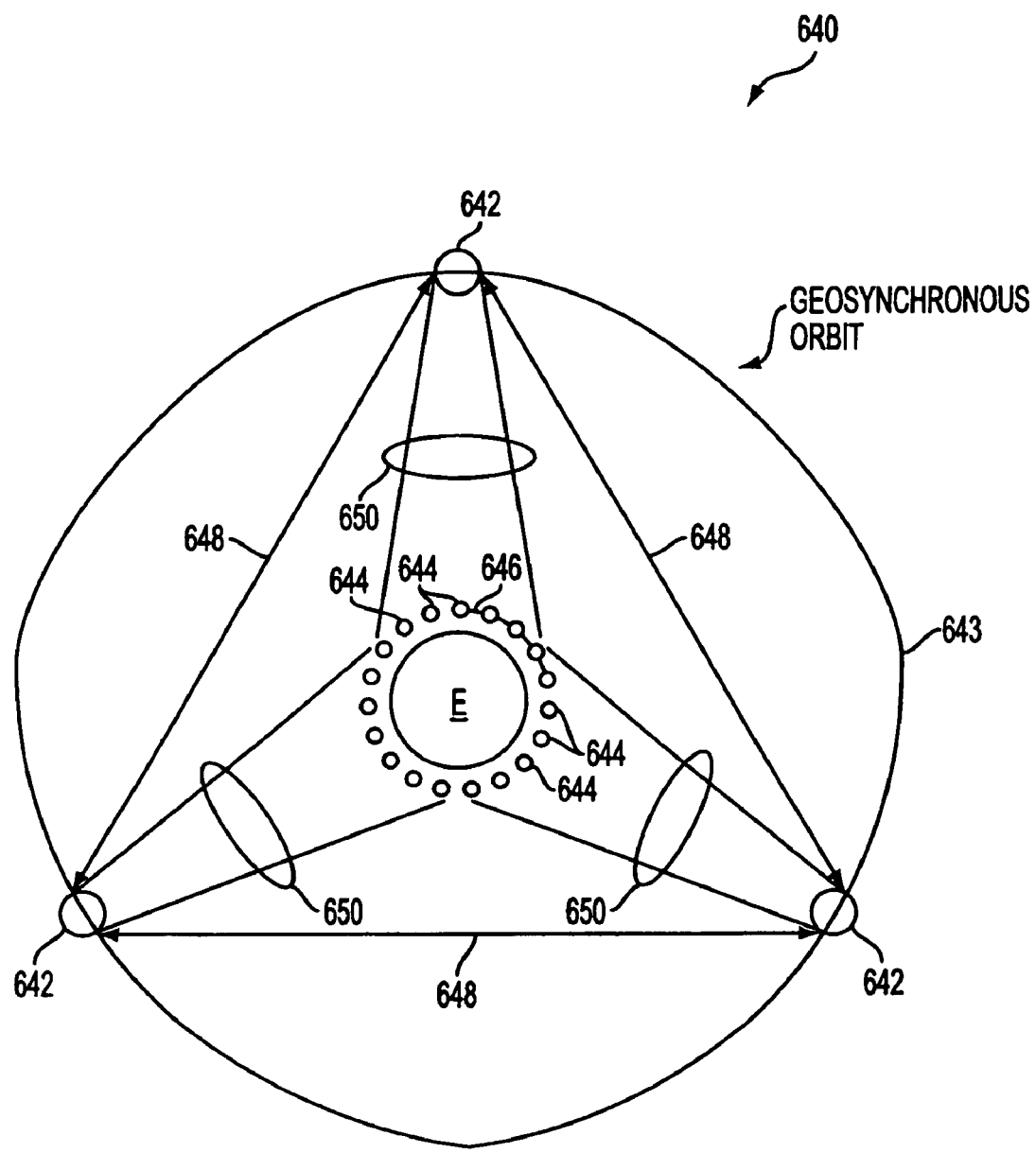
FIG. 33 is a diagram of a wide area network utilizing both geosynchronous and low earth orbiting satellites.

In FIG. 33, a wide area network (WAN) 640 includes a number of satellites 642 in a geosynchronous orbit 643. As it is well known to those skilled in the art, geosynchronous satellites orbit the earth at the same speed that the earth rotates such that they are always "fixed" over a given point on the earth.

The terms geosynchronous and "geostationary" are often used synonymously. A satellite in geosynchronous orbit circles the earth once a day. The time it takes for a satellite to orbit the earth is called its period. For a satellite to orbit to be one sidereal day, it must be approximately 35,786 km (19,323 nautical miles or 22,241 statute miles) above the earth's surface. To serve at the same spot on the surface of the earth, a geosynchronous satellite also has to be directly above the equator. Otherwise, from the earth, the satellite would appear to move in a north/south line every day. By orbiting the equator, it is said that the satellite is orbiting in the equatorial plane. Therefore, in the illustration of FIG. 33, we will assume that we are looking down on a pole of the Earth E, e.g. we are looking down at the North Pole or up at the South Pole.

In addition to the geosynchronous satellites 642 in a geosynchronous orbit 643, there are a number of low earth orbiting satellites 644. These low earth orbiting satellites move relative to the surface of the Earth E, and do not have to be in the equatorial plane. The low earth orbiting satellites 644 can be in one or more low earth orbits 646 that can range up to some thousands of miles, although even lower orbits in the greater than 100 mile range have their advantages. For longevity, the orbit should be selected such that it is sufficiently above the upper reaches of the Earth's atmosphere so that the orbit does not decay and prematurely end the life of the satellite.

As noted, the satellite and terrestrial based computer or "nodes" can communicate with each other in variety of transmission paths. For example, the geosynchronous satellite 642 can communicate directly with each other by transmission path 648. Each of the geosynchronous satellite 642 can communicate with approximately one third of the satellites 644 and about one third of the surface of the Earth E as indicated by the roughly conical (for the purpose of illustration) transmission path 650. In addition, each of the satellites 644 can communicate with other satellites that are within a line of sight and with terrestrial nodes that are within its line of sight. It should also be noted that a "node" may include one or more independently operating computer systems, which may or may not be NACs.

In a typical relay transaction between a terrestrial and non-terrestrial node, communication between an earth-bound computer and one of the low earth orbiting satellite 644 is preferred over communication with a geosynchronous satellite 642 for a number of reasons. First, the transmission delay or "latency" in the link is minimized because the distance between the ground station and the low earth orbiting satellite is relatively small compared, for example, to a satellite in geosynchronous orbit. Secondly, the transmission power in a shorter distance link is less, and the receiver/antenna sensitivity over a shorter distance is also be less.

Nonetheless, the satellites 642 in geosynchronous orbit have a number of advantages. For one, there are always located in a particular point in the sky and, as such, a fixed antenna can be used at the earth-bound node. In addition, a number of network accessible computers (NACs) can be provided on the geosynchronous satellites 642, under the control of a cluster controller, to provide computing capabilities and database storage that are widely accessible over large expanses. The databases can be synchronized among the geosynchronous satellites 642 via communication links 648, or by relaying through other non-terrestrial and/or terrestrial nodes of the WAN.

The advantage of the clustering NACs in geosynchronous orbit 642 is that it deals with certain transmission delay problems. The round trip delay for communication with a geosynchronous satellite is in the order of one quarter of a second. However, NACs operating on the geosynchronous orbiting satellite 642 can communicate directly with each other on a local basis, where just video feed and low data rate user inputs need to be transmitted between the earth and the satellite. Imagine, for example, a "user" NAC on the geosynchronous satellite "downloading" a web page from a "web site" NAC on the geosynchronous satellite. Instead of having to make multiple links with the web site NAC, each having as much as a ¼ second delay, the two NACs can directly communicate over a high speed bus. The user of the user NAC simply receives the download image, without the large delay that would occur if the two NACs were separated by large distances. Therefore, the transmission delay becomes less of a factor, as long as the communication and computation with and between NACs are within a common geosynchronous satellite 642. Therefore, by providing hundreds or even thousands of NACs (preferably using extremely large scale integration techniques) on a single satellite 642 (or any other node on the system for that matter) rapid network performance can be obtained even there is substantial latency or transmission time in communicating with a user, for example, on a earth-bound computer.

The clustering of computers within close proximity of each other for remote viewing and control by other computers will be referred to herein as a "dense pack." While it is advantageous to have dense packs in orbit, it is also advantageous to have terrestrial dense packs. This is because there is some transmission latency inherent in all communication between remote computers, even in Earthly distances. It therefore is desirable to have the computers that are communicating with each other as close together as possible, and to be communicating with each other at the highest practical data rate. For example, the computers could be densely packed within a single room and communicate with each other over extremely high speed data busses, via laser beams, etc. Alternatively, the computers could be arranged on a single circuit board to reduce inter-computer communication delays. Again alternatively, the computers could be integrated on a single semiconductor wafer, i.e. wafer scale integration, to minimize inter-computer communication delays. However, wafer scale integration is currently somewhat difficult to achieve. Remote computers (e.g. NC's) can then control NACs of the dense pack over typically slower and/or higher latency connections by receiving video information from the NACs of the dense pack and by sending user inputs to the NACs.

Figure 34:
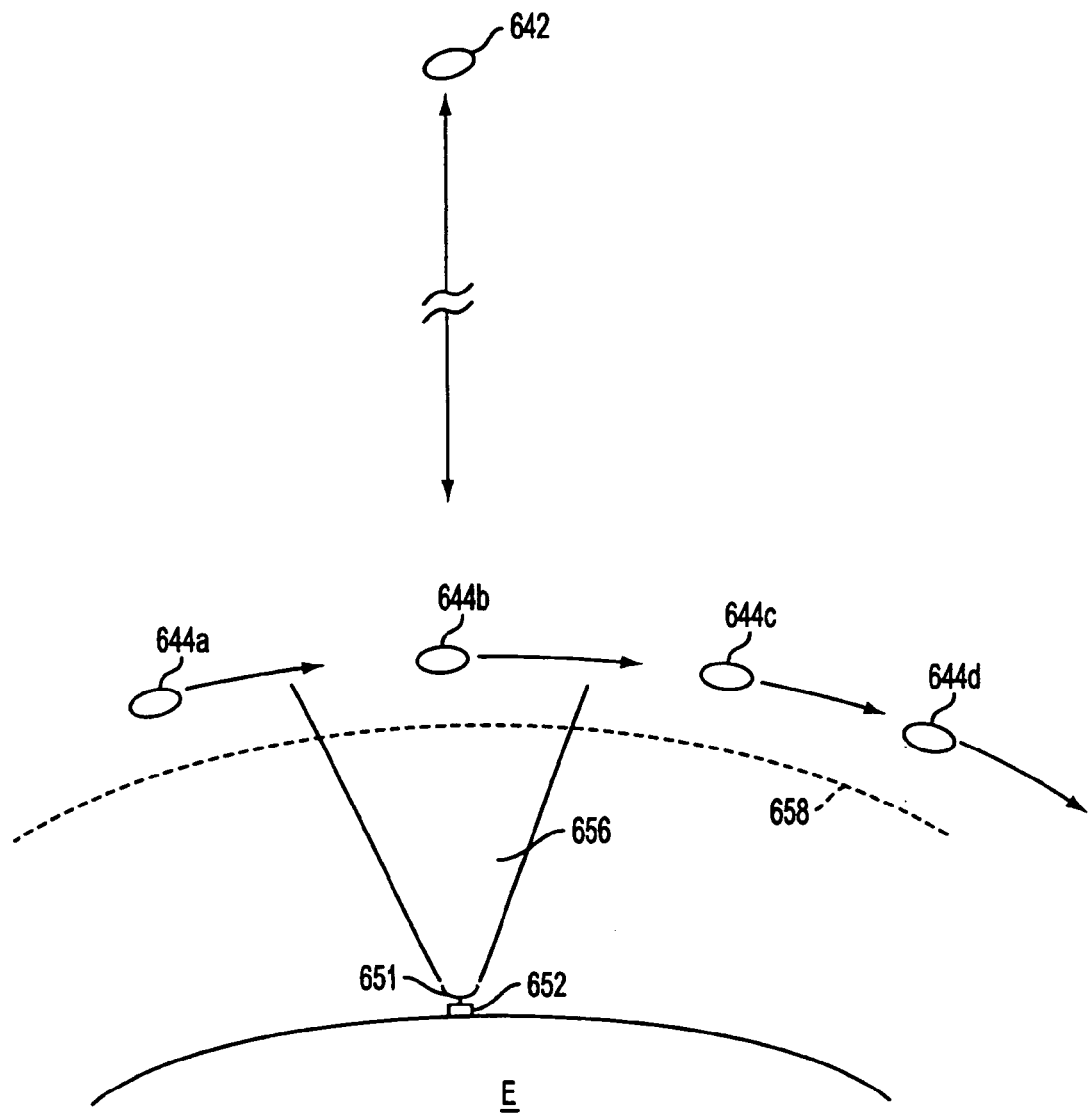
FIG. 34 is used to illustrate the "passing off" from one low earth orbiting satellite to another low earth orbiting satellite relative to an earth station.

In FIG. 34, an earth-bound station 652 located on a fixed position on the Earth E includes an antenna 654 having a transmission/reception envelope 656. Of course, as it is well known to those skilled in the art of antenna design, it will be appreciated that the actual reception/transmission envelope is not perfectly conical as implied by this figure. A number of low earth orbiting satellites 644, labeled 644a, 644b, 644c, and 644d may be passing within the reception/transmission envelope 656 of the earth station 652 at any particular point in time. As noted previously, these low earth orbiting satellites are preferably above the uppermost fringes 658 of the atmosphere of Earth E such that atmospheric drag only minimally causes minimal orbital decay. It should also be noted that the various satellites 644a–644d may be in different orbits around the Earth E, but that they are shown herein in a single orbit for the purpose of simplifying this example.

The earth station 652 is preferably in communication with one of the satellites 644 at all times. As noted previously, this can be accomplished in several ways. For one, the earth station 652 can have knowledge of the orbit of each of the satellites 644, such that it knows when a particular satellite is within the transmission/reception envelope and will address any communication accordingly. Likewise, network, once in communication with the ground station, will know which satellite is within the transmission/reception envelope 656.

Alternatively, the earth station 652 and satellite 644 can "listen" for data packets and dynamically determine which satellite(s) are within the transmission/reception envelope 656. For example, if the earth-bound node 652 transmits data packets which are "heard" (i.e. received with sufficiently low error rate) by satellite 644b, the network knows that satellite 644b is a good connection node to the earth-bound computer or node 652.

As the satellite 644b moves out of the envelope 656, and as satellite 644b moves into the envelope, there is a "passing off" of connection from satellite 644b to satellite 644a. This passing off can occur through transmission from the network either directly between the satellites or via intermediaries such as a terrestrial mode. In this fashion, the earth-bound node 652 can stay in constant communication with the low earth orbiting satellite 644 at all times as long as there is sufficient number of satellites 644 in orbit such that one is always within a transmission/reception envelope 656. Of course, if the envelope 656 includes a geosynchronous satellite 642, the earth-bound station 652 can remain in continuous contact with the geosynchronous satellite 642.

Figure 35A:
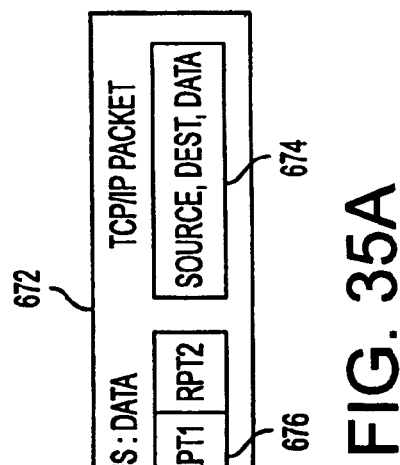
FIG. 35a is an illustration of a TCP/IP compatible data packet including a TCP/IP packet, transmission date, and timeout data.
Figure 35:
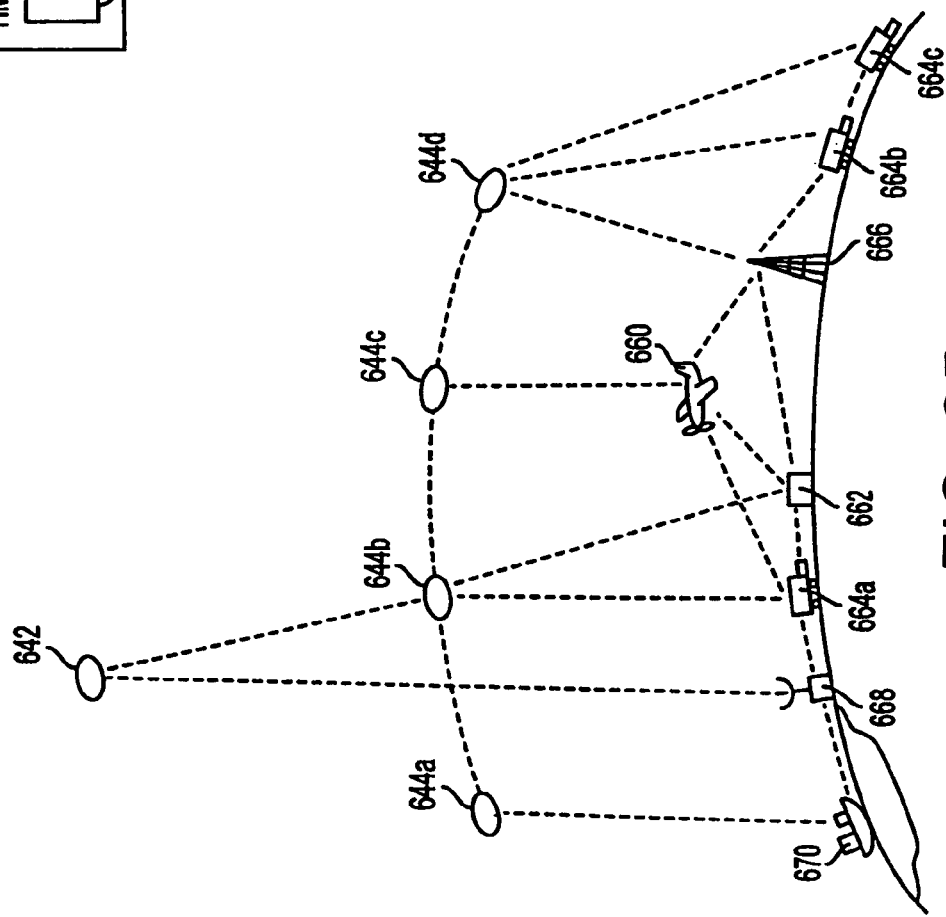
FIG. 35 is a diagram of a wide area network including both fixed and mobile nodes.

In FIG. 35, a WAN 658 including both "mobile" nodes and "fixed" nodes is illustrated. By "mobile" node, it is meant that the node is moving relative to the surface of the earth. This would include low earth satellites, airplanes, land vehicles, ships, etc. By "fixed" nodes, it is meant nodes that are stationary with respect to the surface of the earth, including geosynchronous satellites, earth stations, radio repeater towers, most user computer systems, etc. By including both mobile and fixed nodes, a flexible, robust, and pervasive wide area network is provided.

For example, the mobile node network 658 can include geosynchronous satellites 642, a number of low earth orbiting satellites 644a–644d, aircraft 660, earth stations 662, vehicles such as cars or trucks 664, (labeled here 644a, 644b, and 644c) repeater stations 666, satellite uplink/downlinks 668, boats or ships 670, etc. A number of communication paths are illustrated in the broken lines between the various nodes (both fixed and mobile) of the WAN 658. As such, a particular data packet on the WAN 658 may, and probably will, travel along multiple transmission paths. This is because the mobile nodes, and fixed nodes communicating with the mobile nodes, preferably serve a "repeater" function whereby certain data packets that are received by a particular node are retransmitted (i.e. they are received and re-transmitted or "repeated"). This allows the WAN 658 to continuously provide a communication links among nodes even as the nodes move spatially with respect to each other.

In FIG. 35a, a TCP/IP compatible data packet 672 includes a standard TCP/IP packet 674 and transmission data 676. As used herein, a "TCP/IP compatible data packet" may be a standard TCP/IP data packet, or it may be a super set of a TCP/IP data packet, e.g. including transmission data 676 and/or other data used for routing or other specialized purposes. Therefore, a TCP/IP compatible data packets can include both TCP/IP data packets and extensions thereof.

The TCP/IP compatible data packet 672 preferably also includes a time stamp 678 to allow a "time out" for the data packet. As each node in the system receives the data packet 672, it first determines whether it is the destination of that packet by examining the TCP/IP packet 674 for the destination address. That node then determines whether it has already received that packet. If it has received the packet, that packet is ignored, i.e. it is "discarded." If the receiving node had not received that TCP/IP packet 674 before and if it is for that node, the transmission data 676 and the time out data 678 can be "discarded" and the TCP/IP packet 674 is used.

If, however, it is determined that the TCP/IP packet 674 is not for the receiving node, the time out data 678 is used to determine the age of the packet. This can be accomplished by comparing the time stamp 678 to real time data available over the network, on the computer, or from another source. For example, if the packet is older than a predetermined period, such as a fraction of a second (e.g. ¼ or ½ second), it may be considered to be "timed out" and it is then "discarded" by the receiving node.

If the received data packet is not for that node, and is not timed out, the transmission data 676 is reviewed to see if the node has already repeated that packet. If so, the packet is again discarded. However, if the received packet is not for that node, the packet has not timed out, and that node has not repeated that packet, the node will add its address to the transmission data 676 and retransmit the packet for reception by other nodes on the network.

Although it will be appreciated that for each node on the network that is receiving data packets, via wireless transmission (e.g. radio, microwave, laser beam, etc.), that it will repeat the data packet (after it has been modified with its own address in the transmission data 676) except under certain circumstances. These circumstances that are the exception to re-transmission preferably include: (1) if the data packet is for the receiving node; (2) if the data packet has timed out; and (3) if it has not already transmitted the packet. Circumstances (2) and (3) are designed to reduce needless data packet duplication on the network. For example, without checking to see if a packet has already been received by the node, packets could "bounce" back and forth between bi-directionally communicating nodes with endless duplication. For another example, without the timeout feature, packets could be re-transmitted over the entire network until each receiving node had received the packet at least once.

As an example, assume that the geosynchronous orbiting satellite 642 is transmitting a TCP/IP compatible data packet 672 destined for the earth-station 662. This packet is received by satellite communication station 668 and by earth-orbiting satellite 644b. The satellite communication station 668 then repeats the data packet 672 (with its own address added to transmission data 676) to a ship 670 and a truck 664a. The ship 670 retransmits to the satellite 644a, which retransmits to the satellite 644b. Satellite 644b will retransmits to satellite 644a, 644c, truck 664a, and earth station 662. The earth station 662 can therefore receive the data packet 672 over a number of paths, some of which may introduce transmission error. Preferably, the earth station does not consider a packet address to it as "received" until it has received the packet without error (preferably using standard error detection technique such as a checksum technique). Some redundant packets 672 may be received due to the multiple transmission paths, but these are ignored by the node 662 once it has received an error-free TCP/IP packet 674.

Figure 36:
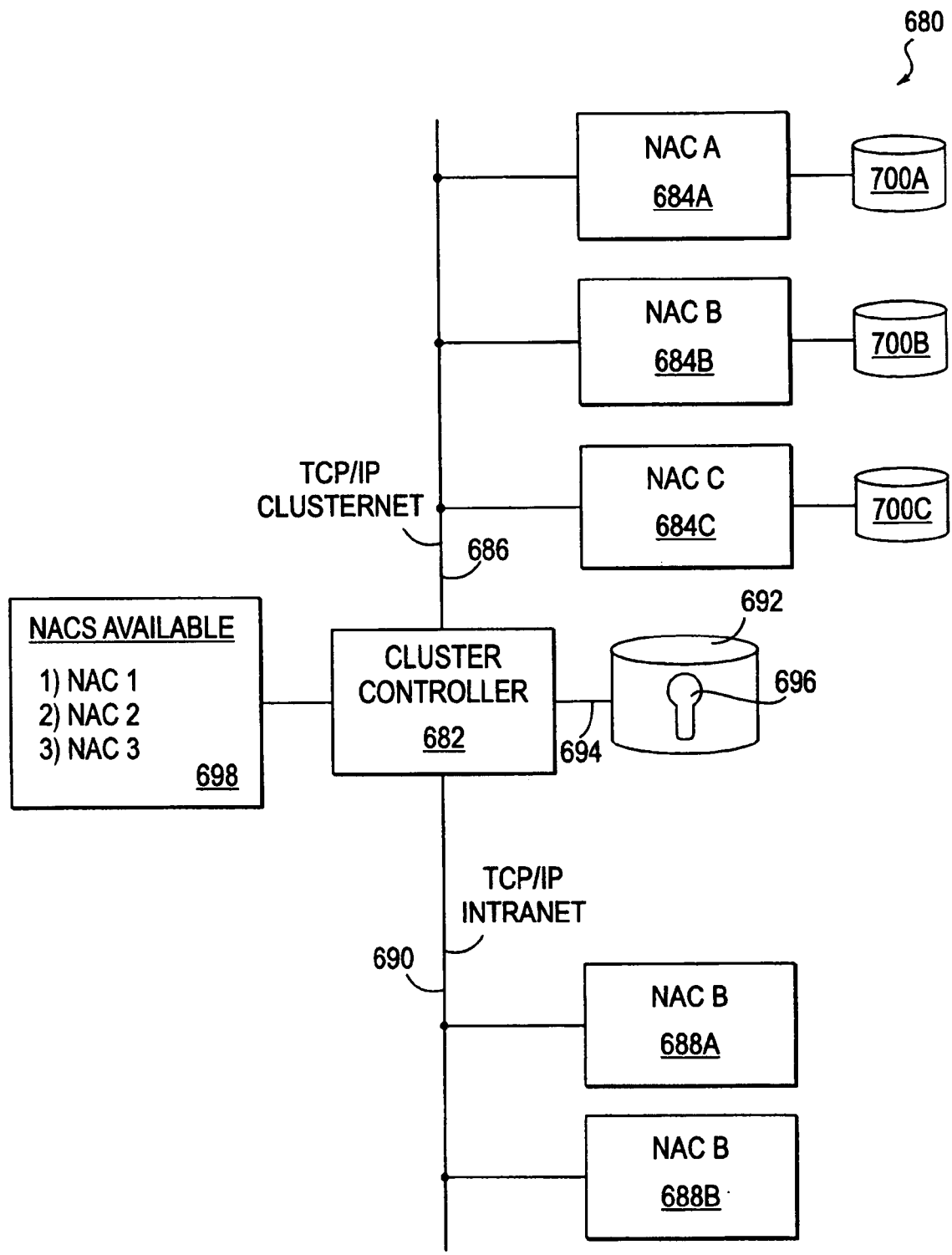
FIG. 36 is an illustration of an alternative cluster computer system of the present invention.

In FIG. 36, a cluster computer system 680 includes a cluster controller 682 (previously referred to as a cluster administration computer). A number of network accessible computers 684*a*, 684*b*, and 684*c* preferably coupled to a TCP/IP compatible Clusternet™ network 686, and a number of network computers (NC) 688*a* and 688*b* attached to a TCP/IP compatible network such as an Intranet 690 or to the Internet. The cluster controller 682 therefore serves as a "bridge" between two TCP/IP networks, i.e. the Clusternet network 686 and the Intranet 690. In this fashion, data traffic on the Clusternet network 686 does not affect traffic along the Intranet 690, except if there is communication between the Clusternet network 686 and the Intranet 690. The cluster controller accomplishes this by examining packets on the two networks 686 and 690 and passing on only those data packets which are addressed to a device on the other network.

The design and operation of TCP/IP networks, such as Intranet 690, are well-known to those skilled in the art. Likewise, network computers (NC), such as network computers 688*a* and 688*b* are well-known to those skilled in the art and are being marketed by such companies as Sun Microsystems, Inc. and Oracle Corporation. Likewise, web browsers that run on the network computers 688*a* and 688*b* are available from a variety of sources including Netscape Corporation and Microsoft, Inc.

The cluster controller is preferably a powerful personal computer system or workstation system. For example, a personal computer available from a variety of sources and operating with a Intel Pentium™ microprocessor or beyond would be a good choice. In addition, it is preferable to use a robust, powerful operating systems, such as the Windows NT™ operating system available from Microsoft Corporation, as the operating system for the cluster controller 682. The cluster controller 682 preferably has a large storage device, such as a disk drive 692 which is accessed by a high speed data bus 694 for storing data. For example, a "personal state" 696 can be stored on the disk drive 692. Personal states were described previously.

The cluster controller 682 performs a variety of functions. For one, it serves as a "web host" for its own web site such that it can host one or more web pages, such as web page 698. It can also serves as a conduit to data on the disk 692 for the various NACs 684*a*–684*c* on the Clusternet network 686, i.e. it can serve as a file server. It can also serves as a conduit for the transfer of data with disk drive 692 with devices coupled on the Intranet 690, i.e. as a network accessible hard drive. The cluster controller 682 also serves a bridge or "routing" function by examining the data packets on the networks 686 and 690, and passing packets from one network to the other if those packets are addressed to devices on that other network. The cluster controller 682 can also receives its own data packets from either the Clusternet network 686 or the Intranet 690 for its own use. In addition, the cluster controller monitors and controls functions of the NAC 684*a*–684*c* to ensure their proper functioning.

The NACs 684*a*–684*c* are, again, preferably personal computers, workstations, etc. configured for remote access by network computers (NCs). In the present invention, each of the NACs 684*a*–684*c* include their own mass storage, such as hard disks 700*a*, 700*b*, and 700*c*, respectively. If a NAC 684 is to be used as a "generic" NAC, the operating systems and application programs can be derived from its associated hard disk 700. However, such a generic NAC would not be personalized for a particular user. Alternatively, the hard disks 700*a*–700*c* can also include one or more "personal states" as described previously. Typically, such a personal state is activated on "boot-up" of the NAC 684, so that the computer has all internal states characterized for a particular user. This personal state can be written to the hard disk 700 of the associated NAC 684 from a remote storage site, such as the hard disk 692 coupled to the cluster controller 682.

Figure 37:
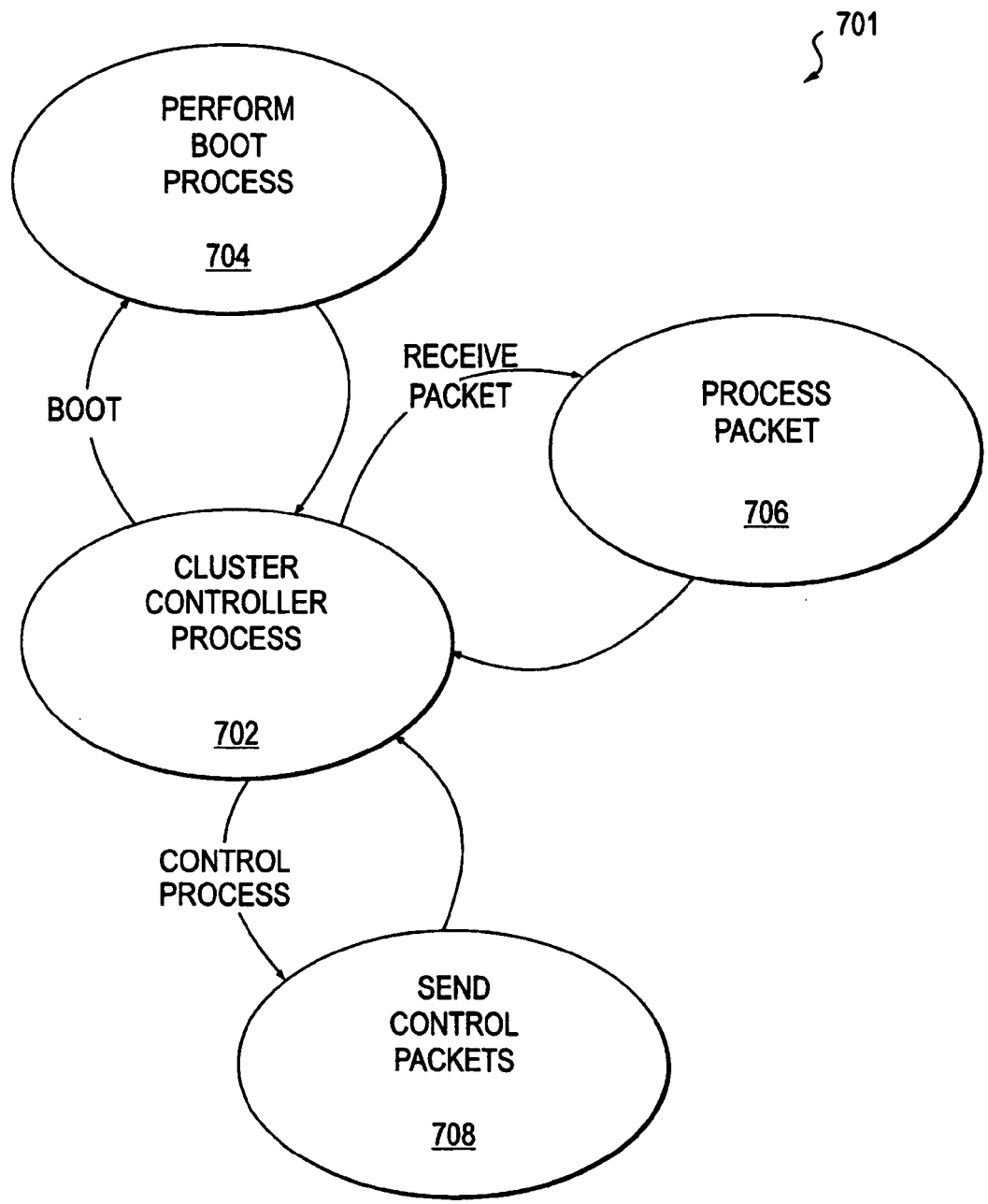
FIG. 37 is a flow diagram illustrating a process operating on the cluster controller of FIG. 36.

In FIG. 37, a process 701 implemented on the cluster controller 682 of FIG. 36 is illustrated. The process 701 includes a base or "root" process 702, a Boot Process 704, a Process Packet process 706, and a Send Control Packet process 708. The cluster control process 702 is the base, root or "idle" process wherein the system is waiting for a particular process or task to perform. One of these processes is the Boot Process which causes a "booting" of the computer comprising the cluster controller 682. By "boot" or "booting", it is meant that the computer is performing the low-level start-up routines that load the basic operating system and initial states into the computer memory and other storage locations within the NAC. Typically, booting starts with instructions stored in a ROM BIOS chip, and then continues with instructions stored at boot-level sectors of the hard disk. Another process performed by the cluster controller is the Receive Packet process where it receives a packet from either the Clusternet network 686 or the Intranet 690 and processes it accordingly. Yet another process of the cluster controller is the control process which sends control packets to either the Clusternet network 686 or the Intranet 690 to control a functioning of either a NAC 684 or a NC 688. Each of these processes will be discussed in greater detail subsequently.

Figure 38:
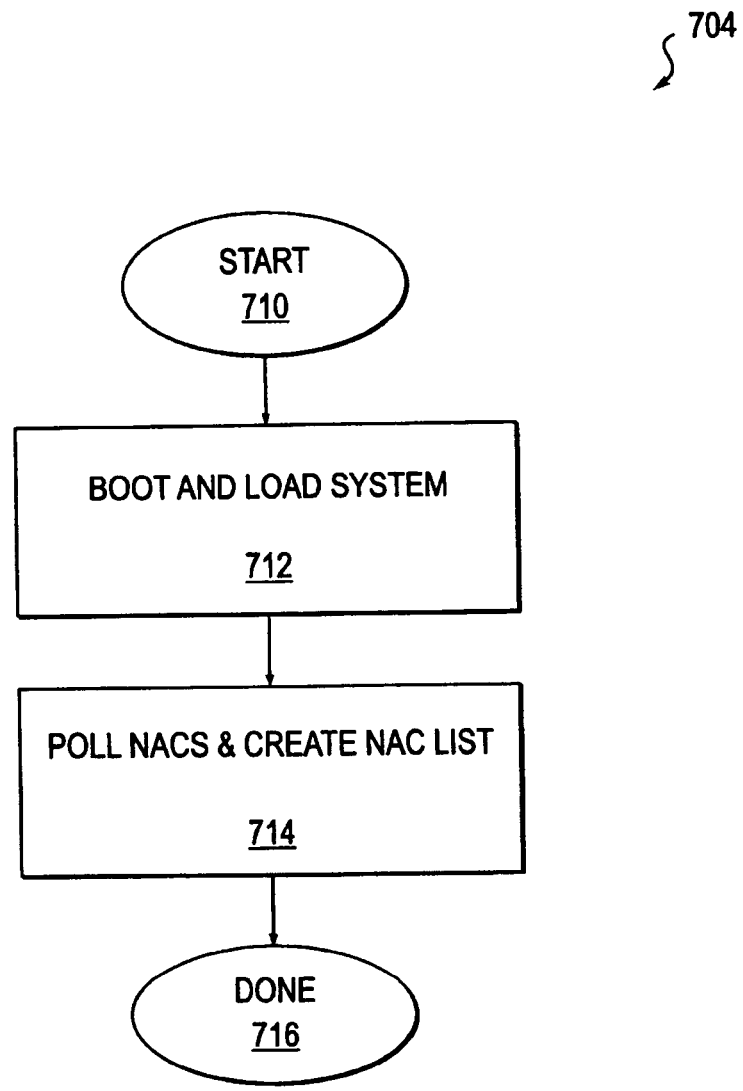
FIG. 38 is a flow diagram illustrating the Perform Boot Process of FIG. 37.

In FIG. 38, the process 704 of FIG. 37 is illustrated in greater detail. The process begins at 710 and, in step 712, the cluster controller computer is booted and loaded. Next, in a step 714, the NACs 684 are polled and a "NAC list" is created by the cluster controller 682.

This "polling" of the NACs can be accomplished in several ways, as will be appreciated by those skilled in the art. For example, the cluster controller 682 can include a list of all NACs that have been authorized to be on the Clusternet network 686, and can then poll them one-by-one at their known address to determine if they are still on the Clusternet network 686 and if they are currently available. Alternatively, the cluster controller 682 can send out a inquiry to a range of addresses allocated for NACs, and can then add NACs to the NAC list as it receives responses from the polled NACs. The process 704 is then completed at 716.

Figure 39:
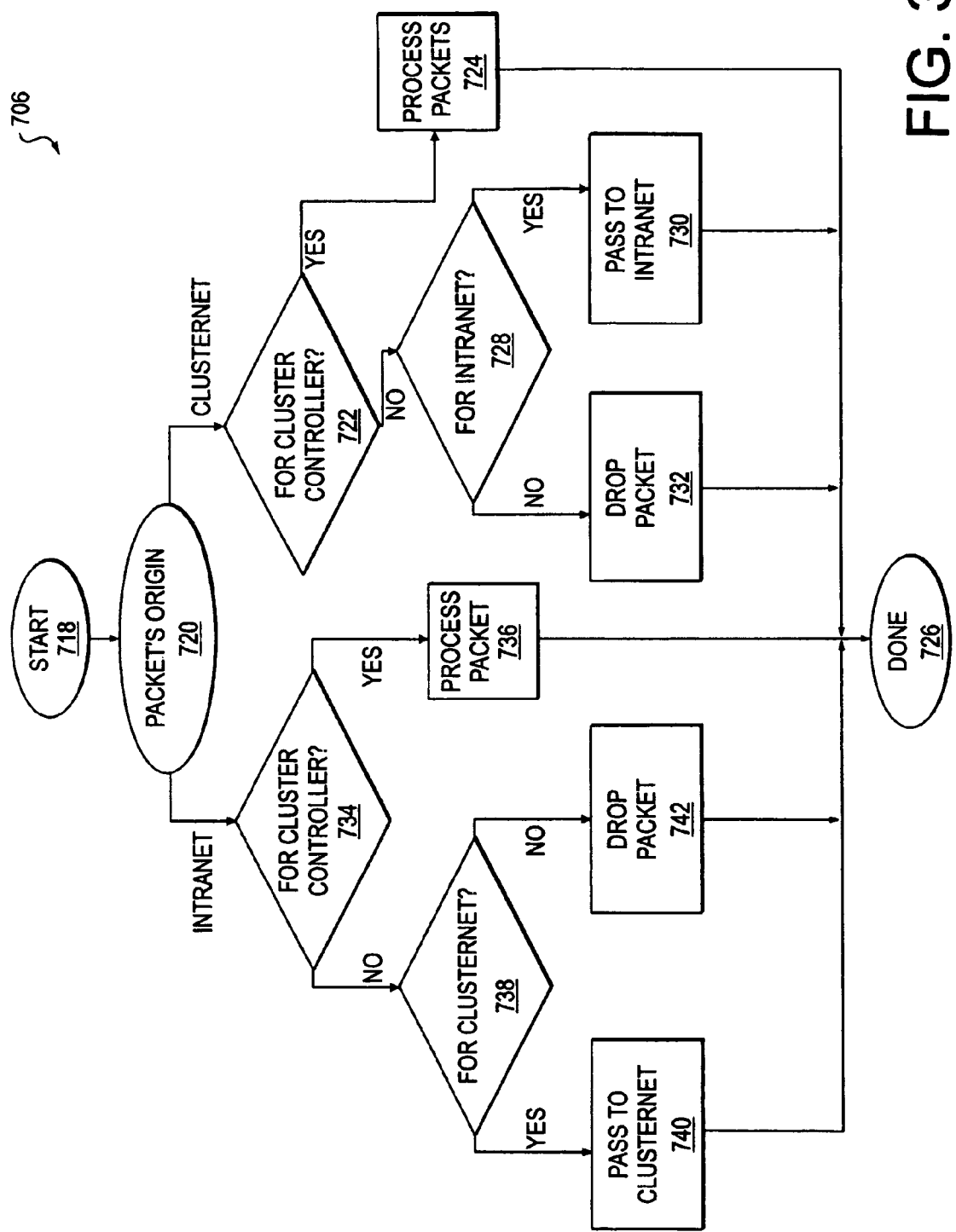
FIG. 39 is a flow diagram of the Process Packet process of FIG. 37.

In FIG. 39, the process 706 of FIG. 37 is illustrated in greater detail. The process 706 begins at 718 and, in a step 720, the origin of the packet is determined. That is, step 720 determines whether the packet came from the Intranet 690 or the Clusternet network 686. If the packet came from the Clusternet network, a step 722 determines whether the packet was addressed to the cluster controller 682. It does this by examining the address on the packet. If it was, the packet is processed in a step 724, and the process 706 is completed at 726. If step 722 determines that the packet was not for the cluster controller, it is determined in a step 728 whether it was for the Intranet. If so, a step 730 passes the packet to the Intranet. If step 728 determines that the packet is not for the Intranet, it will "drop" the packet 732 because it neither needs to use nor repeat the packet. By "drop" the packet, it is meant that the packet is simply not used by the cluster controller 682 although it may be stored, for example, for archival purposes. The process is then complete at 726.

If step 720 determines that the packet's origin is the Intranet, a step 734 determines whether it is for the cluster controller. If so, the packet is processed in a step 736, and the process 706 is completed at 726. If the packet was not for the cluster controller, it is determined whether it is for the Clusternet network 686. If it is, it is passed to the Clusternet network in a step 740, and if it is not, it is dropped in a "drop packet" step 742. In either case, the process is then completed at 726.

Figure 40:
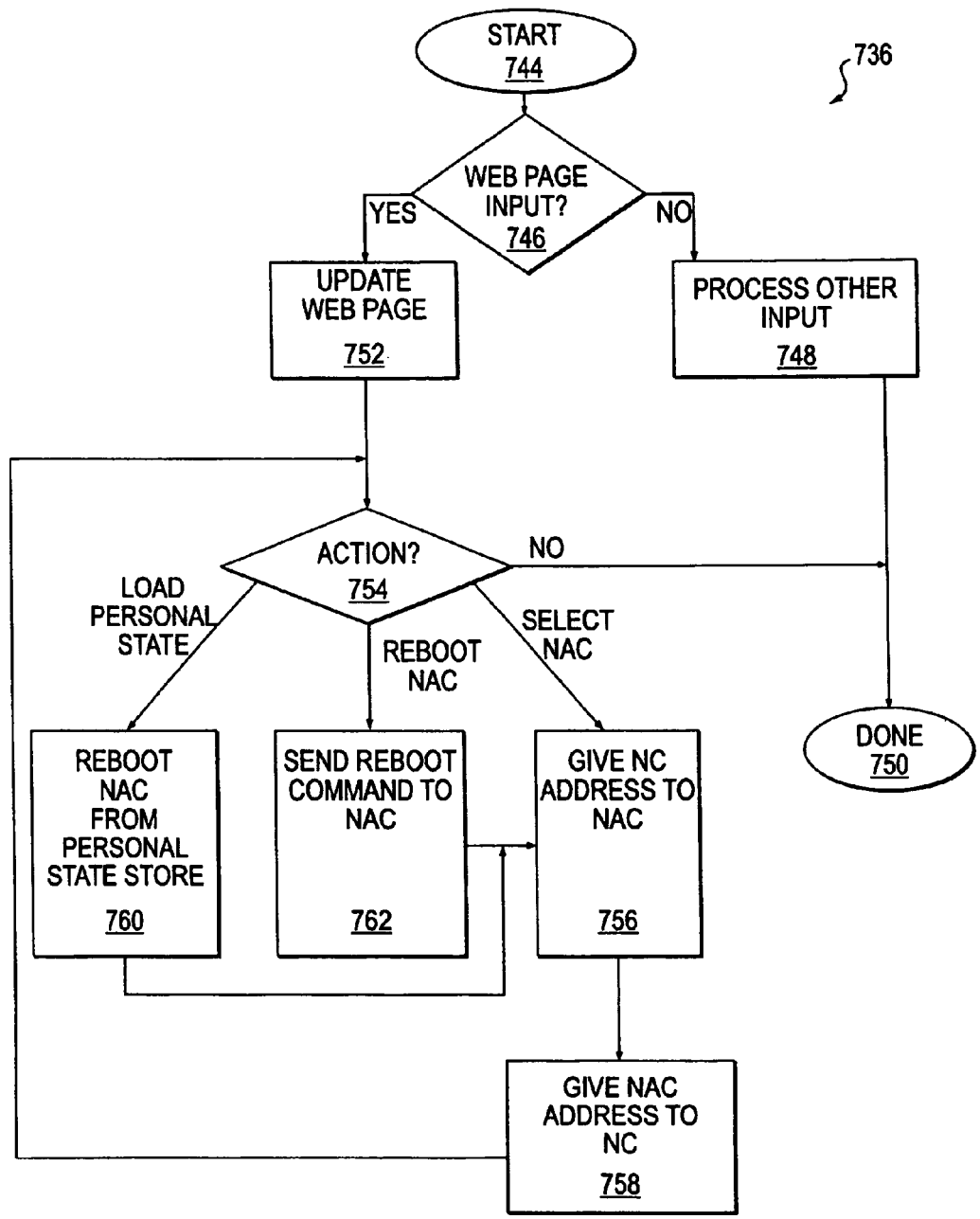
FIG. 40 is a flow diagram of the Process Packet process of FIG. 39.

In FIG. 40, the process 736 is illustrated in greater detail. The process 736 begins at 744 and, in a step 746, it is determined whether the packet is an input for the web page 698. If not, this "other" input is processed in a step 748, and the process is complete 750. If step 746 determines that it is a web page input, the web page image on the network computer 688 is updated, as required. Next, a step 754 determines whether an action is required. If not, the process is again completed at 750. If a "select" NAC action is required, step 756 gives the address of the network computer NC 688 to the NAC 684. Next, in a step 758, the NAC address is given to the NC, and process control is returned to step 754 for further action, if necessary.

If step 754 determines that the "load personal state" is desirable, a NAC is booted from the personal state stored, for example, on one of the hard drives 700 or on the hard drive 692. While the personal state 692 could be booted directly from disk drive 692 to an NAC, it is considered preferable to copy the personal state 696 to the disk drive 700 of the desired NAC 684, and to boot the personal state from this local hard drive. This is because booting is a very low-level process, which is most easily performed from a hard disk directly coupled to the NAC in a standard fashion.

Steps 756 and 758 are then performed and process control is returned to step 754. If action step 754 determines that the action is to reboot a NAC, a "reboot" command is sent to the NAC in a step 762 and then steps 756 and 758 are performed before returning process control to step 754. This "reboot" command can be a software or "soft" reboot command, or it can be a hardware or "hard" boot command to cycle the power off, and then on, for the NAC. Processes for sending soft reboot commands are well known to those skilled in the art, while a process and exemplary hardware for hard boot commands were discussed previously.

Figure 41:
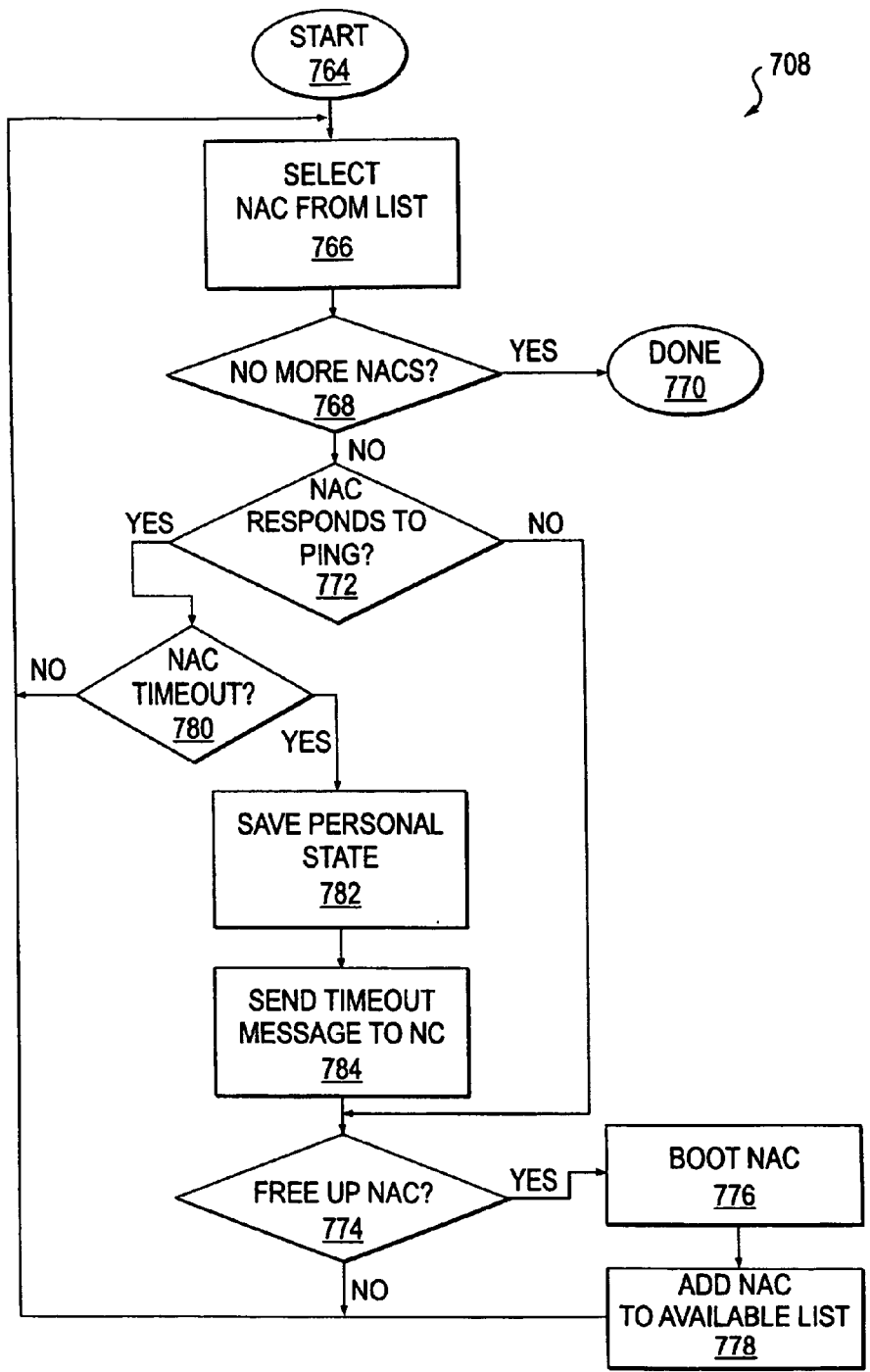
FIG. 41 is flow diagram of the Send Control Packets process of FIG. 37.

In FIG. 41, the process 708 of FIG. 37 is illustrated in greater detail. The process 708 allows the cluster controller 682 to monitor and control the operations of the NAC 684. More particularly, the process 708 starts at 764 and, in a step 768, a NAC is selected from the NAC list stored within the cluster controller 682 (e.g. stored on disk drive 692). If all the NACs on the list have already been selected by this process 708, the process is completed at 770. However, if not all the NACs have been selected from the list, the NAC is "pinged", and then a step 772 determines whether the NAC responds to the ping. By "ping" it is meant that an inquiry addressed to a particular NAC is sent over the Clusternet network to determine whether the NAC is still operating properly. If step 772 determines that the NAC does not respond to ping, a step 774 determines whether that NAC should be "freed up." If so, a step 776 reboots the NAC, and a step 778 adds the NAC to the available list of NACs stored on the cluster controller 682.

After completing step 778, or after a determination that the NAC should not be "freed up" by step 774, process control is returned to step 766 to select any other NAC from the list. If step 772 determines that the NAC did respond to the ping, a step 780 determines whether there is a NAC time out. A NAC time out occurs when no data has been sent from the NC controlling that particular NAC for a period of time, e.g. ten minutes. If there is not a NAC time out, process control is returned to step 766. If there is a NAC time out, the personal state of that particular NAC is saved, and a "time out" message is sent to the NC to inform it that it has timed out. Process control is then returned to step 774.

It should be noted that under certain circumstances when a NAC times out, step 774 might determine that the NAC should not be "freed up", i.e. that even though the connection with the NC is terminated, that the NAC should be allowed to continue to operate as initiated from the NC. This might happen in certain applications where a network computer starts an extended computation, such as a 3-D image rendering, which may take many hours, but does not wish to remain connected to the NAC performing the 3-D image rendering for the entire period of time. The NC is then "disconnected" from the NAC (by sending appropriate commands to the NC and NAC and by recording it as such in the memory of the cluster controller), but the NAC is allowed to "free-run." After the 3-D rendering is complete, it can be stored to hard disk, or the user can use an NC to reconnect to the NAC (that was previously free-running), again with suitable commands to the NC, NAC, and by updating the cluster controller information, to view the results of the NAC's computations.

Figure 42:
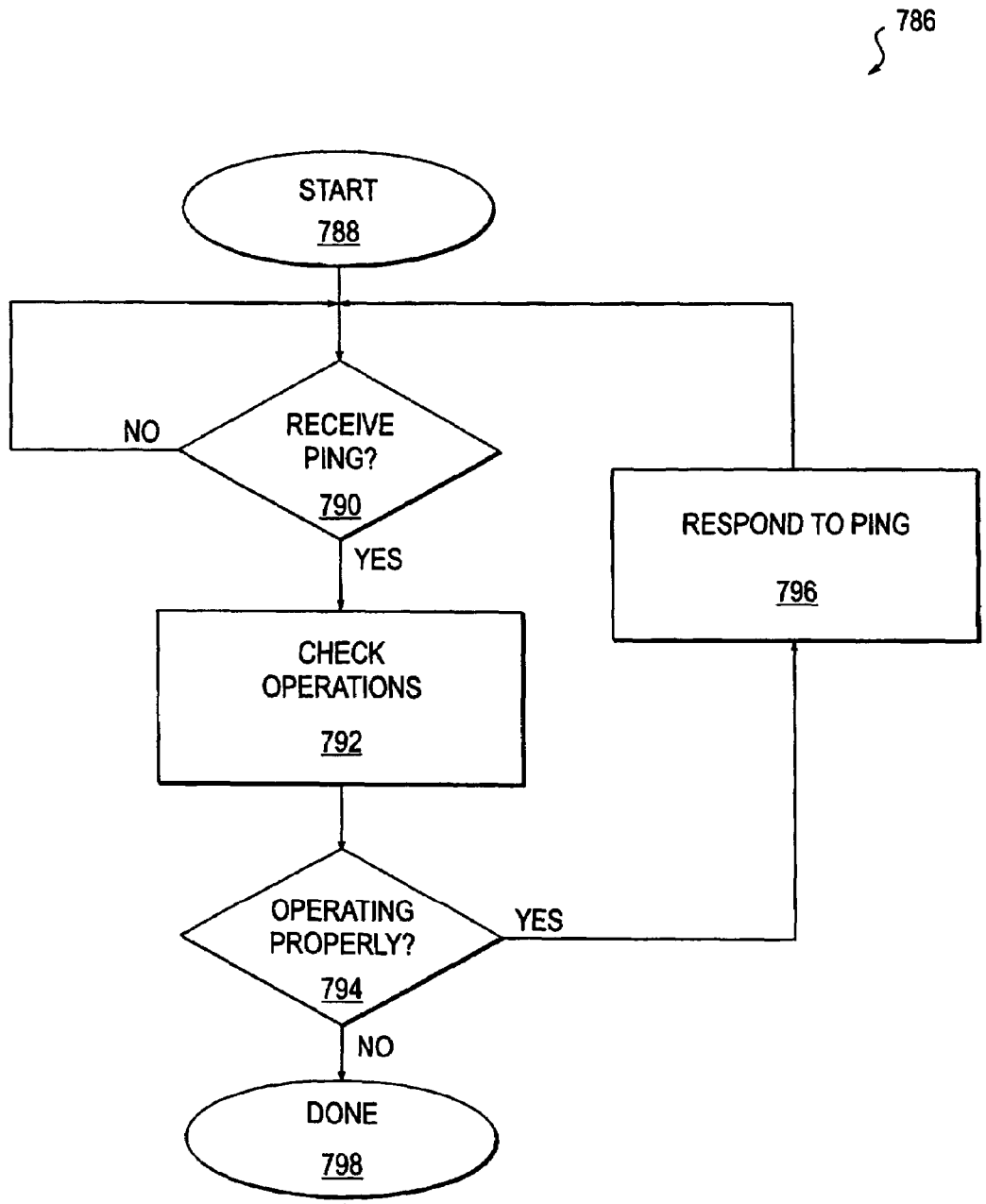
FIG. 42 is a flow diagram of a utility running on the NAC of FIG. 36 which permits the cluster controller to monitor the operation of the NAC.

In FIG. 42, a process 786 running on a NAC 684 is used to respond to the "ping" sent by the cluster controller 682. This process 784 can run concurrently with the virtual machine software previously described. More particularly, process 786 begins at 788 and, in a decision step 790, it is determined whether the NAC has received a ping. If not, process control is returned to step 790 to await a ping. If step 790 determines that a ping has been received, a step 792 checks the operation of the NAC 684. If the NAC is operating properly as determined by step 794, the NAC 684 responds to the ping, i.e. the NAC sends response addressed to the cluster controller 682, to indicate that it is operating properly, and process control is returned to step 790. If step 794 determines that the computer is not operating properly, the process 682 is done as indicated at 798. Also, if the NAC 684 has completely "crashed," process 786 obviously will not be running and, therefore, the NAC 684 will not respond to the ping of the cluster controller 682. If the cluster controller does not receive a response to a ping, it will assume that the NAC 684 is either malfunctioning or has crashed, and will most likely come to the decision that the NAC should be rebooted.

While this invention has been described in terms of several preferred embodiments, there are alterations, permutations, and equivalents which fall within the scope of this invention. It should also be noted that there are may alternative ways of implementing both the process and apparatus of the present invention. For example, the described methods pertaining to the host computer are generally described in terms of a Macintosh computer system. It will therefore be apparent to those skilled in the art that when the host computer processes are implemented on other computer systems, such as MS-DOS, Microsoft Windows 95, and UNIX computer systems, that the methodology may require some modification. However, such modifications will become readily apparent to those skilled in the art after studying preceding descriptions and studying the drawings.

It is therefore intended that the following appended claims cover all such alterations, permutations, and equivalents that fall within the true spirit and scope of the present invention.

What is claimed is:

1. A method for providing a network accessible computer over a TCP/IP protocol network comprising:

providing a host computer connected to a TCP/IP protocol network, said host computer running a host computer program; and providing a client computer having a display and input devices and running a client computer program and a web browser program, said client program being transmitted to said client computer via said network, where said client computer is connected to said TCP/IP protocol network wherein said client computer program facilitates the transfer of input device events from the client computer to the host computer such that the input devices of said client computer can be used to generate inputs to said host computer as if said input devices were connected to said host computer by sending signals through said network, and wherein image information may be displayed on a display within a window of said browser program running on said client computer as if said display were connected to said host computer by sending signals through said network by transmitting encrypted information about said host computer's screen to said client computer over said TCP/IP protocol network;

wherein said host computer program is responsive to keyboard events and pointing device events of said client computer as transmitted to said host computer over said TCP/IP protocol network as facilitated by said client program running on said client computer; and wherein said host computer provides said client computer with said client computer program.

2. A method as recited in claim 1 wherein said host computer comprises:

a central processing unit;

memory coupled to the central processing unit; and an interface coupling said central processing unit to a TCP/IP protocol network.

3. A method as recited in claim 1 wherein said host computer program is responsive to keyboard events and pointing device events of said client computer as transmitted to said host computer over said TCP/IP protocol network in conjunction with said client program running on said client computer, said host program transmitting said image information to said client computer over said TCP/IP protocol network for display in said browser window of said browser program running on said client computer.

4. A method as recited in claim 1 wherein said image information includes web page information.

5. A method as recited in claim 1 wherein said host computer is operable to transmit said client program to said client computer over said TCP/IP network.

6. A method as recited in claim 1 wherein said client program is a JAVA applet.

7. The A method of as recited in claim 1 wherein said screen information is transmitted once a fixed period of time has transpired since the previous transmittal of said host computer's screen information.

8. The A method of as recited in claim 1 further comprising:

receiving connection information by said host computer from said client program running on said client computer, where said host computer validates said connection information and extracts events from said connection information, where said events are placed in said host computer's event queue.

9. The A method of as recited in claim 1 further comprising:

establishing a connection between said host computer and said client computer, said connection initiated by said client computer;

transmitting said client computer program from said host computer to said client computer over said TCP/IP protocol network, said client computer program being operable to allow input devices of said client computer to generate inputs to said host computer;

transmitting client information from said client computer to said host computer over said TCP/IP protocol network, where said client information includes client interests, client resolution information, and client computer events; and transmitting host computer screen information from said host computer to said client computer.

* * * * *